United States Patent
Gopal et al.

(10) Patent No.: US 12,383,851 B2
(45) Date of Patent: Aug. 12, 2025

(54) FILTERS AND FACEMASKS HAVING ANTIMICROBIAL OR ANTIVIRAL PROPERTIES

(71) Applicant: Ascend Performance Materials Operations LLC, Houston, TX (US)

(72) Inventors: Vikram Gopal, The Woodlands, TX (US); Wai-shing Yung, Pensacola, FL (US); Natasha Dean, Houston, TX (US); Albert Ortega, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 952 days.

(21) Appl. No.: 17/235,345

(22) Filed: Apr. 20, 2021

(65) Prior Publication Data

US 2021/0322908 A1    Oct. 21, 2021

Related U.S. Application Data

(60) Provisional application No. 63/013,205, filed on Apr. 21, 2020, provisional application No. 63/044,653, filed on Jun. 26, 2020.

(51) Int. Cl.
*B01D 39/16* (2006.01)
*A41D 13/11* (2006.01)
(Continued)

(52) U.S. Cl.
CPC ...... *B01D 39/1623* (2013.01); *A41D 13/1192* (2013.01); *A62B 7/10* (2013.01);
(Continued)

(58) Field of Classification Search
CPC ........ B01D 2239/0442; A41D 2500/30; A41D 13/1192; A41D 13/11; A41D 31/145;
(Continued)

(56) References Cited

U.S. PATENT DOCUMENTS

| | | |
|---|---|---|
| 3,704,198 A | 11/1972 | Prentice |
| 3,755,527 A | 8/1973 | Keller et al. |

(Continued)

FOREIGN PATENT DOCUMENTS

| | | | | |
|---|---|---|---|---|
| EP | 1953286 A1 | * | 8/2008 | ......... A41D 13/1192 |
| EP | 2070564 A1 | | 6/2009 | |

(Continued)

*Primary Examiner* — Ophelia A Hawthorne
(74) *Attorney, Agent, or Firm* — Womble Bond Dickinson (US) LLP

(57) ABSTRACT

A filter or mask structure, comprising a first face layer comprising a polymer and having a face basis weight, a second outer layer comprising a polymer and having an outer basis weight less than 34 gsm, and a third outer layer comprising a polymer and having a third basis weight and disposed between the first face layer and the second outer layer. At least one of the layers further comprises an AM/AV compound. The mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17.

19 Claims, 1 Drawing Sheet

(51) Int. Cl.
*A62B 7/10* (2006.01)
*A62B 23/02* (2006.01)
*B32B 5/02* (2006.01)
*B32B 5/26* (2006.01)

(52) U.S. Cl.
CPC ............ *A62B 23/025* (2013.01); *B32B 5/022* (2013.01); *B32B 5/267* (2021.05); *B32B 5/269* (2021.05); *B01D 2239/0442* (2013.01); *B01D 2239/0618* (2013.01); *B01D 2239/0622* (2013.01); *B01D 2239/0627* (2013.01); *B01D 2239/065* (2013.01); *B01D 2239/1258* (2013.01); *B01D 2239/1291* (2013.01); *B32B 2250/20* (2013.01); *B32B 2262/0253* (2013.01); *B32B 2262/0261* (2013.01); *B32B 2307/7145* (2013.01); *B32B 2307/724* (2013.01); *B32B 2571/00* (2013.01)

(58) Field of Classification Search
CPC ..... A41D 13/1161; A62B 23/025; A62B 7/10; A61M 16/0605
See application file for complete search history.

(56) References Cited

U.S. PATENT DOCUMENTS

| | | |
|---|---|---|
| 3,849,241 A | 11/1974 | Butin et al. |
| 3,978,185 A | 8/1976 | Buntin et al. |
| 4,100,324 A | 7/1978 | Anderson et al. |
| 4,663,220 A | 5/1987 | Wisneski et al. |
| 4,701,518 A | 10/1987 | Osborn et al. |
| 6,584,668 B2 | 7/2003 | Green et al. |
| 7,300,272 B1 | 11/2007 | Haggard |
| 8,303,693 B2 | 11/2012 | Leung |
| 8,381,727 B2 | 2/2013 | Matich |
| 8,430,100 B2 | 4/2013 | Reese et al. |
| 8,668,854 B2 | 3/2014 | Marshall et al. |
| 9,320,923 B2 | 4/2016 | Koehler |
| 10,041,188 B2 | 8/2018 | Brang et al. |
| 10,660,385 B2 | 5/2020 | Nagao et al. |
| 2003/0203696 A1* | 10/2003 | Healey ............... B01D 39/1623 442/381 |
| 2005/0079379 A1 | 4/2005 | Wadsworth et al. |
| 2011/0209711 A1* | 9/2011 | Brillat ................. A62B 23/025 55/486 |
| 2014/0182602 A1* | 7/2014 | Nagao ................ A41D 13/1192 128/863 |
| 2018/0371656 A1 | 12/2018 | Yung et al. |
| 2021/0274778 A1 | 9/2021 | Gopal et al. |
| 2021/0277234 A1 | 9/2021 | Gopal et al. |

FOREIGN PATENT DOCUMENTS

| | | | |
|---|---|---|---|
| EP | 2749181 A2 | 7/2014 | |
| JP | 2018035478 A * | 3/2018 | ......... A41D 13/1192 |
| TW | M561542 U | 6/2018 | |
| TW | 202007419 A | 2/2020 | |
| TW | I687250 B | 3/2020 | |
| WO | 2014019660 A1 | 2/2014 | |

* cited by examiner

FILTERS AND FACEMASKS HAVING ANTIMICROBIAL OR ANTIVIRAL PROPERTIES

CROSS-REFERENCE TO RELATED APPLICATION

This application claims priority to U.S. Provisional Application No. 63/013,205, filed Apr. 21, 2020, and U.S. Provisional Application No. 63/044,653, filed Jun. 26, 2020, each of which is incorporated herein by reference.

FIELD

The present disclosure relates to filters and facemasks having (near-permanent) antiviral and/or antimicrobial properties. In particular, the present disclosure provides configurations of filters and facemasks from a polymer composition comprising unique antimicrobial/antiviral components.

BACKGROUND

There is a growing interest in fabrics having antiviral and/or antimicrobial properties. In particular, there is a growing interest in filters and facemasks having (near-permanent) antimicrobial and/or antiviral (AM/AV) properties. These products are used, e.g., by healthcare workers, to limit and/or prevent the exposure of transmission of microbial and/or viral infections. As such, the filters and facemasks must demonstrate robust antiviral and/or antimicrobial properties, preferably permanent or near-permanent antiviral and/or antimicrobial properties.

In an attempt to achieve such properties, conventional techniques have applied a number of treatments or coatings to fibers to impart antimicrobial properties to fabrics. Compounds containing copper, silver, gold, or zinc, either individually or in combination, have been used in these applications—typically in the form of a topical coating treatment—to effectively combat pathogens such as bacteria, mold, mildew, virus, spores, and fungus. These types of antimicrobial fibers and fabrics may be used in many industries including healthcare, hospitality, military, and athletics, among others. However, these coated fibers have not demonstrated adequately permanent antiviral properties. Furthermore, these coated fibers and fabrics have struggled to meet many other requirements of these applications. For example, in the healthcare and hospitality industries, certain fabrics are required to be sanitary at all times. To comply with these sanitation standards, the fabrics are subject to daily washing and, often times, bleaching. Thus, in many applications repeated cycles of use, washing, or soaking are quite common. Unfortunately, conventional fibers and fabrics have been found to deteriorate and lose antiviral and/or antimicrobial properties during repeated uses and/or wash cycles.

Additionally, many of the conventional antimicrobial fabrics do not demonstrate sufficient antiviral and/or antimicrobial properties, nor do they retain these properties when the fabrics are dyed. Fabrics are often dyed with or in various colors by submerging the fabric in a dye bath. In many cases, however, antimicrobial additives are extracted from the fibers/fabric, e.g., during dyeing operations, which causes the antimicrobial properties to deteriorate. Further, the antimicrobial treatments/coatings that may be extracted from conventional fabrics may have undesired environmental consequences.

As one example of conventional antimicrobial yarns and fabrics, U.S. Pat. No. 6,584,668 discloses durable non-electrically conductive metal treatments applied to yarns and textile fabrics. The durable non-electrically conductive metal treatments are coatings or finishes applied to yarns and textile fabrics. The metal treatments may include silver and/or silver ions, zinc, iron, copper, nickel, cobalt, aluminum, gold, manganese, magnesium, and the like. The metal treatments are applied to the exterior surface of the yarn or fabric as a coating or film.

Some synthetic fibers having antimicrobial fibers are also known in the art. For example, U.S. Pat. No. 4,701,518 discloses an antimicrobial nylon prepared in water with a zinc compound phosphorus compound to form carpet fibers. The process produces nylon fibers for carpets having 18 denier per filament (dpf), and are prepared by conventional melt polymerization. Such carpet fibers typically have average diameters that are well above 30 microns, which are generally unsuitable for next-to-skin applications. Furthermore, the conventional additives added to polymer compositions to impart antimicrobial properties in the synthetic fibers made therefrom have been found to reduce the relative viscosity in the polymer compositions. This reduced relative viscosity produces further difficulty in producing synthetic fibers from the polymer composition, e.g., increased difficulty in extruding the polymer composition.

Some mask configurations are also known. For example, U.S. patent Ser. No. 10/660,385B2 discloses a mask comprising a mask main body including an inner layer that is adapted to be positioned over the mouth of a wearer when the mask is being worn, an outer layer that is on the outside of the mask when the mask is being worn, and a filter layer that is positioned between the inner layer and the outer layer and consists of two melt blown nonwoven fabric layers and one insert layer that is a layer of a nonwoven fabric that differs from the two melt blown nonwoven fabric layer in characteristics, and a cord that is adapted to be placed over both ears or the head of the wearer to fix the mask main body at a specific position on the face of the wearer when the mask is being worn The two melt blown nonwoven fabric layers are formed of a polypropylene resin and have a weight per unit area of 7-15 $g/m^2$ (gsm), and the insert layer is a spun bond nonwoven fabric formed of a polypropylene resin and has a weight per unit area of 10-30 $g/m^2$.

Although some references may disclose antimicrobial fibers and fabrics, a need exists for mask configurations that achieve a synergistic combination of AM/AV efficacy and filtration performance, e.g., PFE, BFE, pressure drop, (and optionally biocompatibility, e.g. irritation and sensitization, performance).

SUMMARY

The present disclosure relates to a filter or mask structure, comprising a first face layer comprising a polymer, e.g., polyamide, and having a face basis weight, e.g., ranging from 5 gsm to 25 gsm, a second outer layer comprising a polymer, e.g., polyamide, and having an outer basis weight less than 34 gsm, e.g., ranging from 5 gsm to 25 gsm, and a third outer layer, which may comprise multiple additional layers, e.g., an N95 mask, preferably with two spunbond polypropylene layers; a spunlace polyethylene terephthalate layer; a spunlace polyester/cellulose blend, and two melt-blown polypropylene layers, comprising a polymer and having a third basis weight and disposed between the first face layer and the second outer layer. The third basis weight may range from 5 gsm to 15 gsm. At least one of the layers further comprises an AM/AV compound, e.g., zinc or a zinc compound. The mask structure may demonstrate an *Escherichia coli* efficacy log reduction greater than 4.0, as measured in accordance with ASTM E3160 (2018) and a particulate filtration efficiency greater than 90%, as measured in accordance with ASTM F2299-03R17. The difference between the face basis weight the outer basis weight may be less than 14 gsm and/or the difference between the face basis weight the outer basis weight may be less than 5 gsm and/or the face basis weight may be less than or equal to the outer basis weight. At least one layer may be meltblown. The polymer of at least one of the layers may have a hygroscopy absorbance of greater than 1.5 wt. % water, based on the total weight of the polymer. The second outer layer may comprise a meltblown layer and/or at least one of the face layer and the second outer layer may comprise a spunbond layer. The polymer of at least one of the face layer and the second outer layer may comprise polypropylene.

The present disclosure also relates to a filter or mask structure, comprising a first face layer comprising polypropylene and having a face basis weight ranging from 20 gsm to 30 gsm, a second outer layer comprising polypropylene and having an outer basis weight ranging from 20 gsm to 30 gsm, third outer layers each disposed between the first face layer and the second outer layer. The first third outer layer may comprise meltblown polyamide and may have a basis weight less than 15 gsm. The second third outer layer may comprise meltblown polyamide and may have a basis weight less than 15 gsm. At least one of the layers may further comprises an AM/AV compound. The mask structure demonstrates an *Escherichia coli* efficacy log reduction as noted above.

The present disclosure also relates to a filter or mask structure comprising a first face layer comprising meltblown polyamide and an AM/AV compound and having a face basis weight ranging from 2 gsm to 15 gsm, a second outer layer comprising meltblown polyamide and an AM/AV compound and having an outer basis weight ranging from 2 gsm to 15 gsm, and a third outer layer comprising an N95 mask and disposed between the first face layer and the as noted above.

The present disclosure also relates to a filter or mask structure comprising a first face layer comprising meltblown polyamide and an AM/AV compound and having a face basis weight ranging from 15 gsm to 25 gsm, a second outer layer comprising meltblown polyamide and an AM/AV compound and having an outer basis weight ranging from 15 gsm to 25 gsm, and a third outer layer comprising an N95 mask and disposed between the first face layer and the second outer layer. The mask structure demonstrates an *Escherichia coli* efficacy log reduction as noted above.

BRIEF DESCRIPTION OF THE DRAWINGS

The disclosure is described in detail below with reference to the appended drawings, wherein like numerals designate similar parts.

DETAILED DESCRIPTION

Introduction

Figure 1:
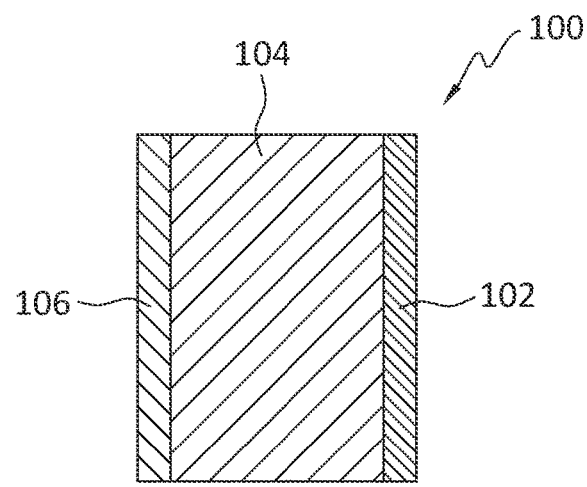
FIG. 1 illustrates a configuration of a filter structure according to the present disclosure.

Filter structures are devices composed of fibrous and/or porous materials designed to prevent or reduce the passage of some particulate. For example, a filter structure may be designed to remove solid particulates, such as dust, pollen, or mold, from the air. A filter structure may also be designed to remove pathogens, such as bacteria or viruses, from the air. The material and configuration of the filter structure may vary widely, and in many cases a filter structure may be specifically designed to target the removal of one or more specific particulates. Numerous applications utilize filter structures. For example, a filter structure may be utilized as an air filter, e.g., in a high efficiency particulate air (HEPA) filter, a heating, ventilation, and air conditioning (HVAC) filter, or an automotive cabin filter.

One particularly salient application of filter structures is in facemasks. A facemask (such as a respirator) is a device designed to protect the wearer from inhalable hazards, including particulate matter and airborne pathogens (e.g., bacteria and/or viruses). In many cases, facemasks include one or more filter structures to purify a contaminated atmosphere. Facemasks are widely used by workers in a variety of industries, including healthcare, pharmaceuticals, construction, mining, defense, public safety, oil and gas production, industrial manufacture, agriculture, power generation, and textiles. In some cases, the United States Centers for Disease Control has even called on all citizens to wear a facemask in public settings to reduce the spread of infectious diseases.

In the United States, the National Institute for Occupational Safety and Health (NIOSH) defines air filtration ratings to classify the effectiveness of the filter structures used in facemasks. In particular, NIOSH classifies filter structures on the basis of a variety of performance characteristics. The N95 standard for filter structures and facemasks is an exemplary NIOSH air filtration rating. Because N95-approved filter structures and facemasks demonstrate excellent properties (e.g., high fluid resistance, high filtration efficiency), N95 facemasks are particularly useful in medical environments to prevent the transmission of airborne diseases, such as tuberculosis, influenza, and SARS-CoV-2.

Similarly, ASTM International defines air filtration ratings to classify the effectiveness of the filter structures. In particular, ASTM F2100-19 provides classifications, performance requirements, and test methods for the filter structures used, e.g., in the construction of medical facemasks used in the healthcare industry. As with NIOSH, ASTM International classifies filter structures on the basis of performance characteristics, including fluid resistance, particulate filtration efficiency, bacterial filtration efficiency, breathability, and flammability. ASTM International defines three rating levels. Level I filter structures exhibit, e.g., fluid resistance of at least 80 mm Hg, a pressure differential of less than 5.0 mm $H_2O/cm^2$, bacterial filtration efficiency of at least 95%, and particulate filtration efficiency of at least 95%. Level II filter structures exhibit, e.g., fluid resistance of at least 120 mm Hg, a pressure differential of less than 6.0 mm $H_2O/cm^2$, bacterial filtration efficiency of at least 98%, and particulate filtration efficiency of at least 98%. Level III filter structures exhibit, e.g., fluid resistance of at least 160 mm Hg, a pressure differential of at least 6.0 mm $H_2O/cm^2$, bacterial filtration efficiency of at least 98%, and particulate filtration efficiency of at least 98%.

Conventional facemasks and filters, however, rely on physical and mechanical filtration, e.g., structures/configurations with pores and/or passageways that physically prohibit passage of some particles while allowing passage to others.

It has now been discovered that the employment of antimicrobial and/or antiviral ("AM/AV") formulations/compositions may produce fibers and fabrics having AM/AV efficacy. And that these fabrics may be advantageously utilized in mask configurations.

The filter structures and facemasks of the present disclosure, unlike conventional facemasks and filters, advantageously utilize one or more layers that, in addition to relying on physical filtration properties, also provide AM/AV properties, e.g., pathogen-destroying properties. Stated another way, the disclosed filters and masks not only protect by limiting pathogen intake, they also destroy pathogens via contact with the AM/AV layer(s) before the pathogens have a chance to enter the body. The AM/AV properties are made possible, at least in part, by the composition of the fibers that make up the filter layers. At least one of the layers contains a polymer component along with an AM/AV compound, e.g., zinc and/or copper, which in some cases, is embedded in the polymer structure (but may not be a component of a polymerized co-polymer). The presence of the AM/AV compound in the polymers of the fibers provides for the pathogen-destroying properties. As a result, the disclosed items prevent transmission of pathogens from contact that otherwise would allow the pathogen to spread. Importantly, because the AM/AV compound may be embedded in the polymer structure, the AM/AV properties are durable, and are not easily worn or washed away. Thus, the masks and filters disclosed herein achieve a synergistic combination of AM/AV efficacy and filtration performance, e.g., PFE, BFE, pressure drop, (and optionally biocompatibility, e.g. irritation and sensitization, performance). In contrast, conventional configurations that employ no AM/AV compound (or that do not meet the disclosed physical characteristic limits, e.g., basis weight or fiber diameter) do not and cannot provide the aforementioned synergistic combination of performance features.

In particular, it has been discovered when an outer layer, e.g., a second, third, or fourth layer, having a specific basis weight, e.g., less than 34 gsm, is employed in the disclosed mask configurations, the mask demonstrates a combination of AM/AV efficacy along with superior filtration performance, e.g., particulate filtration efficiency ("PFE"), bacterial filtration efficacy ("BFE"), and/or pressure drop ("delta P"). Without being bound by theory, it is believed that, due to the pathogen-destroying capability of the layer(s), the lower basis weight fabric, e.g., less than 34 gsm or less than 20 gsm, can be successfully employed without sacrificing overall AM/AV or filtration performance. In some cases, the inventors have found that the difference between the basis weight of the inner layer and the basis weight of an outer layer, e.g., a third or fourth layer, should be minimized, e.g., a difference less than 14 gsm. This is against conventional teaching which often times employs significantly different basis weights so as to separate different sizes of particulates. In addition, it has been found that the use of certain types of fibers, e.g., polypropylene fibers, in a face layer and/or an outer layer may also contribute to this surprising performance improvement. Beneficially, by employing one or more of these parameters, filtration performance was shown to unexpectedly improve, e.g., PFE greater than 90%, versus masks utilizing high basis weights in outer layers (see Examples). Also, average delta P values for the disclosed masks meets, and, in most cases well exceeds, industry standards.

Further, the inclusion of at least one layer that comprises polyamide polymer has been shown to lead to increased overall hydrophilicity and/or hygroscopy or the mask/filter, which works synergistically with the AM/AV compound in the fibers and fabrics to destroy pathogens. For example, it is theorized that a polymer of increased hydrophilicity and/or hygroscopy both may better attract liquid and/or capture media that carry microbials and/or viruses, e.g., saliva or mucous, and may also absorb more moisture (e.g., from the air or breath) and that the increased moisture content allows the polymer composition and the antimicrobial/antiviral agent to more readily destroy, limit, reduce, or inhibit infection and/or pathogenesis of a microbe or virus. For example, the moisture may dissolve an outer layer (e.g., capsid) of a virus, exposing the genetic material (e.g., DNA or RNA) of the virus.

In addition, the disclosed compositions, masks, and filters contain little or no reinforcement material, e.g., glass- and/or carbon fibers, (carbon) nanotubes, particulate fillers, such as mineral fillers based on natural and/or synthetic layer silicates, talc, mica, silicate, quartz, titanium dioxide, wollastonite, kaolin, amorphous silicic acids, magnesium carbonate, magnesium hydroxide, chalk, lime, feldspar, barium sulphate, solid or hollow glass balls or ground glass, permanently magnetic or magnetizable metal compounds and/or alloys and/or combinations thereof, and also combinations thereof. In some cases, the disclosed compositions, masks, and filters comprise less than 50 wt % of these materials, e.g., less than 25 wt %, less than 10 wt %, less than 5 wt %, less than 1 wt %, less than 5000 wppm, or less than 1000 wppm.

The composition of the fibers, fabrics, and layers is discussed in more detail herein. And the methods of producing the fibers, fabrics, and layers, e.g., spunbonding, spun lace, melt blowing, electrospinning, inter alia, are discussed in more detail herein. Other production processes are contemplated, including textile spinning and weaving.

As noted above, the present disclosure provides novel compositions and configurations for filter structures and facemasks. In particular, the filter structures, and the facemasks formed using the filter structures, may comprise multiple layers: a first layer (face layer), a second layer (outer layer), and, optionally, one or more additional outer layers, e.g., a third layer or a fourth layer. At least one of the layers demonstrate the AM/AV properties. That is to say, at least one of the layers has the ability to destroy pathogens that come into contact with the layer. As a result, the AM/AV filter structures and facemasks provide for the aforementioned benefits. As is discussed in detail below, the AM/AV properties of the filter structure may be derived from the use of a polymer composition demonstrating AM/AV properties. The present disclosure encompasses several configurations of the filter structure. In addition to the AM/AV properties, the configurations exhibit varying levels of physical filtration performance characteristics (e.g., fluid resistance, particulate filtration efficiency, bacterial filtration efficiency, breathability, and flammability). As such, the filter structures of the present disclosure may be configured to satisfy various NIOSH and/or ASTM standards. In some embodiments, for example, the filter structures described herein satisfy NIOSH N95 standards. In some embodiments, the filter structures satisfy ASTM Level I, Level II, and/or Level III standards. Thus, the specific combinations of compositional features, e.g., AM/AV compound content, and physical features, e.g., specific basis weight and/or thickness, contribute to the aforementioned unexpected, synergistic combinations of performance features.

In some cases, the disclosure relates to the material from which the layers are formed, e.g., to the fibers or fabrics. The fibers or fabrics may be produced as discussed herein and collected in bulk, e.g., in high quantities on rolls. The rolled fabric may then be further processed to produce the disclosed layers.

Some processes for mask making are known. For example, U.S. Pat. Nos. 8,303,693, 8,381,727, 8,430,100, and 9,320,923 each disclose mask production methods. These references are incorporated herein by reference.

Mask/Filter Structure

The mask/filter structures of the present disclosure include multiple layers. In particular, the mask/filter structures comprise a first face layer (e.g., an inner layer) and a second outer layer (e.g., a far outer layer). In some embodiments, the mask/filter structure includes an additional third layer (e.g., an outer layer that is outward of the face layer). In some cases, the layers are arranged such that at least a portion of the third layer is disposed between the face layer and the outer layer, e.g., the third layer is sandwiched between the face and outer layers. In some embodiments, the layers of the mask/filter structure are arranged such that at least a portion of the face layer is in contact with the third layer. In some embodiments, the layers of the mask/filter structure are arranged such that at least a portion of the outer layer is in contact with the third layer. In some cases, the face layer, the outer layer, and the third layer are (at least substantially) coextensive. In some cases, the terms "mask" and "filter" are used individually, which is not intended to imply that any features are specific to a mask, but not to a filter or vice versa, nor should any inference be drawn.

In some embodiments, the filter structure may comprise additional layers, which may be similar to or distinct from each of the face, outer, and third layers. Said another way, in some cases, other layers may also be included in the filter structure. In embodiments with additional layers, the outer layer may not necessarily be in direct contact with the other layers. That is to say, "disposed between" (e.g., the third layer is disposed between the face layer and the outer layer) does not necessarily mean "in contact with." In some cases, the layers may be made up of sublayers, e.g., multiple sublayers may be combined to form one of the primary layers (e.g., the third layer may include multiple layers). Sublayers are discussed in more detail below.

Importantly, at least one of the layers, e.g., the face layer and/or the outer layer, may be comprised of fibers or fabrics that have the AM/AV properties discussed herein. As such, these layers have the capability to kill pathogens that contact the layer(s). For example, the face layer may be constructed of AM/AV fibers, and this layer may destroy pathogens that pass through the outer or third layers, thus providing superior AM/AV performance. In some cases, the outer layer may be constructed of AM/AV fibers, and this layer may destroy pathogens that before the pathogens make it to the face or third layers.

As used herein, the term "coextensive" refers to a relationship between two or more layers such that the surface areas of adjacent or parallel faces of the layers are aligned with one another with little or no overhang (of at least one of the areas or layers). In some cases the extents of the areas or faces are within 90% of one another. For example, two or more layers are coextensive if the surface areas of adjacent or parallel faces of the layers are within 90%, within 92%, within 94%, within 96%, or within 98% of one another. The term "coextensive" can also refer to a relationship between two or more layers such that the lengths of the layers are within 90% of one another. For example, two or more layers are coextensive if the lengths of the layers are within 90%, within 92%, within 94%, within 96%, or within 98% of one another. The term "coextensive" can also refer to a relationship between two or more layers such that the widths of the layers are within 90% of one another. For example, two or more layers are coextensive if the widths of the layers are within 90%, within 92%, within 94%, within 96%, or within 98% of one another.

In some embodiments, each of the face layer, the outer layer, the third layer(s) have opposing top and bottom surfaces, with the bottom surface facing the filtered area and the top surface facing the atmosphere. From the perspective of looking downwardly toward the filtered area (e.g., at the face of a person wearing a facemask) the third layer may be beneath the outer layer (e.g., the top surface of the third layer is in contact with the bottom surface of the outer layer) and above the face layer (e.g., the bottom surface of the third layer is in contact with the top surface of the face layer). Other layers may also be present between the first layer and the third layer.

In some embodiments, the various layers may be formed directly on other layers. For example, the face layer may comprise a nonwoven polyamide fabric, and the third layer may comprised a plurality of polyamide nanofibers, which are blown directly on a surface of the face layer. In this way, the first layer and the third layer may be (substantially) contiguous.

In some embodiments, the layers of the filter structure are separable and/or removable. For example, the second layer may be removable from the filter structure. This may allow for individual components to be washed and/or replaced. In some cases, for example, the face layer and/or the outer layer form a sleeve that surrounds the third layer, which can be removed or replaced.

In some embodiments, a layer or layers of the filter structure may be configured to surround a conventional filter structure during use. For example, the face layer and/or the outer layer may be applied on either side of an existing (e.g., conventional) facemask (e.g., an N95 mask). As a result, the filter structure may impart AM/AV properties to an existing facemask, which previously did not have such capabilities.

In some embodiments, the disclosed filters may be employed in conjunction with a respirator apparatus. In some cases, the filters can be used in the respirator in a replacement manner, e.g., to replace one another or to replace original filter media.

In some cases, the use of the disclosed layer(s) is beneficial in that it provides for or improves the comfort and/or breathability versus a conventional mask or respirator. As one example, conventional masks, e.g., N95 masks, are known to have low breathability—the wearer is not able to force air through the mask. By employing the fibers, fabrics, and/or layers disclosed herein, the breathability and/or comfort of the mask can be improved. The disclosed masks may provide better breathability and/or comfort than a conventional mask, e.g., an N95 mask, while providing equal or better filtration and/or pathogen destroying performance. One metric used to measure breathability is pressure drop (delta P). Delta P performance is discussed in more detail below.

First Layer (Face Layer)

The disclosed filter structures include a first face layer (e.g., an inner layer). Generally, the face layer is designed to absorb moisture. In many applications, the filter structure may be exposed to a moist environment or atmosphere. For example, when incorporated into a face mask (e.g., as described below), the face layer may be adjacent to the user's face and/or mouth and therefore may be exposed to moisture in the user's breath. Because the face layer may be adjacent to a user's face, the disclosed face layers may provide comfort and/or to fit to the user, for example due to the softness or formability of the layers (e.g., due to the characteristics of the fabric such as fiber diameter or denier, which may provide the softness). The face layer may be constructed of AM/AV fibers and/or fabrics, and as such, may impart AM/AV capabilities thereto. As a result, the face layer may prevent transmission of pathogens from contact that otherwise would allow the pathogen to spread or to pass through the mask to the wearer.

The face layer may be composed of a first fabric. In some cases, the first fabric is a polymer fabric, e.g., a polyamide fabric. The structure of the first fabric is not particularly limited. In some embodiments, the fabric is a nonwoven fabric. In some embodiments, the first fabric is a woven fabric. In some embodiments, the first fabric is a knit fabric. For example, the first fabric may be composed of a spunbond fabric, a meltblown fabric, or a flashspun fabric, although other formation methods are contemplated. In some cases, the first fabric comprises polyamide fibers, e.g., polyamide microfibers or polyamide nanofibers.

Generally speaking, the differences in production method have been found to be important. For example, because of the nature of the respective processing, the characteristics of the various fabrics have been found to be unexpectedly beneficial when acting as specific layers. In some cases, meltblown fabrics are beneficial because they advantageously provide softness, which beneficially improves performance in next-to-skin applications. As another example, the polyamide polymer composition may provide hydrophilic and/or hygroscopic features, which are beneficial for the reasons discussed herein. In some cases, spunbond fabrics may be suitable for outer layers, e.g., face layers and/or outer layers, due to the larger filament size. This may work synergistically with the other layers to provide for the aforementioned combinations of performance features. Also, the integrity of spunbond fabrics, especially those fabrics that have been calendered may contribute to the overall strength, wear, and durability of the resultant mask.

In some cases, spunbond fabrics have been found to be synergistically beneficial when used with meltblown fabrics. It has been discovered that, in some cases, spunbond fabrics with AM/AV properties may be used as either a face layer and/or as an outer layer. The fiber structure of the spunbond fabric, optionally in conjunction with the different fiber structure, e.g., porosity and or fiber configuration, of the meltblown fabrics, contributes to structural benefits, in addition to others. Further, the addition of AM/AV compounds to the spunbond fabrics has been found to not have detrimental effects on the filtration performance and to have beneficial effects on AM/AV performance.

The composition of the face layer (e.g., the composition of the first fabric and/or the fibers thereof) may vary widely. In some embodiments, the first fabric and/or the fibers thereof are made from and/or comprises the polymer composition, e.g., the polyamide composition, which is discussed in detail below. The polyamide composition comprises a polymer and an AM/AV compound, and in some cases, the AM/AV compound provided for the AM/AV benefits. In some cases, the first fabric is a polymer, e.g., polyamide, fabric made from the polymer compositions described herein.

In some cases, the first fabric is a polyamide fabric. Examples of suitable polyamides include PA-4T/4I, PA-4T/6I, PA-5T/5I, PA-6, PA6,6, PA6,6/6, PA6,6/6T, PA-6T/6I, PA-6T/6I/6, PA-6T/6, PA-6T/6I/66, PA-6T/MPMDT, PA-6T/66, PA-6T/610, PA-10T/612, PA-10T/106, PA-6T/612, PA-6T/10T, PA-6T/10I, PA-9T, PA-10T, PA-12T, PA-10T/10I, PA-10T/12, PA-10T/11, PA-6T/9T, PA-6T/12T, PA-6T/10T/6I, PA-6T/6I/6, or PA-6T/6I/12, or copolymers thereof, or blends, mixtures or combinations thereof. In particular, the first polyamide fabric may be composed of a polymer composition as described herein.

In some cases, the first fabric is conventional polymer fabric. For example, the first fabric may comprise a fabric made from polyester, nylon, rayon, polyamide 6, polyamide 6,6, polyethylene (PE), polypropylene (PP), polyethylene terephthalate (PET), polyethylene terephthalate glycol (PETG), co-PET, polybutylene terephthalate (PBT) polylactic acid (PLA), and polytrimethylene terephthalate (PTT).

The basis weight of the face layer (e.g., the basis weight of the first fabric) may vary widely. In one embodiment, the first layer has a basis weight from 2 $g/m^2$ to 30 $g/m^2$, e.g., from 5 $g/m^2$ to 28 $g/m^2$, from 5 $g/m^2$ to 26 $g/m^2$, from 5 $g/m^2$ to 25 $g/m^2$, from 5 $g/m^2$ to 24 $g/m^2$, from 5 $g/m^2$ to 22 $g/m^2$, from 2 $g/m^2$ to 15 $g/m^2$, 6 $g/m^2$ to 30 $g/m^2$, from 6 $g/m^2$ to 28 $g/m^2$, from 6 $g/m^2$ to 26 $g/m^2$, from 6 $g/m^2$ to 24 $g/m^2$, from 6 $g/m^2$ to 22 $g/m^2$, 7 $g/m^2$ to 30 $g/m^2$, from 7 $g/m^2$ to 28 $g/m^2$, from 7 $g/m^2$ to 26 $g/m^2$, from 7 $g/m^2$ to 24 $g/m^2$, from 7 $g/m^2$ to 22 $g/m^2$, 8 $g/m^2$ to 30 $g/m^2$, from 8 $g/m^2$ to 28 $g/m^2$, from 8 $g/m^2$ to 26 $g/m^2$, from 8 $g/m^2$ to 24 $g/m^2$, from 8 $g/m^2$ to 22 $g/m^2$, 9 $g/m^2$ to 30 $g/m^2$, from 9 $g/m^2$ to 28 $g/m^2$, from 9 $g/m^2$ to 26 $g/m^2$, from 9 $g/m^2$ to 24 $g/m^2$, from 9 $g/m^2$ to 22 $g/m^2$, from 15 $g/m^2$ to 25 $g/m^2$, or from 10 $g/m^2$ to 20 $g/m^2$.

In terms of lower limits, the basis weight of the first layer (e.g., of the first fabric) may be greater than 5 $g/m^2$, e.g., greater than 6 $g/m^2$, greater than 7 $g/m^2$, greater than 8 $g/m^2$, greater than 9 $g/m^2$, or greater than 10 $g/m^2$. In terms of upper limits, the basis weight of the face layer (e.g., of the first fabric) may be less than 30 $g/m^2$, e.g., less than 28 $g/m^2$, less than 26 $g/m^2$, less than 25 $g/m^2$, less than 24 $g/m^2$, less than 22 $g/m^2$, or less than 20 $g/m^2$. In some cases, the basis weight of the face layer (e.g., of the first fabric) may be about 8 $g/m^2$, about 9 $g/m^2$, about 10 $g/m^2$, about 11 $g/m^2$, about 12 $g/m^2$, about 13 $g/m^2$, about 14 $g/m^2$, about 15 $g/m^2$, about 16 $g/m^2$, about 17 $g/m^2$, about 18 $g/m^2$, about 19 $g/m^2$, about 20 $g/m^2$, about 21 $g/m^2$, or about 22 $g/m^2$, or a basis weight therebetween.

In some cases, the layer(s) mentioned herein may be knit fabrics (not nonwoven). In some embodiments, e.g., when the face layer is a knit fabric, the basis weight may be significantly higher. For example, the face layer may have a basis weight from 5 $g/m^2$ to 200 $g/m^2$, e.g., from 50 $g/m^2$ to 200 $g/m^2$, 110 $g/m^2$ to 200 $g/m^2$, from 120 $g/m^2$ to 190 $g/m^2$, from 130 $g/m^2$ to 180 $g/m^2$, from 140 $g/m^2$ to 170 $g/m^2$, or from 150 $g/m^2$ to 160 $g/m^2$. In terms of lower limits, the basis weight of the face layer may be greater than 5 $g/m^2$, e.g., greater than 50 $g/m^2$, greater than 110 $g/m^2$, greater than 120 $g/m^2$, greater than 130 $g/m^2$, greater than 140 $g/m^2$, or greater than 150 $g/m^2$. In terms of upper limits, the basis weight of the face layer may be less than 200 $g/m^2$, e.g., less than 190 $g/m^2$, less than 180 $g/m^2$, less than 170 $g/m^2$, or less than 160 $g/m^2$. In some instances the other layers discussed herein may be knit fabrics and may have these basis weight ranges and limits.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

In some embodiments, the face layer comprises a plurality of fibers having an average fiber diameter less than 50 microns, e.g., less than 45 microns, less than 40 microns, less than 35 microns, less than 30 microns, less than 25 microns, less than 20 microns, less than 15 microns, less than 10 microns, or less than 5 microns. In terms of lower limits, the plurality of fibers may have an average fiber diameter greater than 1 micron, e.g., greater than 1.5 microns, greater than 2 microns, greater than 2.5 microns, greater than 5 microns, or greater than 10 microns. In terms of ranges, the plurality of fibers may have an average fiber diameter from 1 micron to 50 microns, e.g., from 1 micron to 45 microns, from 1 micron to 40 microns, from 1 micron to 35 microns, from 1 micron to 30 microns, from 1 micron to 20 microns, from 1 micron to 15 microns, from 1 micron to 10 microns, from 1 micron to 5 microns, from 1.5 microns to 25 microns, from 1.5 microns to 20 microns, from 1.5 microns to 15 microns, from 1.5 microns to 10 microns, from 1.5 microns to 5 microns, from 2 microns to 25 microns, from 2 microns to 20 microns, from 2 microns to 15 microns, from 2 microns to 10 microns, from 2 microns to 5 microns, from 2.5 microns to 25 microns, from 2.5 microns to 20 microns, from 2.5 microns to 15 microns, from 2.5 microns to 10 microns, from 2.5 microns to 5 microns, from 5 microns to 45 microns, from 5 microns to 40 microns, from 5 microns to 35 microns, from 5 microns to 30 microns, from 10 microns to 45 microns, from 10 microns to 40 microns, from 10 microns to 35 microns, from 10 microns to 30 microns. In some cases, fibers of this size may be referred to as microfibers.

In some embodiments, the face layer comprises a plurality of fibers having an average fiber diameter less than 1 micron, e.g., less than 0.9 microns, less than 0.8 microns, less than 0.7 microns, less than 0.6 microns, less than 0.5 microns, less than 0.4 microns, less than 0.3 microns, less than 0.2 microns, less than 0.1 microns, less than 0.05 microns, less than 0.04 microns, or less than 0.03 microns. In terms of lower limits, the average fiber diameter of the plurality of fibers may be greater than 1 nanometer, e.g., greater than 10 nanometers, greater than 25 nanometers, or greater than 50 nanometers. In terms of ranges, the average fiber diameter of the plurality of fibers may be from 1 nanometer to 1 micron, e.g., from 1 nanometer to 0.9 microns, from 1 nanometer to 0.8 microns, from 1 nanometer to 0.7 microns, from 1 nanometer to 0.6 microns, from 1 nanometer to 0.5 microns, from 1 nanometer to 0.4 microns, from 1 nanometer to 0.3 microns, from 1 nanometer to 0.2 microns, from 1 nanometer to 0.1 microns, from 1 nanometer to 0.05 microns, from 1 nanometer to 0.04 microns, from 1 nanometer to 0.3 microns, from 10 nanometers to 1 micron, from 10 nanometers to 0.9 microns, from 10 nanometers to 0.8 microns, from 10 nanometers to 0.7 microns, from 10 nanometers to 0.6 microns, from 10 nanometers to 0.5 microns, from 10 nanometers to 0.4 microns, from 10 nanometers to 0.3 microns, from 10 nanometers to 0.2 microns, from 10 nanometers to 0.1 microns, from 10 nanometers to 0.05 microns, from 10 nanometers to 0.04 microns, from 10 nanometers to 0.03 microns, from 25 nanometers to 1 micron, from 25 nanometers to 0.9 microns, from 25 nanometers to 0.8 microns, from 25 nanometers to 0.7 microns, from 25 nanometers to 0.6 microns, from 25 nanometers to 0.5 microns, from 25 nanometers to 0.4 microns, from 25 nanometers to 0.3 microns, from 25 nanometers to 0.2 microns, from 25 nanometers to 0.1 microns, from 25 nanometers to 0.05 microns, from 25 nanometers to 0.04 microns, from 25 nanometers to 0.03 microns, from 50 nanometers to 1 micron, from 50 nanometers to 0.9 microns, from 50 nanometers to 0.8 microns, from 50 nanometers to 0.7 microns, from 50 nanometers to 0.6 microns, from 50 nanometers to 0.5 microns, from 50 nanometers to 0.4 microns, from 50 nanometers to 0.3 microns, from 50 nanometers to 0.2 microns, from 50 nanometers to 0.1 microns, from 50 nanometers to 0.05 microns, from 50 nanometers to 0.04 microns, or from 50 nanometers to 0.03 microns. In some cases, fibers of this size may be referred to as nanofibers.

As noted above, the face layer is designed to absorb moisture. It has been found that the face layer may advantageously be composed of a relatively hydrophilic and/or hygroscopic material. A polymer of increased hydrophilicity and/or hygroscopy may better attract and hold moisture to which to the filter structure is exposed. As discussed below, improved (e.g., increased) hydrophilicity and/or hygroscopy may be accomplished by utilizing the polymer compositions described herein. Thus, it is particularly beneficial to form the face layer (e.g., the first fabric) from a disclosed polymer composition.

Second Layer (Outer Layer)

The disclosed filter structures may include a second layer (e.g., an outer layer). Generally, the outer layer is designed to isolate the filtered area. For example, when incorporated into a face mask (e.g., as described below), the outer layer may be the outermost layer, farthest from the user's face and/or mouth. In this example, the outer layer is the first point of separation from the atmosphere. As such, the outer layer protects the user from contaminants in the immediate atmosphere, which may include moisture, liquid-borne contaminants, and airborne contaminants. In some cases, like the first and outer layers, the outer layer may be constructed of AM/AV fibers and/or fabrics, and as such, may impart AM/AV capabilities thereto.

The outer layer is composed of a second (outer) fabric. The structure of the outer fabric is not particularly limited. In some embodiments, the outer fabric is a woven fabric. In some embodiments, the outer fabric is a nonwoven fabric. For example, the outer polyamide fabric may be composed of a spunbond fabric, a meltblown fabric, or a flashspun fabric. In some embodiments, the outer fabric is a knit fabric. In some cases, the outer fabric comprises polyamide fibers, e.g., polyamide microfibers or polyamide nanofibers.

The composition of the outer layer (e.g., the composition of the outer fabric and/or the fibers thereof) may vary widely. In some embodiments, the outer fabric and/or the fibers thereof are made from and/or comprises the polymer composition, e.g., the polyamide composition, which is discussed in detail below. The polyamide composition comprises a polymer and an AM/AV compound, and in some cases, the AM/AV compound provided for the AM/AV benefits.

In some cases, the outer fabric is conventional polymer fabric. For example, the outer fabric may comprise a fabric made from polyester, nylon, rayon, polyamide 6, polyamide 6,6, polyethylene (PE), polypropylene (PP), polyethylene terephthalate (PET), polyethylene terephthalate glycol (PETG), co-PET, polybutylene terephthalate (PBT) polylactic acid (PLA), and polytrimethylene terephthalate (PTT).

The basis weight of the outer layer (e.g., the basis weight of the outer fabric) may vary widely. In one embodiment, the outer layer has a basis weight from 2 g/m² to 50 g/m², e.g., from 5 g/m² to 48 g/m², from 5 g/m² to 45 g/m², from 5 g/m² to 42 g/m², from 5 g/m² to 40 g/m², from 5 g/m² to 30 g/m², from 5 g/m² to 25 g/m², from 5 g/m² to 15 g/m², from 2 g/m² to 15 g/m², from 8 g/m² to 50 g/m², from 8 g/m² to 48 g/m², from 8 g/m² to 45 g/m², from 8 g/m² to 42 g/m², from 8 g/m² to 40 g/m², from 8 g/m² to 20 g/m², 10 g/m² to 50 g/m², from 10 g/m² to 48 g/m², from 10 g/m² to 45 g/m², from 10 g/m² to 42 g/m², from 10 g/m² to 40 g/m², from 10 g/m² to 40 g/m², from 10 g/m² to 35 g/m², from 10 g/m² to 30 g/m², from 10 g/m² to 20 g/m², 12 g/m² to 50 g/m², from 12 g/m² to 48 g/m², from 12 g/m² to 45 g/m², from 12 g/m² to 42 g/m², from 12 g/m² to 40 g/m², 14 g/m² to 50 g/m², from 14 g/m² to 48 g/m², from 14 g/m² to 45 g/m², from 14 g/m² to 42 g/m², from 14 g/m² to 40 g/m², from 20 g/m² to 30 g/m², from 15 g/m² to 25 g/m², or from 15 g/m² to 38 g/m². In some instances, these layer(s) may comprise knit fabrics as disclosed above.

In terms of lower limits, the basis weight of the outer layer (e.g., of the outer fabric) may be greater than 5 g/m², e.g., greater than 8 g/m², greater than 10 g/m², greater than 12 g/m², greater than 14 g/m², or greater than 15 g/m². In terms of upper limits, the basis weight of the outer layer (e.g., of the outer fabric) may be less than 50 g/m², e.g., less than 48 g/m², less than 45 g/m², less than 42 g/m², less than 40 g/m², less than 35 g/m², less than 34 g/m², less than 30 g/m², less than 27 g/m², less than 25 g/m², less than 21 g/m², less than 20 g/m², less than 15 g/m², or less than 12 g/m². In some cases, the basis weight of the outer layer (e.g., of the outer fabric) may be about 10 g/m², about 11 g/m², about 12 g/m², about 13 g/m², about 14 g/m², about 15 g/m², about 16 g/m², about 18 g/m², about 19 g/m², about 20 g/m², about 21 g/m², about 22 g/m², about 23 g/m², about 24 g/m², about 25 g/m², about 26 g/m², about 27 g/m², about 28 g/m², about 29 g/m², about 30 g/m², about 31 g/m², about 32 g/m², about 33 g/m², about 34 g/m², about 35 g/m², about 36 g/m², about 37 g/m², about 38 g/m², about 39 g/m², or about 40 g/m², or a basis weight therebetween.

In some cases, the second outer layer comprises polyamide and the outer basis weight ranges from 5 gsm to 25 gsm. In some cases, the first face layer comprises polyamide and the face basis weight ranges from 5 gsm to 25 gsm.

The inventors have discovered that when the difference between the face basis weight the outer weight is kept low (e.g., is less than 14 gsm) and/or when the layers employ certain types of fibers, e.g., polypropylene fibers, then the performance unexpectedly improves. It is postulated that with certain arrangements, clogging that is conventionally seen is mitigated by the layered structure as a whole. As a result, the face and outer layers need not be significantly different in basis weight to achieve filtration performance. And this limited difference in basis weights, has been found to contribute to overall performance, e.g., PFE and pressure drop. This surprising result is contrary to conventional teaching which often times employs significantly different basis weights so as to separate different sizes of particulates.

In some cases, the difference between the face basis weight the outer basis weight is less than 14 gsm, e.g., less than 12 gsm, less than 10 gsm, less than 8 gsm, less than 6 gsm, less than 5 gsm, less than 3 gsm, less than 2 gsm, or less than 1 gsm. In some embodiments, the face basis weight is less than or equal to the outer basis weight. In some embodiments, the face basis weight is equal to the outer basis weight.

In some embodiments, the outer layer comprises a plurality of fibers having an average fiber diameter less than 50 microns, e.g., less than 45 microns, less than 40 microns, less than 35 microns, less than 30 microns, less than 25 microns, less than 20 microns, less than 15 microns, less than 10 microns, or less than 5 microns. In terms of lower limits, the plurality of fibers may have an average fiber diameter greater than 1 micron, e.g., greater than 1.5 microns, greater than 2 microns, greater than 2.5 microns, greater than 5 microns, or greater than 10 microns. In terms of ranges, the plurality of fibers may have an average fiber diameter from 1 micron to 50 microns, e.g., from 1 micron to 45 microns, from 1 micron to 40 microns, from 1 micron to 35 microns, from 1 micron to 30 microns, from 1 micron to 20 microns, from 1 micron to 15 microns, from 1 micron to 10 microns, from 1 micron to 5 microns, from 1.5 microns to 25 microns, from 1.5 microns to 20 microns, from 1.5 microns to 15 microns, from 1.5 microns to 10 microns, from 1.5 microns to 5 microns, from 2 microns to 25 microns, from 2 microns to 20 microns, from 2 microns to 15 microns, from 2 microns to 10 microns, from 2 microns to 5 microns, from 2.5 microns to 25 microns, from 2.5 microns to 20 microns, from 2.5 microns to 15 microns, from 2.5 microns to 10 microns, from 2.5 microns to 5 microns, from 5 microns to 45 microns, from 5 microns to 40 microns, from 5 microns to 35 microns, from 5 microns to 30 microns, from 10 microns to 45 microns, from 10 microns to 40 microns, from 10 microns to 35 microns, from 10 microns to 30 microns. In some cases, fibers of this size may be referred to as microfibers.

In some embodiments, the outer layer comprises a plurality of fibers having an average fiber diameter less than 1 micron, e.g., less than 0.9 microns, less than 0.8 microns, less than 0.7 microns, less than 0.6 microns, less than 0.5 microns, less than 0.4 microns, less than 0.3 microns, less than 0.2 microns, less than 0.1 microns, less than 0.05 microns, less than 0.04 microns, or less than 0.03 microns. In terms of lower limits, the average fiber diameter of the plurality of fibers may be greater than 1 nanometer, e.g., greater than 10 nanometers, greater than 25 nanometers, or greater than 50 nanometers. In terms of ranges, the average fiber diameter of the plurality of fibers may be from 1 nanometer to 1 micron, e.g., from 1 nanometer to 0.9 microns, from 1 nanometer to 0.8 microns, from 1 nanometer to 0.7 microns, from 1 nanometer to 0.6 microns, from 1 nanometer to 0.5 microns, from 1 nanometer to 0.4 microns, from 1 nanometer to 0.3 microns, from 1 nanometer to 0.2 microns, from 1 nanometer to 0.1 microns, from 1 nanometer to 0.05 microns, from 1 nanometer to 0.04 microns, from 1 nanometer to 0.03 microns, from 10 nanometers to 1 micron, from 10 nanometers to 0.9 microns, from 10 nanometers to 0.8 microns, from 10 nanometers to 0.7 microns, from 10 nanometers to 0.6 microns, from 10 nanometers to 0.5 microns, from 10 nanometers to 0.4 microns, from 10 nanometers to 0.3 microns, from 10 nanometers to 0.2 microns, from 10 nanometers to 0.1 microns, from 10 nanometers to 0.05 microns, from 10 nanometers to 0.04 microns, from 10 nanometers to 0.03 microns, from 25 nanometers to 1 micron, from 25 nanometers to 0.9 microns, from 25 nanometers to 0.8 microns, from 25 nanometers to 0.7 microns, from 25 nanometers to 0.6 microns, from 25 nanometers to 0.5 microns, from 25 nanometers to 0.4 microns, from 25 nanometers to 0.3 microns, from 25 nanometers to 0.2 microns, from 25 nanometers to 0.1 microns, from 25 nanometers to 0.05 microns, from 25 nanometers to 0.04 microns, from 25 nanometers to 0.03 microns, from 50 nanometers to 1 micron, from 50 nanometers to 0.9 microns, from 50 nanometers to 0.8 microns, from 50 nanometers to 0.7 microns, from 50 nanometers to 0.6 microns, from 50 nanometers to 0.5 microns, from 50 nanometers to 0.4 microns, from 50 nanometers to 0.3 microns, from 50 nanometers to 0.2 microns, from 50 nanometers to 0.1 microns, from 50 nanometers to 0.05 microns, from 50 nanometers to 0.04 microns, or from 50 nanometers to 0.03 microns. In some cases, fibers of this size may be referred to as nanofibers.

In some cases, the outer fabric is a polymer, e.g., polyamide, fabric made from the polymer compositions described herein.

As noted above, the outer layer is designed to isolate the filtered area, which may require exposure to moisture. It is therefore desirable that the outer layer be composed of a relatively hydrophilic and/or hygroscopic material. A polymer of increased hydrophilicity and/or hygroscopy may better attract and hold moisture to which the filter structure is exposed. As discussed below, improved (e.g., increased) hydrophilicity and/or hygroscopy may be accomplished by utilizing the polymer compositions described herein. Thus, it is particularly beneficial to form the outer layer (e.g., the outer fabric) from a disclosed polymer composition.

In addition, because the outer layer is designed to isolate the filtered area, it is desirable that the outer layer exhibit AM/AV properties. During use, the outer layer may be the layer most exposed to the environment. Furthermore, the outer layer may be exposed to microbes and/or viruses (e.g., on surfaces or other objects) before or after use. Thus, it is particularly beneficial to form the outer layer (e.g., the outer fabric or a fiber thereof) from an AM/AV polymer compositions as described herein.

In some cases, one of the layers, e.g., the outer layer comprises a nonwoven fabric that is electrically charged. As noted herein polyamide fabric filtration will differ from that of conventional polyolefin (polypropylene) fabrics, e.g., based on its hydrophilic properties, which contributes to viral inactivation. Polypropylene fabrics/filtration often employ charged polypropylene media. The synergistic benefits of the aforementioned AM/AV fabrics in combination with such polyolefin fabrics is contemplated. As is the use of such charged fabrics in the disclosed masks/filters.

For example, a layer, e.g., the outer layer may be an electrically charged layer and may be employed in conjunction with the other aforementioned layers. In some cases, an electrically charged layer may be made of polypropylene. In some cases, the layer may have an average fiber diameter less than 15 microns and a basis weight of 15-20 g/m². In some embodiments, the layer may comprise melt spun PA6,6. In some cases, the layer may comprise a meltblown nonwoven fabric comprising electrically charged polypropylene and having an average fiber diameter less than 15 microns and a basis weight of 20-25 g/m² or a basis weight of 30-35 g/m². In some cases, the layer may comprise a two-ply meltblown nonwoven fabric comprising electrically charged polypropylene and having an average fiber diameter less than 15 microns and a basis weight of 25-30 g/m².

Third Layer

The disclosed filter structures include a third layer (e.g., a filter layer), which may comprise a third fabric. Generally, the third layer is designed to filter air and/or liquid that passes through the mask/filter structure. Said another way, the third layer isolates, traps, and/or otherwise removes a particulate (e.g., a dust, pollen, mold, or a pathogen). As such, the third layer filters or purifies the air and/or liquid passing through the mask/filter structure. In some cases, the third layer be constructed of AM/AV fibers and/or fabrics, and as such, may impart AM/AV capabilities thereto. As a result, the third layer may prevent transmission of pathogens from contact that otherwise would allow the pathogen to spread or to pass through the mask to the wearer.

The composition of the third layer (e.g., the composition of the third fabric and/or the fibers thereof) may vary widely. In some embodiments, the third fabric and/or the fibers thereof are made from and/or comprises the polymer composition described herein. In some cases, the third fabric comprises a polyamide polymer made from the polyamide compositions described herein. And due to the AM/AV compound in these polymer compositions, the third layer may have AM/AV properties.

The third layer and/or the third fabric are composed of a plurality of fibers. The fibers of the third layer may have any diameter suitable for its intended uses. In some embodiments, the third layer comprises a plurality of microfibers (e.g., fibers having a diameter greater than or equal to 1 micron). In some embodiments, the third layer comprises a plurality of nanofibers (e.g., fibers having a diameter less than 1 micron). In some embodiments, the third layer comprises both microfibers and nanofibers.

In some embodiments, the third layer comprises a plurality of fibers having an average fiber diameter less than 1 micron, e.g., less than 0.9 microns, less than 0.8 microns, less than 0.7 microns, less than 0.6 microns, less than 0.5 microns, less than 0.4 microns, less than 0.3 microns, less than 0.2 microns, less than 0.1 microns, less than 0.05 microns, less than 0.04 microns, or less than 0.03 microns. In terms of lower limits, the average fiber diameter of the plurality of fibers may be greater than 1 nanometer, e.g., greater than 10 nanometers, greater than 25 nanometers, or greater than 50 nanometers. In terms of ranges, the average fiber diameter of the plurality of fibers may be from 1 nanometer to 1 micron, e.g., from 1 nanometer to 0.9 microns, from 1 nanometer to 0.8 microns, from 1 nanometer to 0.7 microns, from 1 nanometer to 0.6 microns, from 1 nanometer to 0.5 microns, from 1 nanometer to 0.4 microns, from 1 nanometer to 0.3 microns, from 1 nanometer to 0.2 microns, from 1 nanometer to 0.1 microns, from 1 nanometer to 0.05 microns, from 1 nanometer to 0.04 microns, from 1 nanometer to 0.03 microns, from 10 nanometers to 1 micron, from 10 nanometers to 0.9 microns, from 10 nanometers to 0.8 microns, from 10 nanometers to 0.7 microns, from 10 nanometers to 0.6 microns, from 10 nanometers to 0.5 microns, from 10 nanometers to 0.4 microns, from 10 nanometers to 0.3 microns, from 10 nanometers to 0.2 microns, from 10 nanometers to 0.1 microns, from 10 nanometers to 0.05 microns, from 10 nanometers to 0.04 microns, from 10 nanometers to 0.03 microns, from 25 nanometers to 1 micron, from 25 nanometers to 0.9 microns, from 25 nanometers to 0.8 microns, from 25 nanometers to 0.7 microns, from 25 nanometers to 0.6 microns, from 25 nanometers to 0.5 microns, from 25 nanometers to 0.4 microns, from 25 nanometers to 0.3 microns, from 25 nanometers to 0.2 microns, from 25 nanometers to 0.1 microns, from 25 nanometers to 0.05 microns, from 25 nanometers to 0.04 microns, from 25 nanometers to 0.03 microns, from 50 nanometers to 1 micron, from 50 nanometers to 0.9 microns, from 50 nanometers to 0.8 microns, from 50 nanometers to 0.7 microns, from 50 nanometers to 0.6 microns, from 50 nanometers to 0.5 microns, from 50 nanometers to 0.4 microns, from 50 nanometers to 0.3 microns, from 50 nanometers to 0.2 microns, from 50 nanometers to 0.1 microns, from 50 nanometers to 0.05 microns, from 50 nanometers to 0.04 microns, or from 50 nanometers to 0.03 microns. In some cases, fibers of this size may be referred to as nanofibers.

In some embodiments, the third layer comprises a plurality of fibers having an average fiber diameter less than 25 microns, e.g., less than 20 microns, less than 15 microns, less than 10 microns, or less than 5 microns. In terms of lower limits, the plurality of fibers may have an average fiber diameter greater than 1 micron, e.g., greater than 1.5 microns, greater than 2 microns, or greater than 2.5 microns. In terms of ranges, the plurality of fibers may have an average fiber diameter from 1 micron to 25 microns, e.g., from 1 micron to 20 microns, from 1 micron to 15 microns, from 1 micron to 10 microns, from 1 micron to 5 microns, from 1.5 microns to 25 microns, from 1.5 microns to 20 microns, from 1.5 microns to 15 microns, from 1.5 microns to 10 microns, from 1.5 microns to 5 microns, from 2 microns to 25 microns, from 2 microns to 20 microns, from 2 microns to 15 microns, from 2 microns to 10 microns, from 2 microns to 5 microns, from 2.5 microns to 25 microns, from 2.5 microns to 20 microns, from 2.5 microns to 15 microns, from 2.5 microns to 10 microns, or from 2.5 microns to 5 microns. In some cases, fibers of this size may be referred to as microfibers.

The basis weight of the third layer may vary widely. In one embodiment, the third layer has a basis weight from 2 $g/m^2$ to 100 $g/m^2$, e.g., from 2 $g/m^2$ to 40 $g/m^2$, from 2 $g/m^2$ to 50 $g/m^2$, from 5 $g/m^2$ to 30 $g/m^2$, from 5 $g/m^2$ to 20 $g/m^2$, from 5 $g/m^2$ to 15 $g/m^2$, from 7 $g/m^2$ to 20 $g/m^2$, from 7 $g/m^2$ to 13 $g/m^2$, from 10 $g/m^2$ to 50 $g/m^2$, from 10 $g/m^2$ to 48 $g/m^2$, from 10 $g/m^2$ to 46 $g/m^2$, from 10 $g/m^2$ to 44 $g/m^2$, from 10 $g/m^2$ to 42 $g/m^2$, 11 $g/m^2$ to 50 $g/m^2$, from 11 $g/m^2$ to 48 $g/m^2$, from 11 $g/m^2$ to 46 $g/m^2$, from 11 $g/m^2$ to 44 $g/m^2$, from 11 $g/m^2$ to 42 $g/m^2$, 12 $g/m^2$ to 50 $g/m^2$, from 12 $g/m^2$ to 48 $g/m^2$, from 12 $g/m^2$ to 46 $g/m^2$, from 12 $g/m^2$ to 44 $g/m^2$, from 12 $g/m^2$ to 42 $g/m^2$, 13 $g/m^2$ to 50 $g/m^2$, from 13 $g/m^2$ to 48 $g/m^2$, from 13 $g/m^2$ to 46 $g/m^2$, from 13 $g/m^2$ to 44 $g/m^2$, from 13 $g/m^2$ to 42 $g/m^2$, 14 $g/m^2$ to 50 $g/m^2$, from 14 $g/m^2$ to 48 $g/m^2$, from 14 $g/m^2$ to 46 $g/m^2$, from 14 $g/m^2$ to 44 $g/m^2$, from 14 $g/m^2$ to 42 $g/m^2$, from 15 $g/m^2$ to 40 $g/m^2$ from 70 $g/m^2$ to 90 $g/m^2$, from 50 $g/m^2$ to 100 $g/m^2$, or from 80 $g/m^2$ to 90 $g/m^2$.

In terms of lower limits, the basis weight of the third layer (e.g., of the third polyamide fabric) may be greater than 2 $g/m^2$, e.g., greater than 3 $g/m^2$, greater than 5 $g/m^2$, greater than 7 $g/m^2$, greater than 8 $g/m^2$, greater than 10 $g/m^2$, greater than 11 $g/m^2$, greater than 12 $g/m^2$, greater than 13 $g/m^2$, greater than 14 $g/m^2$, or greater than 15 $g/m^2$. In terms of upper limits, the basis weight of the third layer (e.g., of the third polyamide fabric) may be less than 100 $g/m^2$, e.g., less than 90 $g/m^2$, less than 80 $g/m^2$, less than 70 $g/m^2$, less than 60 $g/m^2$, less than 50 $g/m^2$, less than 48 $g/m^2$, less than 46 $g/m^2$, less than 44 $g/m^2$, less than 42 $g/m^2$, less than 40 $g/m^2$, less than 35 $g/m^2$, less than 30 $g/m^2$, less than 25 $g/m^2$, less than 20 $g/m^2$, less than 15 $g/m^2$, less than 13 $g/m^2$, or less than 8 $g/m^2$. In some cases, the basis weight of the third layer (e.g., of the third polyamide fabric) may be about 15 $g/m^2$, about 16 $g/m^2$, about 17 $g/m^2$, about 18 $g/m^2$, about 19 $g/m^2$, about 20 $g/m^2$, about 21 $g/m^2$, about 22 $g/m^2$, about 23 $g/m^2$, about 24 $g/m^2$, about 25 $g/m^2$, about 26 $g/m^2$, about 27 $g/m^2$, about 28 $g/m^2$, 29 $g/m^2$, about 30 $g/m^2$, about 31 $g/m^2$, about 32 $g/m^2$, about 33 $g/m^2$, about 34 $g/m^2$, about 35 $g/m^2$, about 36 $g/m^2$, about 37 $g/m^2$, about 38 $g/m^2$, about 39 $g/m^2$, about 40 $g/m^2$, about 41 $g/m^2$, about 42 $g/m^2$, about 43 $g/m^2$, about 44 $g/m^2$, or about 45 $g/m^2$ or a basis weight therebetween.

In some embodiments, the basis weight of the third layer may be from 5 $g/m^2$ to 35 $g/m^2$, e.g., from 5 $g/m^2$ to 30 $g/m^2$, from 5 $g/m^2$ to 25 $g/m^2$, 6 $g/m^2$ to 35 $g/m^2$, from 6 $g/m^2$ to 30 $g/m^2$, from 6 $g/m^2$ to 25 $g/m^2$, 7 $g/m^2$ to 35 $g/m^2$, from 7 $g/m^2$ to 30 $g/m^2$, from 7 $g/m^2$ to 25 $g/m^2$, 8 $g/m^2$ to 35 $g/m^2$, from 8 $g/m^2$ to 30 $g/m^2$, from 8 $g/m^2$ to 25 $g/m^2$, 9 $g/m^2$ to 35 $g/m^2$, from 9 $g/m^2$ to 30 $g/m^2$, from 9 $g/m^2$ to 25 $g/m^2$, or from 10 $g/m^2$ to 20 $g/m^2$.

In some cases, the third layer comprises two or more sub-layers. Each sub-layer may comprise a fabric as described with regard to the third layer generally (e.g., the composition, fiber diameter, and basis weight described above). In some cases, the sub-layers comprise the same fabric. In some cases, the sub-layers comprise different fabrics. In one embodiment, the third layer comprises multiple sublayers, for example, a combination of melt blown fabric layers and/or spunbond layers.

In some cases, the third outer layer comprises an N95 mask, e.g., a conventional or commercial N95 mask. In some embodiments, the N95 mask may comprise two spunbond polypropylene layers; a spunlace polyethylene terephthalate layer; a spunlace polyester/cellulose blend, and two meltblown polypropylene layers. Other combinations of these layers are contemplated. The ranges and limits above apply to multiple third layers, not just to a single third layer.

As noted above, the third layer isolates, traps, and/or otherwise removes a particulate, such as a pathogen. In some cases, the third layer may also inhibit the activity of a pathogen. For example, the third layer may demonstrate antimicrobial properties, which may include any antimicrobial effect. In some embodiments, for example, the third layer limits, reduces, or inhibits infection of a microbe, e.g., a bacterium or bacteria. In some embodiments, the third layer isolates and/or traps the microbe and also limits, reduces, or inhibits growth and/or kills the microbe. As a result, the filter structure as a whole may exhibit antimicrobial properties and limit, reduce, or inhibit further microbial infection.

The pathogenic activity inhibited by the third layer may be that of a virus. Said another way, the third layer may demonstrate antiviral properties, which may include any antiviral effect. In some embodiments, for example, the third layer limits, reduces, or inhibits infection and/or pathogenesis of a virus. In some embodiments, the third layer isolates and/or traps the virus and also limits, reduces, or inhibits infection and/or pathogenesis of the virus. As a result, the filter structure as a whole may exhibit antiviral properties and limit, reduce, or inhibit further viral infection. The other layers may have similar AM/AV properties.

In some cases, the third layer has little or no electric charge. The same may be true for the first and/or third layers. Conventional filter or mask configurations utilize electrospun fabrics, which do contain charge. This charge contributes to significant static decay problems. Advantageously, in some embodiments, the layers of the present disclosure are made from non-electrospinning methods, e.g., melt blowing, and the resultant fibers have little or no charge. The other layers may have similar electrical properties.

In some cases, the some of the aforementioned benefits may be the result of an electrostatic charge of the fibers. For example, the plurality of fibers may have electric charge (e.g., a positive electric charge and/or a negative electric charge) and/or dipole polarization (e.g., one or more of the fibers may be an electret).

In some cases, the antimicrobial and/or antiviral activity of the third layer is the result of the composition of the fibers. For example, the plurality of fibers of the third layer may be composed of the antimicrobial and/or antiviral polymeric compositions described herein.

In some cases, the third fabric is a polymer, e.g., polyamide, fabric made from the polymer compositions described herein.

As noted above, the third layer is designed to filter air and/or liquid that passes through the filter structure. In particular, the plurality of fibers of the third layer (as well as the first layer and/or the third layer) may demonstrate antimicrobial and/or antiviral activity. The use of a hydrophilic and/or hygroscopic polymer may increase or support the antimicrobial and/or antiviral properties of the third layer (or the other layers). It is theorized that a polymer of increased hydrophilicity and/or hygroscopy both may better attract liquid media that carry microbials and/or viruses, e.g., saliva or mucous, and may also absorb more moisture (e.g., from the air or breath) and that the increased moisture content allows the polymer composition and the antimicrobial/antiviral agent to more readily limit, reduce, or inhibit infection and/or pathogenesis of a microbe or virus. For example, the moisture may dissolve an outer layer (e.g., capsid) of a virus, exposing the genetic material (e.g., DNA or RNA) of the virus.

It is therefore desirable that the third layer be composed of a relatively hydrophilic and/or hygroscopic material. A polymer of increased hydrophilicity and/or hygroscopy may better attract and hold moisture to which to the filter structure is exposed. As discussed below, improved (e.g., increased) hydrophilicity and/or hygroscopy may be accomplished by utilizing the polymer compositions described herein. Thus, it is particularly beneficial to form the third layer from a disclosed polymer composition.

Further Layers

Some embodiments of the filter structures described herein may include additional layers. In some cases, one or more additional layers are added to improve one or performance characteristics of the filter structure (e.g., filtration efficiency). In some cases, one or more additional layers are added to improve suitability for a final use. For example, one or more additional layers may be added to provide comfort and/or improved fit to the user of a facemask formed from the filter structure.

In some embodiments, the filter structure comprises one or more additional filter layers adjacent to the second layer of the filter structure. In some embodiments, the additional filter layer(s) is substantially contiguous with the outer layer of the filter structure. The composition of the additional filter layer is not particularly limited, and any composition and structure described above with respect to the second layer may be utilized.

In some cases, one or more of the layers comprises two or more sub-layers. Each sub-layer may comprise a fabric as described with regard to the layers generally (e.g., the composition, fiber diameter, and basis weight described above). In some cases, the sub-layers comprise the same fabric. In some cases, the sub-layers comprise different fabrics. In one embodiment, the second layer comprises multiple sublayers, for example, a combination of melt blown fabric layers and/or spunbond layers.

In some cases, the third layer is a two-ply layer in that it comprises two layers (e.g., at least two layers). Each of the two layers may be structured and/or composed as described above. Each layer of the two-ply second layer may be structurally and/or compositionally identical, or the layers may structurally and/or compositionally differ.

Said another way, in some embodiments, the filter structure comprises four layers: a face layer (e.g., an inner layer), an outer layer, a third layer (e.g., a filter layer), and a fourth layer (e.g., another filter layer).

In some embodiments, the filter structure comprises an additional scrim layer. The scrim layer may be a woven, nonwoven, or knit fabric adjacent on an outer surface and/or inner surface of the filter structure. The composition of the additional scrim layer is not particularly limited, and any composition and structure described above with respect to the first layer may be utilized. In some cases, the filter structure may comprise an additional scrim layer on the surface of the first layer opposite the second layer (e.g., the first layer may be sandwiched between the scrim layer and the second layer). In some cases, the filter structure may comprise an additional scrim layer on the surface of the third layer opposite the second layer (e.g., the third layer may be sandwiched between second layer and the scrim layer). In some cases, the filter structure may comprise an additional scrim layer on both the surface of the first layer opposite the second layer and the surface of the third layer opposite the second layer.

In some cases, the filter structure, e.g., the mask, may comprise an indicator. The indicator may be used to indicate expiration, temperature exposure, and/or sterility. The indicator may change appearance, when a trigger condition takes place. The mechanism of the indicator may vary widely. Exemplary mechanisms include dye diffusion, color change, chemical reaction ($CO_2$ or redox), and/or electrochemical. In some embodiments, the indicator may be in the form of a sticker. In some embodiments, the indicator may be in the form of a token, a visual cue, an insignia. This listing is not all inclusive and other indicators are contemplated.

Physical Characteristics

As noted, each layer of the filter structure may benefit from increased hydrophilicity and/or hygroscopy. Each of the first layer, second layer, and third layer may benefit from increased hydrophilicity and/or hygroscopy. In some embodiments, the first layer, the second layer, and/or the third layer demonstrates relatively high hydrophilicity and/or hygroscopy.

In some cases, the hydrophilicity and/or hygroscopy of a given layer of the filter structure (e.g., of the first layer, the second layer, and/or the third layer) may be measured by saturation.

In some cases, the hydrophilicity and/or hygroscopy of a given layer of the filter structure (e.g., of the first layer, the second layer, and/or the third layer) may be measured by the amount of water it can absorb (as a percentage of total weight). In some embodiments, the layer is capable of absorbing greater than 1.5 wt. % water, based on the total weight of the polymer, e.g., greater than 2.0 wt. %, greater than 3.0%, greater than 5.0 wt. %, greater than 7.0 wt. %, greater than 10.0 wt. %, or greater than 25.0 wt. %. In terms of ranges, the hydrophilic and/or hygroscopic polymer may be capable of absorbing water in an amount ranging from 1.5 wt. % to 50.0 wt. %, e.g., from 1.5 wt. % to 14.0 wt. %, from 1.5 wt. % to 9.0 wt. %, from 2.0 wt. % to 8 wt. %, from 2.0 wt. % to 7 w %, from 2.5 wt. % to 7 wt. %, or from 1.5 wt. % to 25.0 wt. %.

In some cases, the hydrophilicity and/or the hygroscopy of a given layer of the filter structure (e.g., of the first layer, the second layer, and/or the third layer) may be measured by the water contact angle of the layer. The water contact angle is the angle formed by the interface of a surface of the layer (e.g., of the first layer, the second layer, or the third layer). Preferably, the contact angle of the layer is measured while the layer is flat (e.g., substantially flat).

In some embodiments, a layer of the filter structure (e.g., the first layer, the second layer, and/or the third layer) demonstrates a water contact angle less than 90°, e.g., less than 85°, less than 80°, or less than 75°. In terms of lower limits, the water contact angle of a layer of the filter structure may be greater than 10°, e.g., greater than 20°, greater than 30°, or greater than 40°. In terms of ranges, the water contact angle of a layer of the filter structure may be from 10° to 90°, e.g., from 10° to 85°, from 10° to 80°, from 10° to 75°, from 20° to 90°, from 20° to 85°, from 20° to 80°, from 20° to 75°, from 30° to 90°, from 30° to 85°, from 30° to 80°, from 30° to 75°, from 40° to 90°, from 40° to 85°, from 40° to 80°, or from 40° to 75°.

As noted, the increased hydrophilicity and/or hygroscopy of filter structure (e.g., of a given layer of the polymer structure) may be the result of a polymer composition from which the layer is formed. The polymer compositions described herein, for example, demonstrate increased hydrophilicity and/or hygroscopy and are therefore particularly suitable for the disclosed filter structure.

In some embodiments, a polymer may be specially prepared to impart increased hydrophilicity and/or hygroscopy. For example, an increase in hygroscopy may be achieved in the selection and/or modification the polymer. In some embodiments, the polymer may be a common polymer, e.g., a common polyamide, which has been modified to increase hygroscopy. In these embodiments, a functional endgroup modification on the polymer may increase hygroscopy. For example, the polymer may be PA6,6, which has been modified to include a functional endgroup that increases hygroscopy.

Performance Characteristics

The performance of the filter structures described herein may be assessed using a variety of conventional metrics. For example, the performance characteristics of the filter structure may be described by reference to fluid resistance, particulate filtration efficiency, bacterial filtration efficiency, breathability, and flammability. As discussed above, these characteristics are often used in rating the effectiveness of a filter structure, e.g., by NIOSH and ASTM International.

Fluid resistance measures the ability of a filter structure to minimize the amount of fluid that could transfer from the outer layers through to the inner layer as the result of a splash or spray. In particular, fluid resistance measure the fluid pressure that the filter structure can withstand. ASTM International specifies testing with synthetic blood at pressures of 80, 120, or 160 mm Hg to qualify for low, medium, or high fluid resistance. These pressures correlate to blood pressure: 80 mm Hg correlates to venous blood pressure, 120 mm Hg correlates to arterial pressure, and 160 mm Hg correlates to potential high pressures that may occur during trauma, or surgeries that include high pressure irrigation such as orthopedic procedures.

In some embodiments, the filter structure demonstrates a fluid resistance greater than 50 mm Hg, e.g., greater than 60 mm Hg, greater than 70 mm Hg, greater than 80 mm Hg, greater than 90 mm Hg, greater than 100 mm Hg, greater than 110 mm Hg, greater than 120 m Hg, greater than 130 mm Hg, greater than 140 mm Hg, greater than 150 mm Hg, greater than 160 mm Hg, greater than 170 mm Hg, greater than 180 mm Hg, greater than 190 mm Hg, or greater than 200. In terms of upper limits, the filter structure may demonstrate a fluid resistance less than 500 mm Hg, e.g., less than 450 mm Hg, less than 400 mm Hg, less than 350 mm Hg, less than 300 mm Hg, or less than 250.

In some cases, the filter structure may demonstrate a fluid resistance from 50 mm Hg to 500 mm Hg, e.g., from 50 mm Hg to 100 mm Hg, from 50 mm Hg to 120 mm Hg, from 75 mm Hg to 100 mm Hg, from 75 mm Hg to 120 mm Hg, from 75 mm Hg to 150 mm Hg, from 100 mm Hg to 150 mm Hg, from 100 mm Hg to 175 mm Hg, from 100 mm Hg to 200 mm Hg, from 100 mm Hg to 225 mm Hg, from 150 mm Hg to 200 mm Hg, from 150 mm Hg to 225 mm Hg, or from 150 mm Hg to 250 mm Hg.

Particulate filtration efficiency (or "PFE") measures how well a filter structure traps or isolates sub-micron particles. Generally, PFE is considered relevant to the effectiveness of a filter structure in trapping or isolating viruses. In particular, PFE measures a percentage of particles that are trapped or isolated by the filter structure. ASTM International specifies that a particle size of 0.1 micron be used.

In some embodiments, the filter structure demonstrates a PFE greater than 89.5%, e.g., greater than 90%, greater than 91%, greater than 92%, greater than 93%, greater than 94%, greater than 95%, greater than 97%, greater than 98%, greater than 99%, greater than 99.5%, greater than 99.9%, or greater than 99.99%.

In some embodiments, the filter structure demonstrates a PFE of about 90%, about 91%, about 92%, about 93%, about 94%, about 95%, about 95.5%, about 96%, about 96.5%, about 97%, about 97.5%, about 98%, about 98.5%, about 99%, about 99.2%, about 99.3%, about 99.4%, about 99.5%, about 99.8%, about 99.9%, about 99.95%, or about 99.99%, or any percentage therebetween.

Bacterial filtration efficiency (or "BFE") measures how well the filter structure traps or isolates bacteria when exposed to a bacteria-containing aerosol. As with PFE, BFE measures a percentage of bacteria that trapped or isolated by the filter structure. ASTM International specifies testing with a droplet size of 3.0 microns containing Staph. aureus (average size 0.6-0.8 microns). To be used in a surgical or medical setting, a filter structure typically must demonstrate a BFE of at least 95%. Moderate and high protection masks have bacterial filtration rates of 98% to greater than 99%.

In some embodiments, the filter structure demonstrates a BFE greater than 90%, e.g., greater than 92%, greater than 93%, greater than 94%, greater than 95%, greater than 97%, greater than 98%, greater than 99%, greater than 99.5%, greater than 99.9%, or greater than 99.99%. In terms upper limits, the filter structure may demonstrate a BFE less than 100%, e.g., less than 99.999%, less than 99.995%, less than 99.99%, or less than 99.95%.

In some embodiments, the filter structure demonstrates a BFE of about 90%, about 91%, about 92%, about 93%, about 94%, about 95%, about 95.5%, about 96%, about 96.5%, about 97%, about 97.5%, about 98%, about 98.5%, about 99%, about 99.2%, about 99.3%, about 99.4%, about 99.5%, about 99.8%, about 99.9%, about 99.95%, or about 99.99%, or any percentage therebetween.

Breathability is often reported by measuring a pressure differential (delta P). The pressure differential measures the air flow resistance of the filter structure by driving a controlled flow of air through the filter structure and determining the pressure on either side of the filter structure. In some cases, e.g., when EN14683 is utilized, the difference in pressure is measured and divided by the surface area (cm$^2$) of the filter structure tested. In other cases, however, the pressure is not divided by the surface area. A higher pressure differential generally indicates that the mask is less breathable (e.g., a facemask comprising a filter structure having a higher pressure differential would be more difficult for a user to breathe through).

In conventional filter structure (and facemasks) higher filtration efficiency (e.g., high BFE and/or high PFE) requires a relatively pressure differential. That is, conventional filter structures with high filtration efficiency exhibit low breathability. For example, conventional N95 facemasks are typical uncomfortable, e.g., due to difficulty of the user to breathe. Surprisingly, the filter structures (and facemasks) described herein demonstrate both high filtration efficiency and low pressure differential. This allows facemasks formed from the filter structures to maintain high breathability without sacrificing effectiveness. This also provides for more comfortable facemasks.

In some embodiments, the filter structure demonstrate a pressure differential from 2 mm $H_2O/cm^2$ to 15 mm $H_2O/cm^2$, as measured utilizing EN14683, e.g., from 2 mm $H_2O/cm^2$ to 12 mm $H_2O/cm^2$, from 2 mm $H_2O/cm^2$ to 10 mm $H_2O/cm^2$, from 2 mm $H_2O/cm^2$ to 9 mm $H_2O/cm^2$, from 2 mm $H_2O/cm^2$ to 8 mm $H_2O/cm^2$, from 3 mm $H_2O/cm^2$ to 15 mm $H_2O/cm^2$, from 3 mm $H_2O/cm^2$ to 12 mm $H_2O/cm^2$, from 3 mm $H_2O/cm^2$ to 10 mm $H_2O/cm^2$, from 3 mm $H_2O/cm^2$ to 9 mm $H_2O/cm^2$, from 3 mm $H_2O/cm^2$ to 8 mm $H_2O/cm^2$, from 4 mm $H_2O/cm^2$ to 15 mm $H_2O/cm^2$, from 4 mm $H_2O/cm^2$ to 12 mm $H_2O/cm^2$, from 4 mm $H_2O/cm^2$ to 10 mm $H_2O/cm^2$, from 4 mm $H_2O/cm^2$ to 9 mm $H_2O/cm^2$, from 4 mm $H_2O/cm^2$ to 8 mm $H_2O/cm^2$, from 5 mm $H_2O/cm^2$ to 15 mm $H_2O/cm^2$, from 5 mm $H_2O/cm^2$ to 12 mm $H_2O/cm^2$, from 5 mm $H_2O/cm^2$ to 10 mm $H_2O/cm^2$, from 5 mm $H_2O/cm^2$ to 9 mm $H_2O/cm^2$, from 5 mm $H_2O/cm^2$ to 8 mm $H_2O/cm^2$, from 6 mm $H_2O/cm^2$ to 15 mm $H_2O/cm^2$, from 6 mm $H_2O/cm^2$ to 12 mm $H_2O/cm^2$, from 6 mm $H_2O/cm^2$ to 10 mm $H_2O/cm^2$, from 6 mm $H_2O/cm^2$ to 9 mm $H_2O/cm^2$, or from 6 mm $H_2O/cm^2$ to 8 mm $H_2O/cm^2$. In terms of lower limits, the filter structure may demonstrate a pressure differential greater than 2 mm $H_2O/cm^2$, e.g., greater than 3 mm $H_2O/cm^2$, greater than 4 mm $H_2O/cm^2$, greater than 5 mm $H_2O/cm^2$, or greater than 6 mm $H_2O/cm^2$. In terms of upper limits, the filter structure may demonstrate a pressure differential less than 15 mm $H_2O/cm^2$, e.g., less than 12 mm $H_2O/cm^2$, less than 10 mm $H_2O/cm^2$, less than 9 mm $H_2O/cm^2$, or less than 8 mm $H_2O/cm^2$.

In some cases, the filter structure may demonstrate a pressure differential of about 2 mm $H_2O/cm^2$, about 2.5 mm $H_2O/cm^2$, about 3 mm $H_2O/cm^2$, about 3.5 mm $H_2O/cm^2$, about 4 mm $H_2O/cm^2$, about 4.5 mm $H_2O/cm^2$, about 5 mm $H_2O/cm^2$, about 5.5 mm $H_2O/cm^2$, about 6 mm $H_2O/cm^2$, about 6.5 mm $H_2O/cm^2$, or 7 about mm $H_2O/cm^2$, or any point therebetween.

Because a filter structure may be exposed to high temperatures or flammable materials, it is desirable the filter structure be tested for flame resistance. For example, the flame resistance of the filter structure may be measured as a part of testing according to ASTM F2100 (incorporated herein by reference). In some embodiments, the filter structures described herein qualify as Class I according to the flame spread test ASTM F2100.

Exemplary Configurations

The filter structure of the present disclosure may comprise any combination of the first layer, the second layer, and (optionally) the third layer, described above. By way of example and without limiting the scope of the disclosure, several configurations are described herein.

In one embodiment, the filter structure comprises a first layer, a second layer, and a third layer. The first layer comprises a spunbond nonwoven fabric formed from PA6,6 and having an average fiber diameter of 30 to 50 microns and a basis weight of 15 to 20 $g/m^2$. The second layer comprises a meltblown nonwoven fabric comprising electrically charged polypropylene and having an average fiber diameter less than 15 microns and a basis weight of 15-20 $g/m^2$. The third layer comprises a spunbond nonwoven fabric formed from PA6,6 and having an average fiber diameter of 30 to 50 microns and a basis weight of 25 to 35 $g/m^2$.

In one embodiment, the filter structure comprises a first layer, a second layer, and a third layer. The first layer comprises a spunbond nonwoven fabric formed from PA6,6 and having an average fiber diameter of 30 to 50 microns and a basis weight of 15 to 20 $g/m^2$. The second layer comprises a plurality polyamide nanofibers having an average fiber diameter less than 1 micron and a basis weight of about 18 $g/m^2$. The third layer comprises a spunbond nonwoven fabric formed from PA6,6 and having an average fiber diameter of 30 to 50 microns and a basis weight of 25 to 35 $g/m^2$.

In one embodiment, the filter structure comprises a first layer, a second layer, and a third layer. The first layer comprises a spunbond nonwoven fabric formed from PA6,6 and having an average fiber diameter of 30 to 50 microns and a basis weight of 15 to 20 $g/m^2$. The second layer comprises a meltblown nonwoven fabric comprising electrically charged polypropylene and having an average fiber diameter less than 15 microns and a basis weight of 20-25 $g/m^2$. The third layer comprises a spunbond nonwoven fabric formed from PA6,6 and having an average fiber diameter of 30 to 50 microns and a basis weight of 25 to 35 $g/m^2$.

In one embodiment, the filter structure comprises a first layer, a second layer, and a third layer. The first layer comprises melt spun PA6,6 having an average fiber diameter of 1 to 5 microns and a basis weight of 15 to 20 $g/m^2$. The second layer comprises a plurality polyamide nanofibers having an average fiber diameter of less than 1 microns and a basis weight of about 22 $g/m^2$. The third layer comprises a spunbond nonwoven fabric formed from PA6,6 and having an average fiber diameter of 30 to 50 microns and a basis weight of 25 to 35 $g/m^2$.

In one embodiment, the filter structure comprises a first layer, a second layer, and a third layer. The first layer comprises a spunbond nonwoven fabric formed from PA6,6 and having an average fiber diameter of 30 to 50 microns and a basis weight of 15 to 20 $g/m^2$. The second layer comprises a meltblown nonwoven fabric comprising electrically charged polypropylene and having an average fiber diameter less than 15 microns and a basis weight of 30-35 $g/m^2$. The third layer comprises a spunbond nonwoven fabric formed from PA6,6 and having an average fiber diameter of 30 to 50 microns and a basis weight of 25 to 35 $g/m^2$.

In one embodiment, the filter structure comprises a first layer, a second layer, and a third layer. The first layer comprises melt spun PA6,6 having an average fiber diameter of 30 to 50 microns and a basis weight of 10 to 15 $g/m^2$. The second layer comprises a meltblown nonwoven fabric comprising electrically charged polypropylene and having an average fiber diameter less than 15 microns and a basis weight of 30-35 $g/m^2$. The third layer comprises melt spun PA6,6 having an average fiber diameter of 1 to 5 microns and a basis weight of 15 to 20 $g/m^2$.

In one embodiment, the filter structure comprises a first layer, a second layer, and a third layer. The first layer comprises melt spun PA6,6 having an average fiber diameter of 1 to 5 microns and a basis weight of 10 to 15 $g/m^2$. The second layer comprises a plurality polyamide nanofibers having an average fiber diameter less than 1 micron and a basis weight of about 33 $g/m^2$. The third layer comprises a spunbond nonwoven fabric formed from PA6,6 and having an average fiber diameter of 30 to 50 microns and a basis weight of 25 to 35 $g/m^2$.

In one embodiment, the filter structure comprises a first layer, a second layer, and a third layer. The first layer comprises melt spun PA6,6 having an average fiber diameter of 1 to 5 microns and a basis weight of 10 to 15 g/m². The second layer comprises a plurality polyamide nanofibers having an average fiber diameter less than 1 micron and a basis weight of about 33 g/m². The third layer comprises melt spun PA6,6 having an average fiber diameter of 1 to 5 microns and a basis weight of 15 to 20 g/m².

In one embodiment, the filter structure comprises a first layer, a second layer, and a third layer. The first layer comprises a spunbond nonwoven fabric formed from PA6,6 and having an average fiber diameter of 30 to 50 microns and a basis weight of 15 to 20 g/m². The second layer comprises two-ply meltblown nonwoven fabric comprising electrically charged polypropylene and having an average fiber diameter less than 15 microns and a basis weight of 25-30 g/m². The third layer comprises a spunbond nonwoven fabric formed from PA6,6 and having an average fiber diameter of 30 to 50 microns and a basis weight of 25 to 35 g/m².

In one embodiment, the filter structure comprises a first layer, a second layer, and a third layer. The first layer comprises melt spun PA6,6 having an average fiber diameter of 1 to 5 microns and a basis weight of 10 to 15 g/m². The second layer comprises a two-ply meltblown nonwoven fabric comprising electrically charged polypropylene and having an average fiber diameter less than 15 microns and a basis weight of 25-30 g/m². The third layer comprises a spunbond nonwoven fabric formed from PA6,6 and having an average fiber diameter of 30 to 50 microns and a basis weight of 25 to 35 g/m².

In one embodiment, the filter structure comprises a first layer, a second layer, and a third layer. The first layer comprises melt spun PA6,6 having an average fiber diameter of 1 to 5 microns and a basis weight of 10 to 15 g/m². The second layer comprises a two-ply meltblown nonwoven fabric comprising electrically charged polypropylene and having an average fiber diameter less than 15 microns and a basis weight of 25-30 g/m². The third layer comprises melt spun PA6,6 having an average fiber diameter of 1 to 5 microns and a basis weight of 15 to 20 g/m².

In one embodiment, the filter structure comprises a first layer, a second layer, a third layer, and a fourth layer. The first layer comprises a fabric, formed from polypropylene (optionally being spunbond) and having a basis weight of 20-30 g/m² (e.g., about 25 g/m²). Both the second layer and the third layer comprise a plurality of nanofibers formed from a polymer composition (e.g., a polyamide composition) as described herein (optionally being meltblown) and having a basis weight of 5-15 g/m² (e.g., about 10 g/m²). The fourth layer comprises a fabric, formed from polypropylene (optionally being spunbond) and having a basis weight of 20-30 g/m² (e.g., about 25 g/m²).

In one embodiment, the filter structure comprises a first layer, a second layer, a third layer, and a fourth layer. The first layer comprises a fabric, formed from a polymer composition (e.g., a polyamide composition) as described herein (optionally being spunbond) and having a basis weight of 15-25 g/m² (e.g., about 20 g/m²). The second layer and the third layer each comprise a plurality of nanofibers formed from a polymer composition (e.g., a polyamide composition) as described herein (optionally being meltblown) and having a basis weight of 5-15 g/m² (e.g., about 10 g/m²). The fourth layer comprises a fabric, formed from a polymer composition (e.g., a polyamide composition) as described herein (optionally being spunbond) and having a basis weight of 30-40 g/m² (e.g., about 34 g/m²).

In one embodiment, the filter structure comprises a first layer, a second layer, and a third layer. The first layer comprises a first fabric, formed from a polymer composition (e.g., a polyamide composition) as described herein (optionally being meltblown) and having a basis weight of 5-10 g/m² (e.g., about 8 g/m²). The second layer comprises a conventional N95 filter structure. The third layer comprises a third fabric, formed from a polymer composition (e.g., a polyamide composition) as described herein (optionally being meltblown) and having a basis weight of 5-15 g/m² (e.g., about 10 g/m²).

In one embodiment, the filter structure comprises a first layer, a second layer, and a third layer. The first layer comprises a first fabric, formed from a polymer composition (e.g., a polyamide composition) as described herein (optionally being meltblown) and having a basis weight of 5-10 g/m² (e.g., about 8 g/m²). The second layer comprises a conventional N95 filter structure. The third layer comprises a third fabric, formed from a polymer composition (e.g., a polyamide composition) as described herein (optionally being meltblown) and having a basis weight of 5-15 g/m² (e.g., about 11 g/m²).

In one embodiment, the filter structure comprises a first layer, a second layer, and a third layer. The first layer comprises a first fabric, formed from a polymer composition (e.g., a polyamide composition) as described herein (optionally being spunbond) and having a basis weight of 15-25 g/m² (e.g., about 20 g/m²). The second layer comprises a conventional N95 filter structure. The third layer comprises a third fabric, formed from a polymer composition (e.g., a polyamide composition) as described herein (optionally being spunbond) and having a basis weight of 15-25 g/m² (e.g., about 20 g/m²).

By way of further example, several configurations are illustrated in the following table.

Exemplary Configurations

| Face Layer | Third Layer | Outer Layer |
|---|---|---|
| Spunbond polypropylene | Meltblown polypropylene | Spunbond polypropylene |
| Spunbond polypropylene | Polyamide nanofiber; Spunbond polyamide (10 g/m²) | Spunbond polypropylene |
| Spunbond e polypropylen | Polyethylene terephthalate/cellulose | Spunbond polypropylene |
| Spunbond polypropylene | Polyamide nanofiber; Meltblown polypropylene | Spunbond e polypropylen |
| Spunbond polypropylene | Polyamide nanofiber; Spunbond polyamide (10 g/m²) | Spunbond polypropylene |
| Spunbond polypropylene | Polyamide nanofiber; Spunbound polyamide (34 g/m²) | Spunbond polypropylene |
| Spunbond polypropylene (34 g/m²) | Polyamide nanofiber | Spunbond e polypropylen |
| Spunbond polypropylene | Polyamide nanofiber; Spunbond polyamide (10 g/m²) | Spunbond polyamide (34 g/m²) |
| Spunbond polypropylene | Polyamide nanofiber; Spunbond polyamide (34 g/m²) | Spunbond polyamide (34 g/m²) |
| Spunbond polypropylene | Polyamide nanofiber | Spunbond polyamide (34 g/m²) |
| Spunbond polyamide (34 g/m²) | Polyamide nanofiber | Spunbond polyamide (34 g/m²) |
| Spunbond polyamide | Polyamide nanofiber | Spunbond polyamide |

| Face Layer | Third Layer | Outer Layer |
|---|---|---|
| (34 g/m²) Spunbond polyamide | Spunbond polyamide (10 g/m²) Polyamide nanofiber; | (34 g/m²) Spunbond polyamide |
| (34 g/m²) Spunbond polyamide | Spunbond polyamide (10 g/m²) Polyamide nanofiber | (34 g/m²) Spunbond polyamide |
| (34 g/m²) | | (34 g/m²) |

By way of further examples, several configurations are illustrated in the following table. In the table below, "SB" indicates a spunbond polymer composition, "MB" indicates a meltblown polymer composition, "PP" indicates polypropylene, "PA" indicates a polyamide composition as described herein, and "gsm" means grams per square meter. Furthermore, "nano" indicates that the layer comprises a plurality of nanofibers of the disclosed polymer composition, and "micro" indicates that the layer comprises a plurality of microfibers of the disclosed polymer composition.

Exemplary Configurations

| Face Layer | Third Layer | Fourth Layer | Outer Layer |
|---|---|---|---|
| SB PP, 25 gsm | MB PP, 28 gsm | MB PP, 28 gsm | SB PP, 25 gsm |
| SB PP, 25 gsm | MB PA nano, 10 gsm | MB PA nano, 10 gsm | SB PP, 25 gsm |
| SB PP, 25 gsm | SB/MB PP, 25 gsm | SB/MB PP, 25 gsm | SB PP, 25 gsm |
| SB PP, 25 gsm | MB PA nano, 10 gsm | SB PP, 28 gsm | SB PP, 25 gsm |
| SB/MB PP, 25 gsm | MB PA nano, 10 gsm | SB PP, 28 gsm | SB/MB PP, 25 gsm |
| SB PP, 25 gsm | MB PP, 28 gsm | MB PP, 28 gsm | SB PP, 34 gsm |
| SB PA, 20 gsm | MB PP, 28 gsm | MB PP, 28 gsm | SB PP, 25 gsm |
| SB PA, 20 gsm | MB PP, 28 gsm | MB PP, 28 gsm | SB PA, 34 gsm |
| MB PA nano, 10 gsm | MB PP, 28 gsm | MB PP, 28 gsm | MB PA nano, 10 gsm |
| SB PA, 20 gsm | MB PA nano, 10 gsm | MB PA nano, 10 gsm | SB PA, 34 gsm |
| MB PA nano, 8 gsm | Conventional N95 | — | MB PA nano, 10 gsm |
| MB PA micro, 8 gsm | Conventional N95 | — | MB PA micro, 11 gsm |
| SB PA, 20 gsm | Conventional N95 | — | SB PA, 20 gsm |
| SB PA, 20 gsm | MB PA6,6 nano 10 gsm | MB PA6,6 nano 10 gsm | SB PA, 34 gsm |
| SB PA, 20 gsm | MB PA-6,12 nano 10 gsm | MB PA-6,12 nano 10 gsm | SB PA, 34 gsm |
| SB PA, 20 gsm | Conventional N95 | — | MB PA micro, 10 gsm |
| SB PA, 20 gsm | Conventional N95 | — | MB PA micro, 10 gsm |
| SB PP, 25 gsm | MB PA6,6 nano 8.2 gsm | — | SB PP, 25 gsm |
| SB PP, 25 gsm | MB PA6,6 nano 11.1 gsm | — | SB PP, 25 gsm |
| SB PA, 20 gsm | MB PA nano 10 gsm | — | SB PA, 34 gsm |
| SB PA, 20 gsm | MB PA micro 18 gsm | — | SB PA, 34 gsm |
| SB PA, 20 gsm | MB PA-6,12 nano on SB PA scrim, 34 gsm | n/a | SB PA, 34 gsm |

Figure 2:
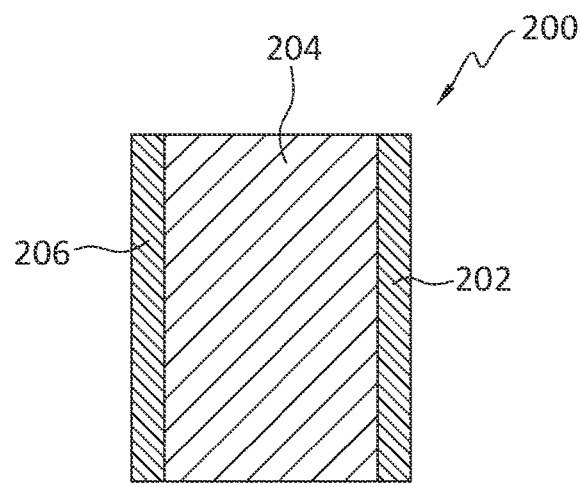
FIG. 2 illustrates a configuration of a filter structure according to the present disclosure.
Figure 3:
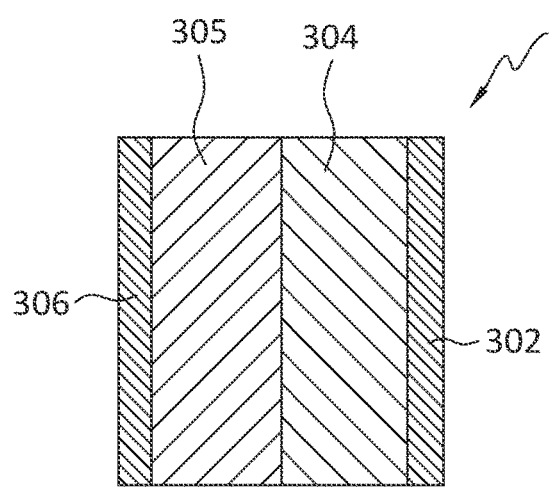
FIG. 3 illustrates a configuration of a filter structure according to the present disclosure.
Figure 4:
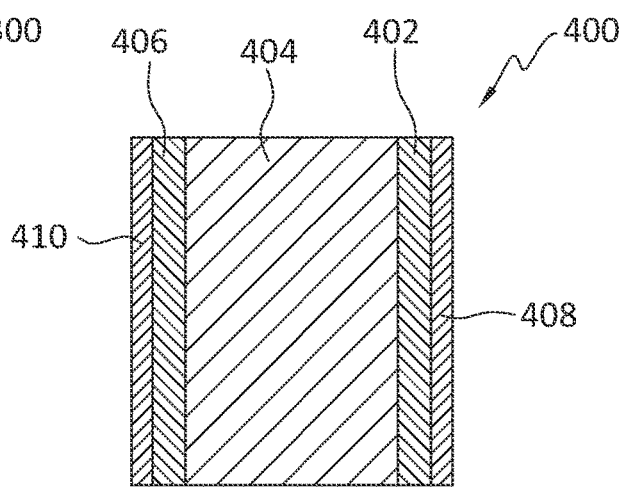
FIG. 4 illustrates a configuration of a filter structure according to the present disclosure.

By way of further examples, several configurations are illustrated in the drawings. FIG. 1 illustrates the configuration of a filter structure 100 having a first layer 102, a second layer 104, and a third layer 106. FIG. 2 illustrates the configuration of a filter structure 200 having a first layer 202, a second layer 204 and a third layer 206, wherein the first layer 202 and the third layer 206 are composed of the same material. FIG. 3 illustrates the configuration of a filter structure 300 having a first layer 302, a second layer 304, third layer 306, and an additional filter layer 305 disposed between the second layer 304 and the third layer 306. FIG. 4 illustrates the configuration of a filter structure 400 having a first layer 402, a second layer 404, a third layer 406, a first scrim layer 408 adjacent to the first layer 402 and a second scrim layer 410 adjacent to the third layer 406.

Facemask

The present disclosure also relates to facemasks having antimicrobial and/or antiviral properties. In particular, the present disclosure provides facemasks that include one or more filter structures as described herein. As discussed above, facemasks are designed to protect a user from inhalable hazards, including particulate matter and airborne pathogens (e.g., bacteria and/or viruses). Facemasks prepared using the filter structures of the present disclosure by utilized in a variety of industries, including healthcare, pharmaceuticals, construction, mining, defense, public safety, oil and gas production, industrial manufacture, agriculture, power generation, and textiles.

In some embodiments, a facemask comprises a filter structure (as described) and some means for affixing or securing the filter structure to the user. Any conventional means for affixing the filter structure may be used. For example, the filter structure may be secured to the wearer with loops (e.g., ear loops), ties, or straps (e.g., elastomeric straps, fabric straps).

Because facemasks are designed to be worn on the skin of the user, facemasks are often tested to ensure that the composition, material, or design is not harmful to the user. For example, a facemask may be tested to assess in vitro cytotoxicity of the materials (e.g., according to ISO 10993-5:2009) and/or to assess the potential of the materials to produce skin irritation (e.g., according to ISO 10993-10: 2010). In some embodiments, the facemask of the disclosure adequately passes such testing.

In some embodiments, the described filter structures, and therefore the facemasks formed therefrom, demonstrate antimicrobial and/or antiviral properties. In particular, the antimicrobial and/or antiviral properties may be the result of forming the filter structure (and facemask) from the polymer composition described herein. As discussed in further detail below, the polymer compositions exhibit a relatively high metal retention rate. As a result, the filter structures (and facemasks) formed from the polymer composition may demonstrate permanent (e.g., near-permanent) antimicrobial and/or antiviral properties. In particular, the metal retention rate may allow the facemask to be washed and/or reused without reduced effectiveness (e.g., without reduced antimicrobial and/or antiviral properties). This is a marked improvement over conventional facemasks, which typically lose antimicrobial and/or antiviral effect with time (e.g., as a result of static decay).

Antimicrobial/Antiviral Activity

As has been noted, in some embodiments, the filter structures, and the facemasks formed therefrom, may demonstrate AM/AV activity. In some cases, the AM/AV activity may be the result of the polymer composition from which the filter structure or the layers/fabrics thereof or the fibers thereof are formed. For example, the AM/AV activity may be the result of forming the filter structure from a polymer composition described herein.

In some embodiments, at least one of the first layer, the second layer, or the third layer demonstrates AM/AV activity. In some embodiments, a combination of the layers demonstrates AM/AV activity. In some embodiments, the entire filter structure demonstrates AM/AV properties.

In some embodiments, the filter structures, and the facemasks formed therefrom, exhibit permanent, e.g., near permanent, AM/AV properties. Said another way, the AM/AV properties of the polymer composition last for a prolonged period of time, e.g., longer than one or more day, longer than one or more week, longer than one or more month, or longer than one or more years.

The AM/AV properties may include any antimicrobial effect. In some embodiments, for example, the antimicrobial properties of the filter structure include limiting, reducing, or inhibiting infection of a microbe, e.g., a bacterium or bacteria. In some embodiments, the antimicrobial properties of the filter structure include limiting, reducing, or inhibiting growth and/or killing a bacterium. In some cases, the filter structure may limit, reduce, or inhibit both infection and growth of a bacterium.

The bacterium or bacteria affected by the antimicrobial properties of the filter structure are not particularly limited. In some embodiments, for example, the bacterium is a *Streptococcus* bacterium (e.g., *Streptococcus pneumonia, Streptococcus pyogenes*), a *Staphylococcus* bacterium (e.g., *Staphylococcus aureus*, Methicillin-resistant *Staphylococcus aureus* (MRSA)), a *Peptostreptococcus* bacterium (e.g., *Peptostreptococcus anaerobius, Peptostreptococcus asaccharolyticus*), a coli bacterium (e.g., *Escherichia coli*), or a *Mycobacterium* bacterium, (e.g., *Mycobacterium tuberculosis*), a *Mycoplasma* bacterium (e.g., *Mycoplasma adleri, Mycoplasma agalactiae, Mycoplasma agassizii, Mycoplasma amphoriforme, Mycoplasma fermentans, Mycoplasma genitalium, Mycoplasma haemofelis, Mycoplasma hominis, Mycoplasma hyopneumoniae, Mycoplasma hyorhinis, Mycoplasma pneumoniae*). In some embodiments, the antimicrobial properties include limiting, reducing, or inhibiting the infection or pathogenesis of multiple bacteria, e.g., a combination of two or more bacteria from the above list.

The antimicrobial activity of the filter structure (or a facemask formed therefrom) may be measured by the standard procedure defined by ISO 20743:2013. This procedure measures antimicrobial activity by determining the percentage of a given bacterium or bacteria, e.g. *Staphylococcus aureus*, inhibited by a tested fiber. In one embodiment, the filter structure inhibits the growth (growth reduction) of *S. aureus* in an amount ranging from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%. In terms of lower limits, the filter structure may inhibit greater than 60% growth of *S. aureus*, e.g., greater than 65%, greater than 70%, greater than 75%, greater than 80%, greater than 85%, greater than 90%, greater than 95%, greater than 98%, greater than 99%, greater than 99.9%, greater than 99.99%, greater than 99.999%, greater than 99.9999%, greater than 99.99999%, or greater than 99.999999%.

*Klebsiella pneumoniae* efficacy may also be determined using the aforementioned tests. In some embodiments, a product formed from the polymer composition inhibits the growth (growth reduction) of *Klebsiella pneumoniae*, as measured by the test mentioned above. *Escherichia coli* may be determined using ASTM E3160 (2018). The ranges and limits for Staph *Aureus* are applicable to *Escherichia coli* and/or *Klebsiella pneumoniae* and/or SARS-CoV-2 as well.

Efficacy may be characterized in terms of log reduction.

In terms of *Escherichia coli* log reduction, the composition/fibers/fabrics may be determined via ASTM 3160 (2018) and may demonstrate a coli log reduction greater than 1.5, e.g., greater than 2.0, greater than 2.15, greater than 2.5, greater than 2.7, greater than 3.0, greater than 3.3, greater than 4.0, greater than 4.1, greater than 5.0, or greater than 6.0.

In terms of Staph *Aureus* log reduction, the composition/fibers/fabrics may be determined via ISO 20743:2013 and may demonstrate a microbial log reduction greater than 1.5, e.g., greater than 2.0, greater than 2.5, greater than 2.7, greater than 3.0, greater than 4.0, greater than 5.0, or greater than 6.0.

In terms of *Klebsiella pneumoniae* log reduction, the composition/fibers/fabrics may be determined via ISO 20743:2013 and may demonstrate a microbial log reduction greater than 1.5, e.g., greater than 2.0, greater than 2.5, greater than 2.6, greater than 3.0, greater than 4.0, greater than 5.0, or greater than 6.0.

In terms of SARS-CoV-2 log reduction, the composition/fibers/fabrics may be determined via ISO 18184:2019 and may demonstrate a viral log reduction greater than 1.5, e.g., greater than 2.0, greater than 2.5, greater than 2.6, greater than 1.7, greater than 3.0, greater than 4.0, greater than 5.0, or greater than 6.0.

The AM/AV properties may include any antiviral effect. In some embodiments, for example, the antiviral properties of the filter structure include limiting, reducing, or inhibiting infection of a virus. In some embodiments, the antiviral properties of the filter structure include limiting, reducing, or inhibiting pathogenesis of a virus. In some cases, the polymer composition may limit, reduce, or inhibit both infection and pathogenesis of a virus.

The virus affected by the antiviral properties of the filter structure is not particularly limited. In some embodiments, for example, the virus is an adenovirus, a herpesvirus, an ebolavirus, a poxvirus, a rhinovirus, a coxsackievirus, an arterivirus, an enterovirus, a morbillivirus, a coronavirus, an influenza A virus, an avian influenza virus, a swine-origin influenza virus, or an equine influence virus. In some embodiments, the antiviral properties include limiting, reducing, or inhibiting the infection or pathogenesis of one of virus, e.g., a virus from the above list. In some embodiments, the antiviral properties include limiting, reducing, or inhibiting the infection or pathogenesis of multiple viruses, e.g., a combination of two or more viruses from the above list.

In some cases, the virus is a coronavirus, e.g., severe acute respiratory syndrome coronavirus (SARS-CoV), Middle East respiratory syndrome coronavirus (MERS-CoV), or severe acute respiratory syndrome coronavirus 2 (SARS-CoV-2) (e.g., the coronavirus that causes COVID-19). In some cases, the virus is structurally related to a coronavirus.

In some cases, the virus is an influenza virus, such as an influenza A virus, an influenza B virus, an influenza C virus, or an influenza D virus, or a structurally related virus. In some cases, the virus is identified by an influenza A virus subtype, e.g., H1N1, H1N2, H2N2, H2N3, H3N1, H3N2, H3N8, H5N1, H5N2, H5N3, H5N6, H5N8, H5N9, H6N1, H7N1, H7N4, H7N7, H7N9, H9N2, or H10N7.

In some cases, the virus is a bacteriophage, such as a linear or circular single-stranded DNA virus (e.g., phi X 174 (sometimes referred to as ΦX174)), a linear or circular double-stranded DNA, a linear or circular single-stranded RNA, or a linear or circular double-stranded RNA. In some cases, the antiviral properties of the polymer composition may be measured by testing using a bacteriophage, e.g., phi X 174.

In some cases, the virus is an ebolavirus, e.g., Bundibugyo ebolavirus (BDBV), Reston ebolavirus (RESTV), Sudan ebolavirus (SUDV), Taï Forest ebolavirus (TAFV), or Zaire ebolavirus (EBOV). In some cases, the virus is structurally related to an ebolavirus.

The antiviral activity may be measured by a variety of conventional methods. For example, ISO 18184:2019 may be utilized to assess the antiviral activity. In one embodiment, the filter structure (or facemask formed therefrom) inhibits the pathogenesis (e.g., growth) of a virus in an amount ranging from 60% to 100%, e.g., from 60% to 99.999999%, from 60% to 99.99999%, from 60% to 99.9999%, from 60% to 99.999% from 60% to 99.999%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.999%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%. In terms of lower limits, a filter structure may inhibit greater than 60% of pathogenesis of the virus, e.g., greater than 65%, greater than 70%, greater than 75%, greater than 80%, greater than 85%, greater than 90%, greater than 95%, greater than 98%, greater than 99%, greater than 99.9%, greater than 99.99%, greater than 99.999%, greater than 99.9999%, greater than 99.99999%, or greater than 99.999999%.

In addition, the use of the polymer compositions disclosed herein provides for biocompatibility advantages. For example, the overall softness of the aforementioned fabrics, along with the compositional characteristics, provides for unexpected reductions in irritation and sensitivity. Beneficially, the disclosed fibers and fabric do not demonstrate the biocompatibility issues associated with conventional fabrics, e.g., those that employ metals with toxicity problems such as silver. For example, the various AM/AV mask configurations demonstrate passing results with regard to irritation and sensitization, as tested in accordance with ISO 10993-10 and 10993-12.

Antimicrobial and/or Antiviral Polymer Composition

As noted above, the filter structures and facemasks of the present disclosure may comprise polymer compositions that beneficially exhibit antimicrobial and/or antiviral properties. For example, the first layer (e.g., the first fabric), the second layer (e.g., the plurality of nanofibers and/or microfibers), and/or the third layer (e.g., the third fabric) may be made from and/or may comprise an antimicrobial/antiviral polymer composition as described herein.

Polymer compositions suitable for use in the filter structures and facemasks described herein generally comprise a polymer and one or more AM/AV compounds, e.g., metals (e.g., metallic compounds). In some embodiments, the polymer compositions comprise a polymer, zinc (provided to the composition via a zinc compound), and/or phosphorus (provided to the composition via a phosphorus compound). In some embodiments, the polymer compositions comprise a polymer, copper (provided to the composition via a copper compound), and phosphorus (provided to the composition via a phosphorus compound).

Exemplary polymer compositions are disclosed in U.S. patent application Ser. No. 17/192,491, filed Mar. 4, 2021, and U.S. patent application Ser. No. 17/192,533, filed on Mar. 4, 2021, both of which are incorporated herein by reference.

As discussed below, the polymer compositions described herein demonstrate antiviral properties. Further, the disclosed compositions may be used in the preparation of a variety of products. For example, the polymer compositions described herein may be formed into high-contact products (e.g., products handled by users). The products formed from the polymer compositions similarly demonstrate antiviral properties. Thus, the disclosed compositions may be used in the preparation of a variety of antiviral products.

Polymer

The polymer composition comprises a polymer, which, in some embodiments, is a polymer suitable for producing fibers and fabrics. In one embodiment, the polymer composition comprises a polymer in an amount ranging from 50 wt. % to 100 wt. %, e.g., from 50 wt. % to 99.99 wt. %, from 50 wt. % to 99.9 wt. %, from 50 wt. % to 99 wt. % from 55 wt. % to 100 wt. %, from 55 wt. % to 99.99 wt. %, from 55 wt. % to 99.9 wt. %, from 55 wt. % to 99 wt. %, from 60 wt. % to 100 wt. %, from 60 wt. % to 99.99 wt. %, from 60 wt. % to 99.9 wt. %, from 60 wt. % to 99 wt. %, from 65 wt. % to 100 wt. %, from 65 wt. % to 99.99 wt. %, from 65 wt. % to 99.9 wt. %, or from 65 wt. % to 99 wt. %. In terms of upper limits, the polymer composition may comprise less than 100 wt. % of the polymer, e.g., less than 99.99 wt. %, less than 99.9 wt. %, or less than 99 wt. %. In terms of lower limits, the polymer composition may comprise greater than 50 wt. % of the polymer, e.g., greater than 55 wt. %, greater than 60 wt. %, or greater than 65 wt. %.

The polymer of the polymer composition may vary widely. The polymer may include but is not limited to, a thermoplastic polymer, polyester, nylon, rayon, polyamide 6, polyamide 6,6, polyethylene (PE), polypropylene (PP), polyethylene terephthalate (PET), polyethylene terephthalate glycol (PETG), co-PET, polybutylene terephthalate (PBT) polylactic acid (PLA), and polytrimethylene terephthalate (PTT). In some embodiments, the polymer composition may comprise PET, for its strength, longevity during washing, ability to be made permanent press, and ability to be blended with other fibers. In some embodiments, the polymer may be PA6,6. In some cases, nylon is known to be a stronger fiber than PET and exhibits a non-drip burning characteristic that is beneficial, e.g., in military or automotive textile applications, and is more hydrophilic than PET. The polymer used in the present disclosure can be a polyamide, polyether amide, polyether ester or polyether urethane or a mixture thereof.

In some cases, the polymer compositions may comprise polyethylene. Suitable examples of polyethylene include linear low-density polyethylene (LLDPE), low-density polyethylene (LDPE), medium-density polyethylene (MDPE), high-density polyethylene (HDPE), and ultra-high-molecular-weight polyethylene (UHMWPE).

In some cases, the polymer compositions may comprise polycarbonate (PC). For example, the polymer composition may comprise a blend of polycarbonate with other polymers, e.g., a blend of polycarbonate and acrylonitrile butadiene styrene (PC-ABS), a blend of polycarbonate and polyvinyl toluene (PC-PVT), a blend of polycarbonate and polybutylene terephthalate (PC-PBT), a blend of polycarbonate and polyethylene terephthalate (PC-PET), or combinations thereof.

In some cases, the polymer composition may comprise polyamides. Common polyamides include nylons and aramids. For example, the polyamide may comprise PA-4T/4I; PA-4T/6I; PA-5T/5I; PA-6; PA6,6; PA6,6/6; PA6,6/6T; PA-6T/6I; PA-6T/6I/6; PA-6T/6; PA-6T/6I/66; PA-6T/MPMDT (where MPMDT is polyamide based on a mixture of hexamethylene diamine and 2-methylpentamethylene diamine as the diamine component and terephthalic acid as the diacid component); PA-6T/66; PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6116; PA-6T/6I/12; and copolymers, blends, mixtures and/or other combinations thereof. Additional suitable polyamides, additives, and other components are disclosed in U.S. patent application Ser. No. 16/003,528.

The polymer composition may, in some embodiments, comprise a combination of polyamides. By combining various polyamides, the final composition may be able to incorporate the desirable properties, e.g., mechanical properties, of each constituent polyamides. For example, in some embodiments, the polyamide comprises a combination of PA-6, PA6,6, and PA6,6/6T. In these embodiments, the polyamide may comprise from 1 wt. % to 99 wt. % PA-6, from 30 wt. % to 99 wt. % PA6,6, and from 1 wt. % to 99 wt. % PA6,6/6T. In some embodiments, the polyamide comprises one or more of PA-6, PA6,6, and PA6,6/6T. In some aspects, the polymer composition comprises 6 wt. % of PA-6 and 94 wt. % of PA6,6. In some aspects, the polymer composition comprises copolymers or blends of any of the polyamides mentioned herein.

The polymer composition may also comprise polyamides produced through the ring-opening polymerization or polycondensation, including the copolymerization and/or copolycondensation, of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. In those embodiments, the polymer comprises at least 10 wt. % caprolactam, e.g., at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. %. In some embodiments, the polymer includes from 10 wt. % to 60 wt. % of caprolactam, e.g., from 15 wt. % to 55 wt. %, from 20 wt. % to 50 wt. %, from 25 wt. % to 45 wt. %, or from 30 wt. % to 40 wt. %. In some embodiments, the polymer comprises less than 60 wt. % caprolactam, e.g., less than 55 wt. %, less than 50 wt. %, less than 45 wt. %, less than 40 wt. %, less than 35 wt. %, less than 30 wt. %, less than 25 wt. %, less than 20 wt. %, or less than 15 wt. %. Furthermore, the polymer composition may comprise the polyamides produced through the copolymerization of a lactam with a nylon, for example, the product of the copolymerization of a caprolactam with PA6,6.

In some aspects, the polymer can formed by conventional polymerization of the polymer composition in which an aqueous solution of at least one diamine-carboxylic acid salt is heated to remove water and effect polymerization to form an antiviral nylon. This aqueous solution is preferably a mixture which includes at least one polyamide-forming salt in combination with the specific amounts of a zinc compound, a copper compound, and/or a phosphorus compound described herein to produce a polymer composition. Conventional polyamide salts are formed by reaction of diamines with dicarboxylic acids with the resulting salt providing the monomer. In some embodiments, a preferred polyamide-forming salt is hexamethylenediamine adipate (nylon 6,6 salt) formed by the reaction of equimolar amounts of hexamethylenediamine and adipic acid.

Metallic Compounds

As noted above, the polymer composition may include one or more AM/AV compounds, which may be in the form of a metallic compound. In some embodiments, the polymer composition includes zinc (e.g., in a zinc compound), phosphorus (e.g., in a zinc compound), copper (e.g., in a copper compound), silver (e.g., in a silver compound), or combinations thereof. As used herein, a metallic compound refers to a compound having at least one metal molecule or ion (e.g., a "zinc compound" refers to a compound having at least one zinc molecule or ion).

Some conventional polymer compositions, fibers and fabrics utilize AM/AV compounds to inhibit viruses and other pathogens. For example, some fabrics may include antimicrobial additives, e.g., silver, coated or applied as a film on an exterior surface. However, it has been found that these treatments or coatings often present a host of problems. For example, the coated additives may extract out of the fibers/fabric during dyeing or washing processes, which adversely affects the antimicrobial and/or antiviral properties. As it relates to conventional masks and filters, while in constant use, some coatings, e.g., silver, may contribute to health and/or even environmental problems. In contrast to conventional formulations, the polymer compositions disclosed herein comprise a unique combination of AM/AV compounds (e.g., metallic compounds) rather than simply coating the AM/AV compounds on a surface. Stated another way, the polymer composition may have certain amounts of a metallic compound embedded in the polymer matrix such that the polymer composition retains AM/AV properties during and after dyeing and/or washing.

In one embodiment, AM/AV compounds can be added as a masterbatch. The masterbatch may include a polyamide such as nylon 6 or nylon 6,6. Other masterbatch compositions are contemplated.

The polymer composition may comprise metallic compounds, e.g., a metal or a metallic compound, dispersed within the polymer composition. In one embodiment, the polymer composition comprises metallic compounds in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, from 200 wppm to 3000 wppm, from 200 wppm to 2000 wppm, from 200 wppm to 1000 wppm, or from 200 wppm to 500 wppm.

In terms of lower limits, the polymer composition may comprise greater than 5 wppm metallic compounds, e.g., greater than 10 wppm, greater than 50 wppm, greater than 100 wppm, greater than 200 wppm, or greater than 300 wppm. In terms of upper limits, the polymer composition may comprise less than 20,000 wppm metallic compounds, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, or less than 500 wppm. As noted above, the metallic compounds are preferably embedded in the polymer formed from the polymer composition.

As noted above, the polymer composition includes zinc in a zinc compound and phosphorus in a phosphorus compound, preferably in specific amounts in the polymer composition, to provide the aforementioned structural and antiviral benefits. As used herein, "zinc compound" refers to a compound having at least one zinc molecule or ion (likewise for copper compounds). As used herein, "phosphorus compound" refers to a compound having at least one phosphorus molecule or ion. Zinc content may be indicated by zinc or zinc ion (the same is true for copper). The ranges and limits may be employed for zinc content and for zinc ion content, and for other metal content, e.g., copper content. The calculation of zinc ion content based on zinc or zinc compound can be made by the skilled chemist, and such calculations and adjustments are contemplated.

The inventors have found that the use of specific zinc compounds (and the zinc contained therein) and phosphorus compounds (and the phosphorus contained therein) at specific molar ratios minimizes the negative effects of the zinc compound on the polymer composition. For example, too much zinc compound in the polymer composition can lead to decreased polymer viscosity and inefficiencies in production processes.

The polymer composition may comprise zinc (e.g., in a zinc compound or as zinc ion), e.g., zinc or a zinc compound, dispersed within the polymer composition. In one embodiment, the polymer composition comprises zinc in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, 5000 wppm to 20000 wppm, from 200 wppm to 3000 wppm, from 200 wppm to 2000 wppm, from 200 wppm to 1000 wppm, from 200 wppm to 500 wppm, from 10 wppm to 900 wppm, from 200 wppm to 900 wppm, from 425 wppm to 600 wppm, from 425 wppm to 525 wppm, from 350 wppm to 600 wppm, from 375 wppm to 600 wppm, from 375 wppm to 525 wppm, from 480 wppm to 600 wppm, from 480 wppm to 525 wppm, from 600 wppm to 750 wppm, or from 600 wppm to 700 wppm.

In terms of lower limits, the polymer composition may comprise greater than 5 wppm of zinc, e.g., greater than 10 wppm, greater than 50 wppm, greater than 100 wppm, greater than 200 wppm, greater than 300 wppm, greater than 350 wppm, greater than 375 wppm, greater than 400 wppm, greater than 425 wppm, greater than 480 wppm, greater than 500 wppm, or greater than 600 wppm.

In terms of upper limits, the polymer composition may comprise less than 20,000 wppm of zinc, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, less than 500 wppm, less than 400 wppm, less than 330 wppm, less than 300. In some aspects, the zinc compound is embedded in the polymer formed from the polymer composition.

The ranges and limits are applicable to both zinc in elemental or ionic form and to zinc compound. The same is true for other ranges and limits disclosed herein relating to other metals, e.g., copper. For example, the ranges may relate to the amount of zinc ions dispersed in the polymer.

The zinc of the polymer composition is present in or provided via a zinc compound, which may vary widely. The zinc compound may comprise zinc oxide, zinc ammonium adipate, zinc acetate, zinc ammonium carbonate, zinc stearate, zinc phenyl phosphinic acid, or zinc pyrithione, or combinations thereof. In some embodiments, the zinc compound comprises zinc oxide, zinc ammonium adipate, zinc acetate, or zinc pyrithione, or combinations thereof. In some embodiments, the zinc compound comprises zinc oxide, zinc stearate, or zinc ammonium adipate, or combinations thereof. In some aspects, the zinc is provided in the form of zinc oxide. In some aspects, the zinc is not provided via zinc phenyl phosphinate and/or zinc phenyl phosphonate.

The inventors have also found that the polymer compositions surprisingly may benefit from the use of specific zinc compounds. In particular, the use of zinc compounds prone to forming ionic zinc (e.g., $Zn^{2+}$) may increase the antiviral properties of the polymer composition. It is theorized that the ionic zinc disrupts the replicative cycle of the virus. For example, the ionic zinc may interfere with (e.g., inhibit) viral protease or polymerase activity. Further discussion of the effect of ionic zinc on viral activity is found in Velthuis et al., *Zn Inhibits Coronavirus and Arterivirus RNA Polymerase Activity In Vitro and Zinc Ionophores Block the Replication of These Viruses in Cell Culture*, PLoS Pathogens (November 2010), which is incorporated herein by reference.

The amount of the zinc compound present in the polymer compositions may be discussed in relation to the ionic zinc content. In one embodiment, the polymer composition comprises ionic zinc, e.g., $Zn^{2+}$, in an amount ranging from 1 wppm to 30,000 wppm, e.g., from 1 wppm to 25,000 wppm, from 1 wppm to 20,000 wppm, from 1 wppm to 15,000 wppm, from 1 wppm to 10,000 wppm, from 1 wppm to 5,000 wppm, from 1 wppm to 2,500 wppm, from 50 wppm to 30,000 wppm, from 50 wppm to 25,000 wppm, from 50 wppm to 20,000 wppm, from 50 wppm to 15,000 wppm, from 50 wppm to 10,000 wppm, from 50 wppm to 5,000 wppm, from 50 wppm to 2,500 wppm, from 100 wppm to 30,000 wppm, from 100 wppm to 25,000 wppm, from 100 wppm to 20,000 wppm, from 100 wppm to 15,000 wppm, from 100 wppm to 10,000 wppm, from 100 wppm to 5,000 wppm, from 100 wppm to 2,500 wppm, from 150 wppm to 30,000 wppm, from 150 wppm to 25,000 wppm, from 150 wppm to 20,000 wppm, from 150 wppm to 15,000 wppm, from 150 wppm to 10,000 wppm, from 150 wppm to 5,000 wppm, from 150 wppm to 2,500 wppm, from 250 wppm to 30,000 wppm, from 250 wppm to 25,000 wppm, from 250 wppm to 20,000 wppm, from 250 wppm to 15,000 wppm, from 250 wppm to 10,000 wppm, from 250 wppm to 5,000 wppm, or from 250 wppm to 2,500 wppm. In some cases, the ranges and limits mentioned above for zinc may also be applicable to ionic zinc content.

In some cases, the use of zinc provides for processing and or end use benefits. Other antiviral agents, e.g., copper or silver, may be used, but these often include adverse effects (e.g., on the relative viscosity of the polymer composition, toxicity, and health or environmental risk). In some situations, the zinc does not have adverse effects on the relative viscosity of the polymer composition. Also, the zinc, unlike other antiviral agents, e.g., silver, does not present toxicity issues (and in fact may provide health advantages, such as immune system support). In addition, as noted herein, the use of zinc provides for the reduction or elimination of leaching into other media and/or into the environment. This both prevents the risks associated with introducing zinc into the environment and allows the polymer composition to be reused—zinc provides surprising "green" advantages over conventional, e.g., silver-containing, compositions.

As noted above, the polymer composition, in some embodiments, includes copper (provided via a copper compound). As used herein, "copper compound" refers to a compound having at least one copper molecule or ion.

In some cases, the copper compound may improve, e.g., enhance the antiviral properties of the polymer composition. In some cases, the copper compound may affect other characteristics of the polymer composition, e.g., antimicrobial activity or physical characteristics.

The polymer composition may comprise copper (e.g., in a copper compound), e.g., copper or a copper compound, dispersed within the polymer composition. In one embodiment, the polymer composition comprises copper in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 5 wppm to 100 wppm, from 5 wppm to 50 wppm, from 5 wppm to 35 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, from 200 wppm to 3000 wppm, from 200 wppm to 2000 wppm, from 200 wppm to 1000 wppm, or from 200 wppm to 500 wppm.

In terms of lower limits, the polymer composition may comprise greater than 5 wppm of copper, e.g., greater than 10 wppm, greater than 50 wppm, greater than 100 wppm, greater than 200 wppm, or greater than 300 wppm. In terms of upper limits, the polymer composition may comprise less than 20,000 wppm of copper, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, less than 500 wppm less than 100 wppm, less than 50 wppm, less than 35 wppm. In some aspects, the copper compound is embedded in the polymer formed from the polymer composition.

The composition of the copper compound is not particularly limited. Suitable copper compounds include copper iodide, copper bromide, copper chloride, copper fluoride, copper oxide, copper stearate, copper ammonium adipate, copper acetate, or copper pyrithione, or combinations thereof. The copper compound may comprise copper oxide, copper ammonium adipate, copper acetate, copper ammonium carbonate, copper stearate, copper phenyl phosphinic acid, or copper pyrithione, or combinations thereof. In some embodiments, the copper compound comprises copper oxide, copper ammonium adipate, copper acetate, or copper pyrithione, or combinations thereof. In some embodiments, the copper compound comprises copper oxide, copper stearate, or copper ammonium adipate, or combinations thereof. In some aspects, the copper is provided in the form of copper oxide. In some aspects, the copper is not provided via copper phenyl phosphinate and/or copper phenyl phosphonate.

In some cases, the polymer composition includes silver (optionally provided via a silver compound). As used herein, "silver compound" refers to a compound having at least one silver molecule or ion. The silver may be in ionic form. The ranges and limits for silver may be similar to the ranges and limits for copper (discussed above).

In one embodiment, the molar ratio of the copper to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the copper to the zinc in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to copper in the polymer composition may be less than 15:1, e.g., less than 10:1, less than 9:1, less than 8:1, less than 7:1, less than 6:1, less than 5:1, less than 4:1, or less than 3:1. In some cases, copper is bound in the polymer matrix along with zinc.

In some embodiments, the use of cuprous ammonium adipate has been found to be particularly effective in activating copper ions into the polymer matrix. Similarly, the use of silver ammonium adipate has been found to be particularly effective in activating silver ions into the polymer matrix. It is found that dissolving copper (I) or copper (II) compounds in ammonium adipate is particularly efficient at generating copper (I) or copper (II) ions. The same is true for dissolving Ag (I) or Ag (III) compounds in ammonium adipate to generate Ag1+ or Ag3+ ions.

The polymer composition may comprise silver (e.g., in a silver compound), e.g., silver or a silver compound, dispersed within the polymer composition. In one embodiment, the polymer composition comprises silver in an amount ranging from 5 wppm to 20,000 wppm, e.g., from 5 wppm to 17,500 wppm, from 5 wppm to 17,000 wppm, from 5 wppm to 16,500 wppm, from 5 wppm to 16,000 wppm, from 5 wppm to 15,500 wppm, from 5 wppm to 15,000 wppm, from 5 wppm to 12,500 wppm, from 5 wppm to 10,000 wppm, from 5 wppm to 5000 wppm, from 5 wppm to 4000 wppm, e.g., from 5 wppm to 3000 wppm, from 5 wppm to 2000 wppm, from 5 wppm to 1000 wppm, from 5 wppm to 500 wppm, from 10 wppm to 20,000 wppm, from 10 wppm to 17,500 wppm, from 10 wppm to 17,000 wppm, from 10 wppm to 16,500 wppm, from 10 wppm to 16,000 wppm, from 10 wppm to 15,500 wppm, from 10 wppm to 15,000 wppm, from 10 wppm to 12,500 wppm, from 10 wppm to 10,000 wppm, from 10 wppm to 5000 wppm, from 10 wppm to 4000 wppm, from 10 wppm to 3000 wppm, from 10 wppm to 2000 wppm, from 10 wppm to 1000 wppm, from 10 wppm to 500 wppm, from 50 wppm to 20,000 wppm, from 50 wppm to 17,500 wppm, from 50 wppm to 17,000 wppm, from 50 wppm to 16,500 wppm, from 50 wppm to 16,000 wppm, from 50 wppm to 15,500 wppm, from 50 wppm to 15,000 wppm, from 50 wppm to 12,500 wppm, from 50 wppm to 10,000 wppm, from 50 wppm to 5000 wppm, from 50 wppm to 4000 wppm, from 50 wppm to 3000 wppm, from 50 wppm to 2000 wppm, from 50 wppm to 1000 wppm, from 50 wppm to 500 wppm, from 100 wppm to 20,000 wppm, from 100 wppm to 17,500 wppm, from 100 wppm to 17,000 wppm, from 100 wppm to 16,500 wppm, from 100 wppm to 16,000 wppm, from 100 wppm to 15,500 wppm, from 100 wppm to 15,000 wppm, from 100 wppm to 12,500 wppm, from 100 wppm to 10,000 wppm, from 100 wppm to 5000 wppm, from 100 wppm to 4000 wppm, from 100 wppm to 3000 wppm, from 100 wppm to 2000 wppm, from 100 wppm to 1000 wppm, from 100 wppm to 500 wppm, from 200 wppm to 20,000 wppm, from 200 wppm to 17,500 wppm, from 200 wppm to 17,000 wppm, from 200 wppm to 16,500 wppm, from 200 wppm to 16,000 wppm, from 200 wppm to 15,500 wppm, from 200 wppm to 15,000 wppm, from 200 wppm to 12,500 wppm, from 200 wppm to 10,000 wppm, from 200 wppm to 5000 wppm, from 200 wppm to 4000 wppm, from 200 wppm to 3000 wppm, from 200 wppm to 2000 wppm, from 200 wppm to 1000 wppm, or from 200 wppm to 500 wppm.

In terms of lower limits, the polymer composition may comprise greater than 5 wppm of silver, e.g., greater than 10 wppm, greater than 50 wppm, greater than 100 wppm, greater than 200 wppm, or greater than 300 wppm. In terms of upper limits, the polymer composition may comprise less than 20,000 wppm of silver, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, or less than 500 wppm. In some aspects, the silver compound is embedded in the polymer formed from the polymer composition.

The composition of the silver compound is not particularly limited. Suitable silver compounds include silver iodide, silver bromide, silver chloride, silver fluoride, silver oxide, silver stearate, silver ammonium adipate, silver acetate, or silver pyrithione, or combinations thereof. The silver compound may comprise silver oxide, silver ammonium adipate, silver acetate, silver ammonium carbonate, silver stearate, silver phenyl phosphinic acid, or silver pyrithione, or combinations thereof. In some embodiments, the silver compound comprises silver oxide, silver ammonium adipate, silver acetate, or silver pyrithione, or combinations thereof. In some embodiments, the silver compound comprises silver oxide, silver stearate, or silver ammonium adipate, or combinations thereof. In some aspects, the silver is provided in the form of silver oxide. In some aspects, the silver is not provided via silver phenyl phosphinate and/or silver phenyl phosphonate. In some aspects, the silver is provided by dissolving one or more silver compounds in ammonium adipate.

The polymer composition may comprise phosphorus (in a phosphorus compound), e.g., phosphorus or a phosphorus compound is dispersed within the polymer composition. In one embodiment, the polymer composition comprises phosphorus in an amount ranging from 50 wppm to 10000 wppm, e.g., from 50 wppm to 5000 wppm, from 50 wppm to 2500 wppm, from 50 wppm to 2000 wppm, from 50 wppm to 800 wppm, 100 wppm to 750 wppm, 100 wppm to 1800 wppm, from 100 wppm to 10000 wppm, from 100 wppm to 5000 wppm, from 100 wppm to 2500 wppm, from 100 wppm to 1000 wppm, from 100 wppm to 800 wppm, from 200 wppm to 10000 wppm, 200 wppm to 5000 wppm, from 200 wppm to 2500 wppm, from 200 wppm to 800 wppm, from 300 wppm to 10000 wppm, from 300 wppm to 5000 wppm, from 300 wppm to 2500 wppm, from 300 wppm to 500 wppm, from 500 wppm to 10000 wppm, from 500 wppm to 5000 wppm, or from 500 wppm to 2500 wppm. In terms of lower limits, the polymer composition may comprise greater than 50 wppm of phosphorus, e.g., greater than 75 wppm, greater than 100 wppm, greater than 150 wppm, greater than 200 wppm greater than 300 wppm or greater than 500 wppm. In terms of upper limits, the polymer composition may comprise less than 10000 wppm (or 1 wt. %), e.g., less than 5000 wppm, less than 2500 wppm, less than 2000 wppm, less than 1800 wppm, less than 1500 wppm, less than 1000 wppm, less than 800 wppm, less than 750 wppm, less than 500 wppm, less than 475 wppm, less than 450 wppm, less than 400 wppm, less than 350 wppm, less than 300 wppm, less than 250 wppm, less than 200 wppm, less than 150 wppm, less than 100 wppm, less than 50 wppm, less than 25 wppm, or less than 10 wppm.

In some aspects, the phosphorus or the phosphorus compound is embedded in the polymer formed from the polymer composition. As noted above, because of the overall make-up of the disclosed composition low amounts, if any, phosphorus may be employed, which in some cases may provide for advantageous performance results (see above).

The phosphorus of the polymer composition is present in or provided via a phosphorus compound, which may vary widely. The phosphorus compound may comprise bezene phosphinic acid, diphenylphosphinic acid, sodium phenylphosphinate, phosphorous acid, benzene phosphonic acid, calcium phenylphosphinate, potassium B-pentylphosphinate, methylphosphinic acid, manganese hypophosphite, sodium hypophosphite, monosodium phosphate, hypophosphorous acid, dimethylphosphinic acid, ethylphosphinic acid, diethylphosphinic acid, magnesium ethylphosphinate, triphenyl phosphite, diphenylmethyl phosphite, dimethylphenyl phosphite, ethyldiphenyl phosphite, phenylphosphonic acid, methylphosphonic acid, ethylphosphonic acid, potassium phenylphosphonate, sodium methylphosphonate, calcium ethylphosphonate, and combinations thereof. In some embodiments, the phosphorus compound comprises phosphoric acid, benzene phosphinic acid, or benzene phosphonic acid, or combinations thereof. In some embodiments, the phosphorus compound comprises benzene phosphinic acid, phosphorous acid, or manganese hypophosphite, or combinations thereof. In some aspects, the phosphorus compound may comprise benzene phosphinic acid.

In one embodiment, the molar ratio of the phosphorus to the zinc is greater than 0.01:1, e.g., greater than 0.05:1, greater than 0.1:1, greater than 0.15:1, greater than 0.25:1, greater than 0.5:1, or greater than 0.75:1. In terms of ranges, the molar ratio of the phosphorus to the zinc in the polymer composition may range from 0.01:1 to 15:1, e.g., from 0.05:1 to 10:1, from 0.1:1 to 9:1, from 0.15:1 to 8:1, from 0.25:1 to 7:1, from 0.5:1 to 6:1, from 0.75:1 to 5:1 from 0.5:1 to 4:1, or from 0.5:1 to 3:1. In terms of upper limits, the molar ratio of zinc to phosphorus in the polymer composition may be less than 15:1, e.g., less than 10:1, less than 9:1, less than 8:1, less than 7:1, less than 6:1, less than 5:1, less than 4:1, or less than 3:1. In some cases, phosphorus is bound in the polymer matrix along with zinc.

In one embodiment, the weight ratio of zinc to phosphorus in the polyamide composition may be greater than 1.3:1, e.g., greater than 1.4:1, greater than 1.5:1, greater than 1.6:1, greater than 1.7:1, greater than 1.8:1, or greater than 2:1. In terms of ranges, the weight ratio of zinc to phosphorus in the polyamide composition may range from 1.3:1 to 30:1, e.g., from 1.4:1 to 25:1, from 1.5:1 to 20:1, from 1.6:1 to 15:1, from 1.8:1 to 10:1, from 2:1 to 8:1, from 3:1 to 7:1, or from 4:1 to 6:1. In terms of upper limits, the weight ratio of zinc to phosphorus in the polyamide composition may be less than 30:1, e.g., less than 28:1, less than 26:1, less than 24:1, less than 22:1, less than 20:1, or less than 15:1. In some aspects, there is no phosphorus in the polyamide composition. In other aspects, a very low amount of phosphorus is present. In some cases, phosphorus is held in the polymer matrix along with zinc.

In one embodiment, the weight ratio of zinc to phosphorus in the polyamide composition may be less than 0.64:1, e.g., less than 0.62:1, less than 0.6:1, e.g., less than 0.5:1, less than 0.45:1, less than 0.4:1, less than 0.3:1, or less than 0.25:1. In terms of ranges, the weight ratio of zinc to phosphorus in the polyamide composition may range from 0.001:1 to 0.64:1, e.g., from 0.01:1 to 0.6:1, from 0.05:1 to 0.5:1, from 0.1:1 to 0.45:1, from 0.2:1 to 0.4:1, from 0.25:1 to 0.35:1, or from 0.2:1 to 0.3:1. In terms of lower limits, the weight ratio of zinc to phosphorus in the polyamide composition may be greater than 0.001:1, e.g., greater than 0.005:1, greater than 0.01:1, greater than 0.05:1, greater than 0.1:1, greater than 0.15:1, or greater than 0.2:1.

Advantageously, it has been discovered that adding the above identified zinc compounds and phosphorus compounds may result in a beneficial relative viscosity (RV) of the polymer composition. In some embodiments, the RV of the polymer composition ranges from 5 to 80, e.g., from 5 to 70, from 10 to 70, from 15 to 65, from 20 to 60, from 30 to 50, from 10 to 35, from 10 to 20, from 60 to 70, from 50 to 80, from 40 to 60, from 30 to 60, from 5 to 30, or from 15 to 32. In terms of lower limits, the RV of the polymer composition may be greater than 5, e.g., greater than 10, greater than 15, greater than 20, greater than 25, greater than 27.5, or greater than 30. In terms of upper limits, the RV of the polymer composition may be less than 70, e.g., less than 65, less than 60, less than 50, less than 40, or less than 35.

To calculate RV, a polymer is dissolved in a solvent (usually formic or sulfuric acid), the viscosity is measured, then the viscosity is compared to the viscosity of the pure solvent. This give a unitless measurement. Solid materials, as well as liquids, may have a specific RV. The fibers/fabrics produced from the polymer compositions may have the aforementioned relative viscosities, as well.

It has been determined that a specific amount of the zinc compound and the phosphorus compound can be mixed in a polymer composition, e.g., polyamide composition, in finely divided form, such as in the form of granules, flakes and the like, to provide a polymer composition that can be subsequently formed, e.g., extruded, molded or otherwise drawn, into various products (e.g., high-contact products, surface layers of high-contact products) by conventional methods to produce products having substantially improved antimicrobial activity. The zinc and phosphorus are employed in the polymer composition in the aforementioned amounts to provide a fiber with improved antimicrobial activity retention (near-permanent).

Additional Components

In some embodiments, the polymer composition may comprise additional additives. The additives include pigments, hydrophilic or hydrophobic additives, anti-odor additives, additional antiviral agents, and antimicrobial/antifungal inorganic compounds, such as copper, zinc, tin, and silver.

In some embodiments, the polymer composition can be combined with color pigments for coloration for the use in fabrics or other components formed from the polymer composition. In some aspects, the polymer composition can be combined with UV additives to withstand fading and degradation in fabrics exposed to significant UV light. In some aspects, the polymer composition can be combined with additives to make the surface of the fiber hydrophilic or hydrophobic. In some aspects, the polymer composition can be combined with a hygroscopic material, e.g., to make the fiber, fabric, or other products formed therefrom more hygroscopic. In some aspects, the polymer composition can be combined with additives to make the fabric flame retardant or flame resistant. In some aspects, the polymer composition can be combined with additives to make the fabric stain resistant. In some aspects, the polymer composition can be combined with pigments with the antimicrobial compounds so that the need for conventional dyeing and disposal of dye materials is avoided.

In some embodiments, the polymer composition may further comprise additional additives. For example, the polymer composition may comprise a delusterant. A delusterant additive may improve the appearance and/or texture of the synthetic fibers and fabric produced from the polymer composition. In some embodiments, inorganic pigment-like materials can be utilized as delusterants. The delusterants may comprise one or more of titanium dioxide, barium sulfate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. In preferred embodiments, the delusterant comprises titanium dioxide. It has been found that the polymer compositions that include delusterants comprising titanium dioxide produce synthetic fibers and fabrics that greatly resemble natural fibers and fabrics, e.g., synthetic fibers and fabrics with improved appearance and/or texture. It is believed that titanium dioxide improves appearance and/or texture by interacting with the zinc compound, the phosphorus compound, and/or functional groups within the polymer.

In one embodiment, the polymer composition comprises the delusterant in an amount ranging from 0.0001 wt. % to 3 wt. %, e.g., 0.0001 wt. % to 2 wt. %, from 0.0001 to 1.75 wt. %, from 0.001 wt. % to 3 wt. %, from 0.001 wt. % to 2 wt. %, from 0.001 wt. % to 1.75 wt. %, from 0.002 wt. % to 3 wt. %, from 0.002 wt. % to 2 wt. %, from 0.002 wt. % to 1.75 wt. %, from 0.005 wt. % to 3 wt. %, from 0.005 wt. % to 2 wt. %, from 0.005 wt. % to 1.75 wt. %. In terms of upper limits, the polymer composition may comprise less than 3 wt. % delusterant, e.g., less than 2.5 wt. %, less than 2 wt. % or less than 1.75 wt. %. In terms of lower limits, the polymer composition may comprise greater than 0.0001 wt. % delusterant, e.g., greater than 0.001 wt. %, greater than 0.002 wt. %, or greater than 0.005 wt. %.

In some embodiments, the polymer composition may further comprise colored materials, such as carbon black, copper phthalocyanine pigment, lead chromate, iron oxide, chromium oxide, and ultramarine blue.

In some embodiments, the polymer composition may include additional antiviral agents other than zinc. The additional antimicrobial agents may be any suitable antiviral. Conventional antiviral agents are known in the art and may be incorporated in the polymer composition as the additional antiviral agent or agents. For example, the additional antiviral agent may be an entry inhibitor, a reverse transcriptase inhibitor, a DNA polymerase inhibitor, an m-RNA synthesis inhibitor, a protease inhibitor, an integrase inhibitor, or an immunomodulator, or combinations thereof. In some aspects, the additional antimicrobial agent or agents are added to the polymer composition.

In some embodiments, the polymer composition may include additional antimicrobial agents other than zinc. The additional antimicrobial agents may be any suitable antimicrobial, such as silver, copper, and/or gold in metallic forms (e.g., particulates, alloys and oxides), salts (e.g., sulfates, nitrates, acetates, citrates, and chlorides) and/or in ionic forms. In some aspects, further additives, e.g., additional antimicrobial agents, are added to the polymer composition.

In some embodiments, the polymer composition (and the fibers or fabric formed therefrom) may further comprise an antimicrobial or antiviral coating. For example, a fiber or fabric formed from the polymer composition may include a coating of zinc nanoparticles (e.g., nanoparticles of zinc oxide, zinc ammonium adipate, zinc acetate, zinc ammonium carbonate, zinc stearate, zinc phenyl phosphinic acid, or zinc pyrithione, or combinations thereof). To produce such a coating, the surface of polymer composition (e.g., the surface of the fiber and/or fabric formed therefrom) may be cationized and coated layer-by layer by stepwise dipping the polymer composition into an anionic polyelectrolyte solution (e.g., comprising poly 4-styrenesulfonic acid) and a solution comprising the zinc nanoparticles. Optionally, the coated polymer composition may be hydrothermally treated in a solution of $NH_4OH$ at 9° C. for 24 h to immobilize the zinc nanoparticles.

In some cases, the filter structures and facemasks described herein do not require the use or inclusion of acids, e.g., citric acid, and/or acid treatment to be effective. Such treatments are known to create static charge/static decay issues. Advantageously, the elimination of the need for acid treatment, thus eliminates the static charge/static decay issues associated with conventional configurations.

Metal Retention Rate

As noted, the filter structures and facemasks described herein have permanent (e.g., near-permanent) antimicrobial and/or antiviral properties. The permanence of these properties allows the filter structures and facemasks to be reused (e.g., after washing), further extending the usefulness of the article.

One metric for assessing the permanence (e.g., near-permanence) of the antimicrobial and/or antiviral properties of the filter structure (or facemask) is metal retention. As discussed above, the filter structures and facemasks may be prepared from the disclosed polymer compositions, which may include various metallic compounds (e.g., zinc compound, phosphorus, copper compound, and/or silver compound). The metallic compounds of the polymer compositions may provide antimicrobial and/or antiviral properties to the filter structure and/or facemasks produced therefrom. Thus, retention of the metallic compounds, e.g., after one or more cycles of washing, may provide permanent (e.g., near-permanent) antimicrobial and/or antiviral properties.

Beneficially, filter structures (and facemasks) formed from the disclosed polymer compositions demonstrate relatively high metal retention rate. The metal retention rate may relate to the retention rate of a specific metal in the polymer composition (e.g., zinc retention, copper retention) or to the retention rate of all metals in the polymer composition (e.g., total metal retention).

In some embodiments, the filter structures (and facemasks) formed from the disclosed polymer compositions have a metal retention greater than 65% as measured by a dye bath test, e.g., greater than 75%, greater than 80%, greater than 90%, greater than 95%, greater than 97%, greater than 98%, greater than 99%, greater than 99.9%, greater than 99.99%, greater than 99.999%, greater than 99.9999%, greater than 99.99999% or greater than 99.999999%. In terms of upper limits, the filter structures (and facemasks) may have a metal retention of less than 100%, e.g., less than 99.9%, less than 98%, or less than 95%. In terms of ranges, the filter structures (and facemasks) may have a metal retention may be from 60% to 100%, e.g., from 60% to 99.999999%, from 60% to 99.99999%, from 60% to 99.9999%, from 60% to 99.999% from 60% to 99.99%, from 60% to 99.99%, from 60% to 99.9%, from 60% to 99%, from 60% to 98%, from 60% to 95%, from 65% to 99.999999%, from 65% to 99.99999%, from 65% to 99.9999%, from 65% to 99.999% from 65% to 99.99%, from 65% to 100%, from 65% to 99.99%, from 65% to 99.9%, from 65% to 99%, from 65% to 98%, from 65% to 95%, from 70% to 100%, from 70% to 99.999999%, from 70% to 99.99999%, from 70% to 99.9999%, from 70% to 99.999% from 70% to 99.999%, from 70% to 99.99%, from 70% to 99.9%, from 70% to 99%, from 70% to 98%, from 70% to 95%, from 75% to 100%, from 75% to 99.99%, from 75% to 99.9%, from 75% to 99.999999%, from 75% to 99.99999%, from 75% to 99.9999%, from 75% to 99.999% from 75% to 99.999%, from 75% to 99%, from 75% to 98%, from 75% to 95%, %, from 80% to 99.999999%, from 80% to 99.99999%, from 80% to 99.9999%, from 80% to 99.999% from 80% to 99.999%, from 80% to 100%, from 80% to 99.99%, from 80% to 99.9%, from 80% to 99%, from 80% to 98%, or from 80% to 95%. In some cases, the ranges and limits relate to dye recipes having lower pH values, e.g., less than (and/or including) 5.0, less than 4.7, less than 4.6, or less than 4.5. In some cases, the ranges and limits relate to dye recipes having higher pH values, e.g., greater than (and/or including) 4.0, greater than 4.2, greater than 4.5, greater than 4.7, greater than 5.0, or greater than 5.2.

In some embodiments, the filter structures (and facemasks) formed from the disclosed polymer compositions have a metal retention greater than 40% after a dye bath, e.g., greater than 44%, greater than 45%, greater than 50%, greater than 55%, greater than 60%, greater than 65%, greater than 70%, greater than 75%, greater than 80%, greater than 90%, greater than 95%, or greater than 99%. In terms of upper limits, the filter structures (and facemasks) may have a metal retention of less than 100%, e.g., less than 99.9%, less than 98%, less than 95% or less than 90%. In terms of ranges, the filter structures (and facemasks) may have a metal retention in a range from 40% to 100%, e.g., from 45% to 99.9%, from 50% to 99.9%, from 75% to 99.9%, from 80% to 99%, or from 90% to 98%. In some cases, the ranges and limits relate to dye recipes having higher pH values, e.g., greater than (and/or including) 4.0, greater than 4.2, greater than 4.5, greater than 4.7, greater than 5.0, or greater than 5.2.

In some embodiments, the filter structures (and facemasks) formed from the polymer compositions have a metal retention greater than 20%, e.g., greater than 24%, greater than 25%, greater than 30%, greater than 35%, greater than 40%, greater than 45%, greater than 50%, greater than 55%, or greater than 60%. In terms of upper limits, the filter structures (and facemasks) may have a metal retention of less than 80%, e.g., less than 77%, less than 75%, less than 70%, less than 68%, or less than 65%. In terms of ranges, the filter structures (and facemasks) may have a metal retention ranging from 20% to 80%, e.g., from 25% to 77%, from 30% to 75%, or from 35% to 70%. In some cases, the ranges and limits relate to dye recipes having lower pH values, e.g., less than (and/or including) 5.0, less than 4.7, less than 4.6, or less than 4.5.

Stated another way, in some embodiments, the filter structures (and facemasks) formed from the polymer composition demonstrate an extraction rate of the metal compound less than 35% as measured by the dye bath test, e.g., less than 25%, less than 20%, less than 10%, or less than 5%. In terms of upper limits, the filter structures (and facemasks) may demonstrate an extraction rate of the metal compound greater than 0%, e.g., greater than 0.1%, greater than 2% or greater than 5%. In terms of ranges, the filter structures (and facemasks) may demonstrate an extraction rate of the metal compound from 0% to 35%, e.g., from 0% to 25%, from 0% to 20%, from 0% to 10%, from 0% to 5%, from 0.1% to 35%, from 0.1% to 25%, from 0.1% to 20%, from 0.2% to 10%, from 0.1% to 5%, from 2% to 35%, from 2% to 25%, from 2% to 20%, from 2% to 10%, from 2% to 5%, from 5% to 35%, from 5% to 25%, from 5% to 20%, or from 5% to 10%.

The metal retention of a filter structure (or facemask) formed from the disclosed polymer compositions may be measured by a dye bath test according to the following standard procedure. A sample is cleaned (all oils are removed) by a scour process. The scour process may employ a heated bath, e.g., conducted at 71° C. for 15 minutes. A scouring solution comprising 0.25% on weight of fiber ("owf") of Sterox (723 Soap) nonionic surfactant and 0.25 owf of TSP (trisodium phosphate) may be used. The samples are then rinsed with cold water.

The cleaned samples may be tested according a chemical dye level procedure. This procedure may employ placing them in a dye bath comprising 1.0% owf of C.I. Acid Blue 45, 4.0% owf of MSP (monosodium phosphate), and a sufficient % owf of di sodium phosphate or TSP to achieve a pH of 6.0, with a 28:1 liquor to sample ratio. For example, if a pH of less than 6 is desired, a 10% solution of the desired acid may be added using an eye dropper until the desired pH was achieved. The dye bath may be preset to bring the bath to a boil at 100° C. The samples are placed in the bath for 1.5 hours. As one example, it may take approximately 30 minutes to reach boil and hold one hour after boil at this temperature. Then the samples are removed from the bath and rinsed. The samples are then transferred to a centrifuge for water extraction. After water extraction, the samples were laid out to air dry. The component amounts are then recorded.

In some embodiments, the metal retention of a fiber formed from the polymer composition may be calculated by measuring metal content before and after a dye bath operation. The amount of metal retained after the dye bath may be measured by known methods. For the dye bath, an Ahiba dyer (from Datacolor) may be employed. In a particular instance, twenty grams of un-dyed fabric and 200 ml of dye liquor may be placed in a stainless steel can, the pH may be adjusted to the desired level, the stainless steel can may be loaded into the dyer; the sample may be heated to 40° C. then heated to 100° C. (optionally at 1.5° C./minute). In some cases a temperature profile may be employed, for example, 1.5° C./minute to 60° C., 1° C./minute to 80° C., and 1.5° C./minute to 100° C. The sample may be held at 100° C. for 45 minutes, followed by cooling to 40° C. at 2° C./minute, then rinsed and dried to yield the dyed product.

In some embodiments, the filter structure (e.g., one or more layers of the filter structure) or a facemask formed therefrom retains AM/AV properties after one or more washing cycles. In some cases, this washfastness may be due to the use of the aforementioned AM/AV formulations employed to make the fibers/fabrics, e.g., the AM/AV compound may be embedded in the polymer structure. In one embodiment, the filter structure retains AM/AV properties after more than 1 washing cycle, e.g., more than 2 washing cycles, more than 5 washing cycles, more than 10 washing cycles, or more than 20 washing cycle. The durability of the disclosed filters, masks, and/or layers is also demonstrated via retention after dyeing operations.

The washfastness may also be described by the metal retention (e.g., zinc retention) after a number of wash cycles. In some embodiments, for example, the filter structure retains greater than 95% of a metallic compound (e.g., a zinc compound) after 5 wash cycles, e.g., greater than 96%, greater than 97%, or greater than 98%. In some embodiments, the filter structure retains greater than 85% of a metallic compound (e.g., a zinc compound) after 10 wash cycles, e.g., greater than 86%, greater than 87%, greater than 88%, greater than 89%, or greater than 90%.

In some cases, the filter structures (and facemasks) may be used in wound care, for example, the filter structures may be employed as wraps, (breathable) gauzes, bandages, and/or other dressings. The AM/AV properties of the filter structures make them particularly beneficial in these applications. In some cases, the filter structures serve as a moisture barrier and/or to facilitate an oxygen transmission balance.

Method of Forming Fibers and Nonwoven Fabrics

As described herein, the fibers or fabrics of the filter structure are made by forming the AM/AV polymer composition into the fibers, which are arranged to form the fabric or structure.

In some aspects, fibers, e.g., polyamide fibers, are made by spinning a polyamide composition formed in a melt polymerization process. During the melt polymerization process of the polyamide composition, an aqueous monomer solution, e.g., salt solution, is heated under controlled conditions of temperature, time and pressure to evaporate water and effect polymerization of the monomers, resulting in a polymer melt. During the melt polymerization process, sufficient amounts of zinc and, optionally, phosphorus, are employed in the aqueous monomer solution to form the polyamide mixture before polymerization. The monomers are selected based on the desired polyamide composition. After zinc and phosphorus are present in the aqueous monomer solution, the polyamide composition may be polymerized. The polymerized polyamide can subsequently be spun into fibers, e.g., by melt, solution, centrifugal, or electro-spinning.

In some embodiments, the process for preparing fibers having permanent AM/AV properties from the polyamide composition includes preparing an aqueous monomer solution, adding less than 20,000 wppm of one or more metallic compounds dispersed within the aqueous monomer solution, e.g., less than 17,500 wppm, less than 17,000 wppm, less than 16,500 wppm, less than 16,000 wppm, less than 15,500 wppm, less than 15,000 wppm, less than 12,500 wppm, less than 10,000 wppm, less than 5000 wppm, less than less than 4000 wppm, less than 3000 wppm, less than 2000 wppm, less than 1000 wppm, or less than 500 wppm, polymerizing the aqueous monomer solution to form a polymer melt, and spinning the polymer melt to form an AM/AV fiber. In this embodiment, the polyamide composition comprises the resultant aqueous monomer solution after the metallic compound(s) are added.

In some embodiments, the process includes preparing an aqueous monomer solution. The aqueous monomer solution may comprise amide monomers. In some embodiments, the concentration of monomers in the aqueous monomer solution is less than 60 wt %, e.g., less than 58 wt %, less than 56.5 wt %, less than 55 wt %, less than 50 wt %, less than 45 wt %, less than 40 wt %, less than 35 wt %, or less than 30 wt %. In some embodiments, the concentration of monomers in the aqueous monomer solution is greater than 20 wt %, e.g., greater than 25 wt %, greater than 30 wt %, greater than 35 wt %, greater than 40 wt %, greater than 45 wt %, greater than 50 wt %, greater than 55 wt %, or greater than 58 wt %. In some embodiments, the concentration of monomers in the aqueous monomer solution is in a range from 20 wt % to 60 wt %, e.g., from 25 wt % to 58 wt %, from 30 wt % to 56.5 wt %, from 35 wt % to 55 wt %, from 40 wt % to 50 wt %, or from 45 wt % to 55 wt %. The balance of the aqueous monomer solution may comprise water and/or additional additives. In some embodiments, the monomers comprise amide monomers including a diacid and a diamine, i.e., nylon salt.

In some embodiments, the aqueous monomer solution is a nylon salt solution. The nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, C2-C16 aliphatic diamine optionally substituted with one or more C1 to C4 alkyl groups, aliphatic polyether diamines and furanic diamines, such as 2,5-bis (aminomethyl)furan, and mixtures thereof. In preferred embodiments, the diacid is adipic acid and the diamine is hexamethylene diamine which are polymerized to form PA6,6.

It should be understood that the concept of producing a polyamide from diamines and diacids also encompasses the concept of other suitable monomers, such as, aminoacids or lactams. Without limiting the scope, examples of aminoacids can include 6-aminohaxanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

After the aqueous monomer solution is prepared, a metallic compound (e.g., a zinc compound, a copper compound, and/or a silver compound) is added to the aqueous monomer solution to form the polyamide composition. In some embodiments, less than 20,000 wppm of the metallic compound is dispersed within the aqueous monomer solution. In some aspects, further additives, e.g., additional AM/AV agents, are added to the aqueous monomer solution. Optionally, phosphorus (e.g., a phosphorus compound) is added to the aqueous monomer solution.

In some cases, the polyamide composition is polymerized using a conventional melt polymerization process. In one aspect, the aqueous monomer solution is heated under controlled conditions of time, temperature, and pressure to evaporate water, effect polymerization of the monomers and provide a polymer melt. In some aspects, the particular weight ratio of zinc to phosphorus may advantageously promote binding of zinc within the polymer, reduce thermal degradation of the polymer, and enhance its dyeability.

In one embodiment, a nylon is prepared by a conventional melt polymerization of a nylon salt. Typically, the nylon salt solution is heated under pressure (e.g. 250 psig/1825×10$^3$ n/m$^2$) to a temperature of, for example, about 245° C. Then the water vapor is exhausted off by reducing the pressure to atmospheric pressure while increasing the temperature to, for example, about 270° C. Before polymerization, zinc and, optionally, phosphorus be added to the nylon salt solution. The resulting molten nylon is held at this temperature for a period of time to bring it to equilibrium prior to being extruded into a fiber. In some aspects, the process may be carried out in a batch or continuous process.

In some embodiments, during melt polymerization, zinc, e.g., zinc oxide is added to the aqueous monomer solution. The AM/AV fiber may comprise a polyamide that is made in a melt polymerization process and not in a master batch process. In some aspects, the resulting fiber has permanent AM/AV properties. The resulting fiber can be used in the first layer, the second layer, and/or the third layer of the filter structure.

The AM/AV agent may be added to the polyamide during melt polymerization, for example as a master batch or as a powder added to the polyamide pellets, and thereafter, the fiber may be formed from spinning. The fibers are then formed into a nonwoven structure.

In some aspects, the AM/AV nonwoven structure is melt blown. Melt blowing is advantageously less expensive than electrospinning. Melt blowing is a process type developed for the formation of microfibers and nonwoven webs. Until recently, microfibers have been produced by melt blowing. Now, nanofibers may also be formed by melt blowing. The nanofibers are formed by extruding a molten thermoplastic polymeric material, or polyamide, through a plurality of small holes. The resulting molten threads or filaments pass into converging high velocity gas streams which attenuate or draw the filaments of molten polyamide to reduce their diameters. Thereafter, the melt blown nanofibers are carried by the high velocity gas stream and deposited on a collecting surface, or forming wire, to form a nonwoven web of randomly disbursed melt blown nanofibers. The formation of nanofibers and nonwoven webs by melt blowing is well known in the art. See, e.g., U.S. Pat. Nos. 3,704,198; 3,755,527; 3,849,241; 3,978,185; 4,100,324; and 4,663,220.

One option, "Island-in-the-sea," refers to fibers forming by extruding at least two polymer components from one spinning die, also referred to as conjugate spinning.

As is well known, electrospinning has many fabrication parameters that may limit spinning certain materials. These parameters include: electrical charge of the spinning material and the spinning material solution; solution delivery (often a stream of material ejected from a syringe); charge at the jet; electrical discharge of the fibrous membrane at the collector; external forces from the electrical field on the spinning jet; density of expelled jet; and (high) voltage of the electrodes and geometry of the collector. In contrast, the aforementioned nanofibers and products are advantageously formed without the use of an applied electrical field as the primary expulsion force, as is required in an electrospinning process. Thus, the polyamide is not electrically charged, nor are any components of the spinning process. Importantly, the dangerous high voltage necessary in electrospinning processes, is not required with the presently disclosed processes/products. In some embodiments, the process is a non-electrospin process and resultant product is a non-electrospun product that is produced via a non-electrospin process.

Another embodiment of making the nanofiber nonwovens is by way of 2-phase spinning or melt blowing with propellant gas through a spinning channel as is described generally in U.S. Pat. No. 8,668,854. This process includes two phase flow of polymer or polymer solution and a pressurized propellant gas (typically air) to a thin, preferably converging channel. The channel is usually and preferably annular in configuration. It is believed that the polymer is sheared by gas flow within the thin, preferably converging channel, creating polymeric film layers on both sides of the channel. These polymeric film layers are further sheared into nanofibers by the propellant gas flow. Here again, a moving collector belt may be used and the basis weight of the nanofiber nonwoven is controlled by regulating the speed of the belt. The distance of the collector may also be used to control fineness of the nanofiber nonwoven.

Beneficially, the use of the aforementioned polyamide precursor in the melt spinning process provides for significant benefits in production rate, e.g., at least 5% greater, at least 10% greater, at least 20% greater, at least 30% greater, at least 40% greater. The improvements may be observed as an improvement in area per hour versus a conventional process, e.g., another process that does not employ the features described herein. In some cases, the production increase over a consistent period of time is improved. For example, over a given time period, e.g., one hour, of production, the disclosed process produces at least 5% more product than a conventional process or an electrospin process, e.g., at least 10% more, at least 20% more, at least 30% more, or at least 40% more.

Still yet another methodology which may be employed is melt blowing. Melt blowing involves extruding the polyamide into a relatively high velocity, typically hot, gas stream. To produce suitable nanofibers, careful selection of the orifice and capillary geometry as well as the temperature is required as is seen in: Hassan et al., J Membrane Sci., 427, 336-344, 2013 and Ellison et al., Polymer, 48 (11), 3306-3316, 2007, and, International Nonwoven Journal, Summer 2003, pg 21-28.

U.S. Pat. No. 7,300,272 (incorporated herein by reference) discloses a fiber extrusion pack for extruding molten material to form an array of nanofibers that includes a number of split distribution plates arranged in a stack such that each split distribution plate forms a layer within the fiber extrusion pack, and features on the split distribution plates form a distribution network that delivers the molten material to orifices in the fiber extrusion pack. Each of the split distribution plates includes a set of plate segments with a gap disposed between adjacent plate segments. Adjacent edges of the plate segments are shaped to form reservoirs along the gap, and sealing plugs are disposed in the reservoirs to prevent the molten material from leaking from the gaps. The sealing plugs can be formed by the molten material that leaks into the gap and collects and solidifies in the reservoirs or by placing a plugging material in the reservoirs at pack assembly. This pack can be used to make nanofibers with a melt blowing system described in the patents previously mentioned. The systems and method of U.S. Pat. No. 10,041,188 (incorporated herein by reference) are also exemplary.

In one embodiment, a process for preparing the AM/AV nonwoven polyamide structure (e.g., for use in the first layer, the second layer, and/or the third layer) is disclosed. The process comprising the step of forming a (precursor) polyamide (preparation of monomer solutions are well known), e.g., by preparing an aqueous monomer solution. During preparation of the precursor, a metallic compound is added (as discussed herein). In some cases, the metallic compound is added to (and dispersed in) the aqueous monomer solution. Phosphorus may also be added. In some cases, the precursor is polymerized to form a polyamide composition. The process further comprises the steps of forming polyamide fibers and forming the AM/AV polyamide fibers into a structure. In some cases, the polyamide composition is melt spun, spunbonded, electrospun, solution spun, or centrifugally spun.

A fabric can be made from the fibers by conventional means.

EXAMPLES

Samples of mask layer fabrics were prepared using polymer compositions comprising a polymer and an optional AM/AV compound, e.g., zinc compound and/or copper compound. The polymer included nylon-6,6; nylon-6; and/or olefin polymer, e.g., polypropylene. When a nylon polymer was employed, the nylon was made by a continuous polymerization process. The layer fabrics were prepared by employing the polymer compositions in multiple processes, e.g., meltblown, spunbond, electrospun, spunlace. Additional layer fabrics or layer fabric configurations were obtained from commercial sources. The zinc/copper contents of the compositions and/or fibers/fabrics were measured or obtained from product literature and noted. In some cases, a commercial N95 layer fabric mask (FT-040 NISH N95 mask from Grupo SISO, S.A.S.) was employed. The N95 configuration contained 5 layers: spunbond polypropylene; spunlace polyethylene terephthalate (PET); 2 meltblown polypropylene; and spunbond polypropylene. Details of the fabrics are shown in Table 1.

TABLE 1

Fabric details

| Fabric | Desc. | Polymer | AM/AV conc., wppm (Zn, Cu) | Fiber dia., microns | Process | Basis wt., gsm |
|---|---|---|---|---|---|---|
| i | 25 GSM SB PP MF | PP | 0 | 28 | SB | 25 |
| ii | 10 GSM MB PA NF | PA | 696 | 0.30 | MB | 10 |
| iii | 13 GSM MB PA NF | PA | 433, 23 | 0.96 | MB | 13 |
| iv | 10 GSM MB PA NF | PA | 487 | 0.32 | MB | 10 |
| v | 10 GSM MB PA NF | PA | 479 | 0.32 | MB | 10 |
| vi | 34 GSM SB PA MF | PA | 431, 22 | 24 | SB | 34 |
| vii | 17 GSM MB PA MF | PA | 431, 22 | 0.96 | MB | 17 |
| viii | 30 GSM MB PA MF | PA | 431, 22 | 0.96 | MB | 30 |
| ix | 20 GSM SB PA MF | PA | 336, 21.5 | 24 | SB | 20 |
| x | 34 GSM SB PA MF | PA | 347, 21 | 24 | SB | 34 |
| xi | 34 GSM SB PA MF | PA | 384, 19 | 24 | SB | 34 |
| xii | 20 GSM SB PA MF | PA | 372, 23.2 | 24 | SB | 20 |
| xiii | 10 GSM MB PA NF | PA | 660 | 0.30 | MB | 10 |
| xiv | 8 GSM MB PA NF | PA | 700 | 0.43 | MB | 8 |
| xv | 10 GSM MB PA NF | PA | 700 | 0.96 | MB | 10 |
| xvi | 11 GSM MB PAMF | PA | 315 | 0.65 | MB | 11 |
| xvii | 10 GSM MB PA MF | PA | 315 | 0.65 | MB | 10 |

TABLE 1-continued

Fabric details

| Fabric | Desc. | Polymer | AM/AV conc., wppm (Zn, Cu) | Fiber dia., microns | Process | Basis wt., gsm |
|---|---|---|---|---|---|---|
| xviii | 8 GSM MB PA MF | PA | 309 | 0.63 | MB | 8 |
| xix | 9 GSM MB PA MF | PA | 309 | 0.63 | MB | 9 |
| xx | 20 GSM SB PA MF | PA | 476, 20 | 24 | SB | 20 |

The layer fabrics were configured into mask Examples 1-18, the layers of which are shown in Table 2. The layers were ultrasonically welded together. Comparative Examples A-F, which employed no AM/AV compound (or that do not meet the disclosed physical characteristic limits, e.g., basis weight or fiber diameter) were also prepared and/or procured.

TABLE 2

Mask configurations

| | Face Layer | Third Layer | Fourth Layer | Outer Layer |
|---|---|---|---|---|
| 1 | i 25 GSM SB PP MF | ii 10 GSM MB PA NF | ii 10 GSM MB PA NF | i 25 GSM SB PP MF |
| 2 | i 25 GSM SB PP MF | iii 10 GSM MB PA NF | iii 10 GSM MB PA NF | i 25 GSM SB PP MF |
| 3 | i 25 GSM SB PP MF | v 10 GSM MB PA NF | iv 10 GSM MB PA NF | i 25 GSM SB PP MF |
| 4 | i 25 GSM SB PP MF | v 10 GSM MB PA NF | iv 10 GSM MB PA NF | i 25 GSM SB PP MF |
| 5 | i 25 GSM SB PP MF | v 10 GSM MB PA NF | iv 10 GSM MB PA NF | i 25 GSM SB PP MF |
| 6 | xiv 8 GSM MB PA NF | N95 | — | xiii 10 GSM MB PA NF |
| 7 | xv 10 GSM MB PA NF | N95 | — | xiii 10 GSM MB PA NF |
| 8 | xv 10 GSM MB PA NF | N95 | — | xiii 10 GSM MB PA NF |
| 9 | xv 10 GSM MB PA NF | N95 | — | xiii 10 GSM MB PA NF |
| 10 | xviii 8 GSM MB PA MF | N95 | — | xvi 11 GSM MB PA NF |
| 11 | xix 9 GSM MB PA MF | N95 | — | xvii 10 GSM MB PA MF |
| 12 | xix 9 GSM MB PA MF | N95 | — | xvii 10 GSM MB PA MF |
| 13 | xix 9 GSM MB PA MF | N95 | — | xvii 10 GSM MB PA MF |
| 14 | ix 20 GSM SB PA MF | N95 | — | ix 20 GSM SB PA MF |
| 15 | xx 20 GSM SB PA MF | N95 | — | xx 20 GSM SB PA MF |
| 16 | xx 20 GSM SB PA MF | N95 | — | xx 20 GSM SB PA MF |
| 17 | xx 20 GSM SB PA MF | N95 | — | xx 20 GSM SB PA MF |
| 18 | xx 20 GSM SB PA MF | N95 | — | xx 20 GSM SB PA MF |
| A | ix 20 GSM SB PA MF | — | vii 17 GSM SB PA MF | vi 34 GSM SB PA MF |
| B | ix 20 GSM SB PA MF | — | viii 30 GSM SB PA MF | vi 34 GSM SB PA MF |
| C | ix 20 GSM SB PA MF | ii 10 GSM MB PA NF | ii 10 GSM MB PA NF | x 34 GSM SB PA MF |
| D | xii 20 GSM SB PA MF | iii 10 GSM MB PA NF | iii 10 GSM MB PA NF | xi 34 GSM SB PA MF |
| E | xii 20 GSM SB PA MF | iii 10 GSM MB PA NF | iii 10 GSM MB PA NF | xi 34 GSM SB PA MF |
| F | xii 20 GSM SB PA MF | iii 10 GSM MB PA NF | iii 10 GSM MB PA NF | xi 34 GSM SB PA MF |

The masks were tested for PFE and BFE in accordance with ASTM F2299-03R17, ASTM F2101, and EN14693:2019, respectively. The results are shown in Table 3.

TABLE 3

Filtration results

| | PFE, % | BFE, % |
|---|---|---|
| 1 | 95.9 | 99.3 |
| 2 | 91.5 | 99.9 |
| 3 | 93.4 | 98.6 |
| 4 | — | — |
| 5 | 99.2 | 99.2 |
| 6 | 99.9 | 99.8 |
| 7 | 99.8 | 99.9 |
| 8 | 99.8 | 99.9 |
| 9 | — | — |
| 10 | 99.9 | 99.9 |
| 11 | — | — |
| 12 | 99.8 | 99.9 |
| 13 | 99.8 | 99.9 |
| 14 | 99.9 | 99.4 |
| 15 | 99.8 | — |
| 16 | — | — |
| 17 | 99.7 | 99.6 |
| 18 | 99.7 | 99.9 |
| A | 72.1 | — |
| B | 78.8 | 99.4 |
| C | 78.2 | 98.4 |
| D | 89.1 | 99.9 |
| E | — | — |
| F | — | 99.1 |

As shown in Table 3, Examples 1-18 demonstrated surprisingly good filtration efficiency versus the Comparative Examples, which performed poorly in either PFE, BFE, or both. For example, Examples 1-18, which employed an outer layer having a basis weight of 25 gsm or less, demonstrated PFE values well above 90%. In contrast, the Comparative Examples, which used an outer layer having higher basis weights, showed much poorer performance—below 90%, and in most cases below 80%. Further, Examples 1-18 demonstrated BFE values above 99.2%, in most cases above 99.4%. In contrast, the Comparative Examples, demonstrated poorer performance overall.

Additionally, for Examples 1-18, average delta P values met, and, in most cases well exceeded, industry standards and/or the EN14693:2019 standard.

Various AM/AV compound-containing layer fabrics were tested for *Escherichia coli* efficacy in accordance with ASTM E3160 (2018) and for *Klebsiella pneumonia* efficacy and *Staphylococcus aureus* efficacy in accordance with ISO20743:2013 and for SARS-CoV-2 efficacy in accordance with ISO 18184:2019. The results are shown as a log reductions in Table 4. The total AM/AV efficacy of the mask configuration may be calculated by adding the AM/AV efficacies of the respective layers.

TABLE 4

Bioefficacy results, log reduction

| | Face Layer | Third Layer | Fourth Layer | Outer Layer |
|---|---|---|---|---|
| *Escherichia coli* | | | | |
| 1 | | 4.2 | 4.2 | |
| C | | 4.2 | 4.2 | |
| 6 | 5.1 | | | 4.2 |
| 10 | 6.9 | | | 6.9 |
| 14 | 6.9 | | | 6.9 |
| 15 | 6.9 | | | 6.9 |
| *Staphylococcus aureus* | | | | |
| 1 | | 2.8 | 2.8 | |
| C | 0.5 | 2.8 | 2.8 | |
| 6 | 2.6 | | | 2.8 |
| 10 | 3.2 | | | 2.3 |
| 14 | 0.5 | | | 0.5 |
| 15 | 6.1 | | | 6.1 |
| *Klebsiella pneumonia* | | | | |
| 1 | | 2.7 | 2.7 | |
| C | | 2.7 | 2.7 | |
| 6 | 4.2 | | | 2.7 |
| 10 | 6.9 | | | 6.7 |
| 14 | 6.9 | | | 0.9 |
| 15 | 6.9 | | | 4.0 |
| SARS-CoV-2 | | | | |
| 1 | | 2.7 | 2.7 | |
| C | 1.4 | 2.7 | 2.7 | 1.4 |
| 6 | 2.7 | | | 2.7 |
| 10 | 2.1 | | | 2.1 |
| 14 | | | | |
| 15 | 1.4 | | | 1.4 |

As shown, the fabrics and the masks constructed thereof surprisingly showed a synergistic balance of high AM/AV efficacy, e.g., *Escherichia coli* or SARS-CoV-2 efficacy, in addition to the superior PFE, BFE, and/or delta P performance discussed above. In particular, Examples 1, 6, 10, 14, and 15 demonstrated *Escherichia coli* log reductions of 4.2 or greater. Examples 10, 14, and 15 performed particularly well—log reductions over 6.5. While Comparative Example C showed AM/AV efficacy, its PFE and BFE performance were much worse than Examples 1-18.

These collective results demonstrate the synergistic balance of filtration performance and AM/AV efficacy of Examples 1-18.

In addition, various AM/AV mask configurations were tested for biocompatibility, e.g. irritation and sensitization, in accordance with ISO 10993-10 and 10993-12. The results are presented below in Table 5.

TABLE 5

Biocompatibility results

| | Irritation | Sensitization |
|---|---|---|
| 6 | pass | pass |
| 10 | pass | pass |
| 15 | pass | pass |

As shown in Table 5, in addition to the aforementioned synergistic combinations of performance features, the mask configurations that employed the zinc and/or copper AM/AV compounds passed both the irritation and sensitization tests. In contrast, addition of silver to fibers and fabric is well known to cause skin irritation and sensitivity.

EMBODIMENTS

As used below, any reference to a series of embodiments is to be understood as a reference to each of those embodiments disjunctively (e.g., "Embodiments 1-4" is to be understood as "Embodiments 1, 2, 3, or 4").

Embodiment 1 is a filter structure or facemask structure, comprising: a first layer comprising a first fabric, preferably comprising fibers; a second layer comprising a second fabric comprising a plurality of fibers, preferably nanofibers and/or microfibers; and an optional third layer comprising a third fabric, preferably comprising fibers, wherein at least one of the first layer, the second layer, and the third layer demonstrates antibacterial and/or antiviral properties.

Embodiment 2 is the filter structure of any of the preceding embodiment(s), wherein the fibers of the first, second, and/or third layer are formed from a polymer composition comprising a polymer and an antimicrobial/antiviral compound.

Embodiment 3 is the filter structure of embodiment(s) 2, wherein the antimicrobial/antiviral compound comprises a zinc compound, a copper compound, a silver compound, or combinations thereof.

Embodiment 4 is the filter structure of embodiment(s) 2 or 3, wherein the antimicrobial/antiviral compound is present in an amount ranging from 5 wppm to 20,000 wppm, based on the total weight of the polymer composition.

Embodiment 5 is the filter structure of any of embodiment(s) 2 to 4, wherein the antimicrobial/antiviral compound comprises zinc oxide, zinc ammonium adipate, zinc acetate, zinc ammonium carbonate, zinc stearate, zinc phenyl phosphinic acid, or zinc pyrithione, or combinations thereof.

Embodiment 6 is the filter structure of any of embodiment(s) 2 to 5, wherein the antimicrobial/antiviral compound comprises copper oxide, copper ammonium adipate, copper acetate, copper ammonium carbonate, copper stearate, copper phenyl phosphinic acid, or copper pyrithione, or combinations thereof.

Embodiment 7 is the filter structure of any of embodiment(s) 2 to 6, wherein the antimicrobial/antiviral compound comprises silver oxide, silver ammonium adipate, silver acetate, silver ammonium carbonate, silver stearate, silver phenyl phosphinic acid, or silver pyrithione, or combinations thereof.

Embodiment 8 is the filter structure of any of the preceding embodiment(s), wherein the polymer composition comprises polyethylene, polypropylene, polyethylene terephthalate, polyethylene terephthalate glycol, co-PET, polybutylene terephthalate, polylactic acid, polytrimethylene terephthalate, long chain polyamide, PA-4T/4I, PA-4T/6I, PA-5T/5I, PA-6, PA6,6, PA6,6/6, PA6,6/6T, PA-6T/6I, PA-6T/6I/6, PA-6T/6, PA-6T/6I/66, PA-6T/MPMDT, PA-6T/66, PA-6T/610, PA-10T/612, PA-10T/106, PA-6T/612, PA-6T/10T, PA-6T/10I, PA-9T, PA-10T, PA-12T, PA-10T/10I, PA-10T/12, PA-10T/11, PA-6T/9T, PA-6T/12T, PA-6T/10T/6I, PA-6T/6I/6, PA-6T/6I/12, linear low-density polyethylene (LLDPE), low-density polyethylene (LDPE), medium-density polyethylene (MDPE), high-density polyethylene (HDPE), ultra-high-molecular-weight polyethylene (UHMWPE), polycarbonate, polycarbonate, or acrylonitrile butadiene styrene (PC-ABS), or copolymers thereof, or blends, mixtures or other combinations thereof.

Embodiment 9 is the filter structure of any of the preceding embodiment(s), wherein the polymer composition comprises PA-4T/4I, PA-4T/6I, PA-5T/5I, PA-6, PA6,6, PA6,6/6, PA6,6/6T, PA-6T/6I, PA-6T/6I/6, PA-6T/6, PA-6T/6I/66, PA-6T/MPMDT, PA-6T/66, PA-6T/610, PA-10T/612, PA-10T/106, PA-6T/612, PA-6T/10T, PA-6T/10I, PA-9T, PA-10T, PA-12T, PA-10T/10I, PA-10T/12, PA-10T/11, PA-6T/9T, PA-6T/12T, PA-6T/10T/6I, PA-6T/6I/6, or PA-6T/6I/12, or copolymers thereof, or blends, mixtures or combinations thereof.

Embodiment 10 is the filter structure of any of the preceding embodiment(s), wherein the third fabric is woven, nonwoven, and/or knit.

Embodiment 11 is the filter structure of any of the preceding embodiment(s), wherein the plurality of fibers has little or no electric charge.

Embodiment 12 is the filter structure of any of the preceding embodiment(s), wherein the filter structure demonstrates a low level of static decay.

Embodiment 13 is the filter structure of any of the preceding embodiment(s), wherein the plurality of fibers has a positive and/or negative electric charge.

Embodiment 14 is the filter structure of any of the preceding embodiment(s), wherein the second layer has a water contact angle less than 90°.

Embodiment 15 is the filter structure of any of the preceding embodiment(s), wherein the filter structure demonstrates a fluid resistance greater than 50 mm Hg.

Embodiment 16 is the filter structure of any of the preceding embodiment(s), wherein the filter structure demonstrates a fluid resistance greater than 100 mm Hg.

Embodiment 17 is the filter structure of any of the preceding embodiment(s), wherein the filter structure demonstrates a fluid resistance greater than 150 mm Hg.

Embodiment 18 is the filter structure of any of the preceding embodiment(s), wherein the filter structure demonstrates a pressure differential from 2 mm $H_2O/cm^2$ to 15 mm $H_2O/cm^2$.

Embodiment 19 is the filter structure of any of the preceding embodiment(s), wherein the filter structure demonstrates a pressure differential from 4 mm $H_2O/cm^2$ to 10 mm $H_2O/cm^2$.

Embodiment 20 is the filter structure of any of the preceding embodiment(s), wherein the filter structure demonstrates a bacterial filtration efficiency greater than 90%.

Embodiment 21 is the filter structure of any of the preceding embodiment(s), wherein the filter structure demonstrates a bacterial filtration efficiency greater than 95%.

Embodiment 22 is the filter structure of any of the preceding embodiment(s), wherein the filter structure demonstrates a bacterial filtration efficiency greater than 98%.

Embodiment 23 is the filter structure of any of the preceding embodiment(s), wherein the filter structure demonstrates a particulate filtration efficiency greater than 90%.

Embodiment 24 is the filter structure of any of the preceding embodiment(s), wherein the filter structure demonstrates a particulate filtration efficiency greater than 95%.

Embodiment 25 is the filter structure of any of the preceding embodiment(s), wherein the filter structure demonstrates a particulate filtration efficiency greater than 98%.

Embodiment 26 is the filter structure of any of the preceding embodiment(s), wherein the first fabric comprises a spunbond fabric, a meltblown fabric, a flashspun fabric, preferably being a meltblown fabric.

Embodiment 27 is the filter structure of any of the preceding embodiment(s), wherein the third fabric comprises a spunbond fabric, a meltblown fabric, a flashspun fabric, preferably being a meltblown fabric.

Embodiment 28 is the filter structure of any of the preceding embodiment(s), wherein: the first layer comprises PA6,6 having an average fiber diameter of 30 to 50 microns and a basis weight of 15 to 20 $g/m^2$; the second layer comprises polypropylene having an average fiber diameter less than 15 microns and a basis weight of 15-20 $g/m^2$; and the third layer comprises PA6,6 having an average fiber diameter of 30 to 50 microns and a basis weight of 25 to 35 $g/m^2$.

Embodiment 29 is the filter structure of any of the preceding embodiment(s), wherein: the first layer comprises PA6,6 having an average fiber diameter of 30 to 50 microns and a basis weight of 15 to 20 $g/m^2$; the second layer comprises polyamide nanofibers having an average fiber diameter less than 1 micron and a basis weight of about 18 $g/m^2$; and the third layer comprises PA6,6 having an average fiber diameter of 30 to 50 microns and a basis weight of 25 to 35 $g/m^2$.

Embodiment 30 is the filter structure of any of the preceding embodiment(s), wherein: the first layer comprises PA6,6 having an average fiber diameter of 30 to 50 microns and a basis weight of 15 to 20 $g/m^2$; the second layer comprises polypropylene having an average fiber diameter less than 15 microns and a basis weight of 20-25 $g/m^2$; and the third layer comprises PA6,6 having an average fiber diameter of 30 to 50 microns and a basis weight of 25 to 35 $g/m^2$.

Embodiment 31 is the filter structure of any of the preceding embodiment(s), wherein: the first layer comprises PA6,6 having an average fiber diameter of 1 to 5 microns and a basis weight of 15 to 20 $g/m^2$; the second layer comprises a plurality polyamide nanofibers having an average fiber diameter of less than 1 microns and a basis weight of about 22 $g/m^2$; and the third layer comprises a spunbond nonwoven fabric formed from PA6,6 and having an average fiber diameter of 30 to 50 microns and a basis weight of 25 to 35 $g/m^2$.

Embodiment 32 is the filter structure of any of the preceding embodiment(s), wherein: the first layer comprises PA6,6 having an average fiber diameter of 30 to 50 microns and a basis weight of 15 to 20 $g/m^2$; the second layer comprises polypropylene having an average fiber diameter less than 15 microns and a basis weight of 30-35 $g/m^2$; and the third layer comprises PA6,6 having an average fiber diameter of 30 to 50 microns and a basis weight of 25 to 35 $g/m^2$.

33. The filter structure of any of the preceding embodiment(s), wherein: the first layer comprises PA6,6 having an average fiber diameter of 30 to 50 microns and a basis weight of 10 to 15 $g/m^2$; the second layer comprises polypropylene having an average fiber diameter less than 15 microns and a basis weight of 30-35 g/m$^2$; and the third layer comprises melt spun PA6,6 having an average fiber diameter of 1 to 5 microns and a basis weight of 15 to 20 g/m$^2$.

Embodiment 34 is the filter structure of any of the preceding embodiment(s), wherein: the first layer comprises PA6,6 having an average fiber diameter of 1 to 5 microns and a basis weight of 10 to 15 g/m$^2$; the second layer comprises polyamide nanofibers having an average fiber diameter less than 1 micron and a basis weight of about 33 g/m$^2$; and the third layer comprises PA6,6 having an average fiber diameter of 30 to 50 microns and a basis weight of 25 to 35 g/m$^2$.

Embodiment 35 is the filter structure of any of the preceding embodiment(s), wherein: the first layer comprises PA6,6 having an average fiber diameter of 1 to 5 microns and a basis weight of 10 to 15 g/m$^2$; the second layer comprises polyamide nanofibers having an average fiber diameter less than 1 micron and a basis weight of about 33 g/m$^2$; and the third layer comprises PA6,6 having an average fiber diameter of 1 to 5 microns and a basis weight of 15 to 20 g/m$^2$.

Embodiment 36 is the filter structure of any of the preceding embodiment(s), wherein: the first layer comprises PA6,6 having an average fiber diameter of 30 to 50 microns and a basis weight of 15 to 20 g/m$^2$; the second layer comprises polypropylene having an average fiber diameter less than 15 microns and a basis weight of 25-30 g/m$^2$; and the third layer comprises a spunbond nonwoven fabric formed from PA6,6 and having an average fiber diameter of 30 to 50 microns and a basis weight of 25 to 35 g/m$^2$.

Embodiment 37 is the filter structure of any of the preceding embodiment(s), wherein: the first layer comprises PA6,6 having an average fiber diameter of 1 to 5 microns and a basis weight of 10 to 15 g/m$^2$; the second layer comprises polypropylene having an average fiber diameter less than 15 microns and a basis weight of 25-30 g/m$^2$; and the third layer comprises a spunbond nonwoven fabric formed from PA6,6 and having an average fiber diameter of 30 to 50 microns and a basis weight of 25 to 35 g/m$^2$.

Embodiment 38 is the filter structure of any of the preceding embodiment(s), wherein: the first layer comprises PA6,6 having an average fiber diameter of 1 to 5 microns and a basis weight of 10 to 15 g/m$^2$; the second layer comprises polypropylene having an average fiber diameter less than 15 microns and a basis weight of 25-30 g/m$^2$; and the third layer comprises PA6,6 having an average fiber diameter of 1 to 5 microns and a basis weight of 15 to 20 g/m$^2$.

Embodiment 39 is the filter structure of any of the preceding embodiment(s), wherein the first layer has a basis weight from 8 g/m$^2$ to 25 g/m$^2$, the second layer has a basis weight from 15 g/m$^2$ to 40 g/m$^2$, and the third layer has a basis weight from 8 g/m$^2$ to 40 g/m$^2$.

Embodiment 40 is the filter structure of any of the preceding embodiment(s), wherein the first layer comprises a spunbond polyamide having a basis weight from 10 g/m$^2$ to 25 g/m$^2$, wherein the plurality of nanofibers and/or microfibers comprises a polyamide, wherein the second layer has a basis weight from 20 g/m$^2$ to 35 g/m$^2$, and wherein the third layer comprises a spunbond polyamide having a basis weight from 20 g/m$^2$ to 40 g/m$^2$.

Embodiment 41 is the filter structure of any of the preceding embodiment(s), wherein the first layer comprises a meltblown polyamide having a basis weight from 5 g/m$^2$ to 20 g/m$^2$, wherein the plurality of nanofibers and/or microfibers comprises a polyamide, wherein the second layer has a basis weight from 20 g/m$^2$ to 35 g/m$^2$, and wherein the third layer comprises a meltblown polyamide having a basis weight from 10 g/m$^2$ to 25 g/m$^2$.

Embodiment 42 is the filter structure of any of the preceding embodiment(s), wherein the first layer comprises a meltblown polyamide having a basis weight from 5 g/m$^2$ to 20 g/m$^2$, wherein the plurality of nanofibers and/or microfibers comprises a polyamide, wherein the second layer has a basis weight from 20 g/m$^2$ to 35 g/m$^2$, and wherein the third layer comprises a spunbond polyamide having a basis weight from 20 g/m$^2$ to 40 g/m$^2$.

Embodiment 43 is the filter structure of any of the preceding embodiment(s), wherein at least one of the layers, preferably the second layer, is removable.

Embodiment 44 is the filter structure of any of the preceding embodiment(s), wherein the first fabric is woven, nonwoven, and/or knit.

Embodiment 45 is the filter structure of any of the preceding embodiment(s), wherein the first layer is a nanofiber layer.

Embodiment 46 is the filter structure of any of the preceding embodiment(s), wherein the third layer is a nanofiber layer.

Embodiment 47 is the filter structure of any of the preceding embodiment(s), wherein the first layer is in contact with at least a portion of the second layer.

Embodiment 48 is the filter structure of any of the preceding embodiment(s), wherein the second layer is in contact with at least a portion of the second layer.

Embodiment 49 is the filter structure of any of the preceding embodiment(s), wherein the first layer has a basis weight from 5 g/m$^2$ to 30 g/m$^2$.

Embodiment 50 is the filter structure of any of the preceding embodiment(s), wherein the second layer has a basis weight from 10 g/m$^2$ to 50 g/m$^2$.

Embodiment 51 is the filter structure of any of the preceding embodiment(s), wherein the third layer has a basis weight from 5 g/m$^2$ to 50 g/m$^2$.

Embodiment 52 is a facemask comprising the filter structure of any of the preceding embodiment(s).

Embodiment 53 is a facemask comprising the filter structure of any of the preceding embodiment(s), wherein the facemask is re-usable and/or washable with a metal retention of at least 65%.

Embodiment 54 is the facemask of embodiment(s) 52, wherein the first fabric is a spunbond polyamide, and wherein the third fabric is a spunbond polyamide.

Embodiment 55 is the facemask of embodiment(s) 52, wherein the first fabric is a meltblown polyamide, and wherein the third fabric is a spunbond polyamide.

Embodiment 56 is the facemask of embodiment(s) 52, wherein the first fabric is a meltblown polyamide, and wherein the third fabric is a meltblown polyamide.

Embodiment 57 is the facemask of any of embodiment(s) 52-56, wherein the plurality of nanofibers and/or microfibers comprise PA6,6.

Embodiment 58 is the facemask of any of embodiment(s) 52-57, wherein the filter structure demonstrates a fluid resistance from 50 mm Hg to 200 mm Hg, a pressure differential from 2 mm H$_2$O/cm$^2$ to 15 mm H$_2$O/cm$^2$, a bacterial filtration efficiency from 90% to 100%, and/or a particulate filtration efficiency from 90% to 100%.

Embodiment 59 is a process for preparing the first layer, the second layer, and/or the third layer of the filter structure of any of embodiments 1-51, the process comprising: preparing precursor polyamide optionally comprising an aqueous monomer solution; dispersing up to 20,000 wppm one or more metallic compounds within the precursor polyamide; polymerizing the precursor polyamide to form a polyamide composition; spinning the polyamide composition to form antimicrobial polyamide fibers; and forming the antimicrobial polyamide fibers into the first layer, the second layer, and/or the third layer.

Embodiment 60 is the process of embodiment 59, wherein the polyamide is melt spun by way of melt blowing through a die into a high velocity gaseous stream.

Embodiment 61 is a process for preparing the first layer, the second layer, and/or the third layer of the filter structure of any of claims 1-59, the process comprising preparing a formulation comprising a polyamide and up to 20,000 wppm of at least one metallic compound dispersed within the polyamide; spinning the formulation to form antimicrobial polyamide fibers having a fiber diameter of less than 25 microns; and forming the antimicrobial polyamide fibers into the first layer, the second layer, and/or the third layer; wherein the fibers were spun using a die pressure less than 275 psig.

Embodiment 62 is a filter structure or facemask structure, comprising a first layer comprising a first fabric formed from polypropylene, preferably spunbond polypropylene, wherein the first fabric has a basis weight of 25 g/m$^2$; a second layer comprising a second fabric formed from a plurality of fibers of a polyamide composition, preferably meltblown nanofibers, wherein the second fabric has a basis weight of 10 g/m$^2$; a third layer comprising a third fabric formed from a plurality of fibers of the polyamide composition, preferably meltblown nanofibers, wherein the third fabric has a basis weight of 10 g/m$^2$; and a fourth layer comprising a fourth fabric formed from polypropylene, preferably spunbond polypropylene, wherein the fourth fabric has a basis weight of 25 g/m$^2$; wherein at least one of the first layer, the second layer, the third layer, and the fourth layer demonstrates antimicrobial and/or antiviral properties.

Embodiment 63 is a filter structure or facemask structure, comprising a first layer comprising a first fabric formed from a polyamide composition, preferably a spunbond polyamide composition, wherein the first fabric has a basis weight of 20 g/m$^2$; a second layer comprising a second fabric formed from a plurality of fibers of the polyamide composition, preferably meltblown nanofibers, wherein the second fabric has a basis weight of 10 g/m$^2$; a third layer comprising a third fabric formed from a plurality of fibers of the polyamide composition, preferably meltblown nanofibers, wherein the third fabric has a basis weight of 10 g/m$^2$; and a fourth layer comprising a fourth fabric formed from the polyamide composition, preferably a spunbond polyamide composition, wherein the fourth fabric has a basis weight of 34 g/m$^2$; wherein at least one of the first layer, the second layer, the third layer, and the fourth layer demonstrates antimicrobial and/or antiviral properties.

Embodiment 64 is a filter structure or facemask structure, comprising a first layer comprising a first fabric formed from a polyamide composition, preferably a meltblown polyamide composition, wherein the first fabric has a basis weight of 8 g/m$^2$; a second layer comprising an N95 filter structure; and a third layer comprising a third fabric formed from the polyamide composition, preferably a meltblown polyamide composition, wherein the third fabric has a basis weight of 10 g/m$^2$; wherein at least one of the first layer and the third layer demonstrates antimicrobial and/or antiviral properties.

Embodiment 65 is a filter structure or facemask structure, comprising a first layer comprising a first fabric formed from a polyamide composition, preferably a meltblown polyamide composition, wherein the first fabric has a basis weight of 8 g/m$^2$; a second layer comprising an N95 filter structure; and a third layer comprising a third fabric formed from the polyamide composition, preferably a meltblown polyamide composition, wherein the third fabric has a basis weight of 11 g/m$^2$; wherein at least one of the first layer and the third layer demonstrates antimicrobial and/or antiviral properties.

Embodiment 66 is a filter structure or facemask structure, comprising a first layer comprising a first fabric formed from a polyamide composition, preferably a spunbond polyamide composition, wherein the first fabric has a basis weight of 20 g/m$^2$; a second layer comprising an N95 filter structure; and a third layer comprising a third fabric formed from the polyamide composition, preferably a spunbond polyamide composition, wherein the third fabric has a basis weight of 20 g/m$^2$; wherein at least one of the first layer and the third layer demonstrates antimicrobial and/or antiviral properties.

Embodiment 67 is a filter or mask structure, comprising a first face layer comprising a polymer and having a face basis weight, a second outer layer comprising a polymer and having an outer basis weight less than 34 gsm, and a third outer layer comprising a polymer and having a third basis weight and disposed between the first face layer and the second outer layer; at least one of the layers further comprises an AM/AV compound, and the mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17.

Embodiment 68 is an embodiment of embodiment 67, wherein the difference between the face basis weight the outer basis weight is less than 14 gsm.

Embodiment 69 is an embodiment of any of embodiments 67 or 68, wherein the difference between the face basis weight the outer basis weight is less than 5 gsm.

Embodiment 70 is an embodiment of any of embodiments 67 to 69, wherein the face basis weight is less than or equal to the outer basis weight.

Embodiment 71 is an embodiment of any of embodiments 67 to 70, wherein at least one layer is meltblown.

Embodiment 72 is an embodiment of any of embodiments 67 to 71, wherein the second outer layer comprises polyamide and wherein the outer basis weight ranges from 5 gsm to 25 gsm.

Embodiment 73 is an embodiment of any of embodiments 67 to 72, wherein the face basis weight ranges from 5 gsm to 25 gsm.

Embodiment 74 is an embodiment of any of embodiments 67 to 73, wherein the first face layer comprises polyamide and wherein the face basis weight ranges from 5 gsm to 25 gsm.

Embodiment 75 is an embodiment of any of embodiments 67 to 74, wherein the polymer of at least one of the layers comprises a polyamide and wherein the AM/AV compound comprises zinc.

Embodiment 76 is an embodiment of any of embodiments 67 to 75, wherein the polymer of at least one of the layers has a hygroscopy absorbance of greater than 1.5 wt. % water, based on the total weight of the polymer.

Embodiment 77 is an embodiment of any of embodiments 67 to 76, wherein the third outer layer comprises multiple additional layers.

Embodiment 78 is an embodiment of any of embodiments 67 to 77, wherein the third outer layer comprises an N95 mask.

Embodiment 79 is an embodiment of any of embodiments 67 to 78, wherein the N95 mask comprises two spunbond polypropylene layers; a spunlace polyethylene terephthalate layer; a spunlace polyester/cellulose blend, and two meltblown polypropylene layers.

Embodiment 80 is an embodiment of any of embodiments 67 to 79, wherein the third outer layer comprises multiple additional layers and the multiple additional layers have basis weights ranging from 5 gsm to 15 gsm.

Embodiment 81 is an embodiment of any of embodiments 67 to 80, wherein the second outer layer comprises a meltblown layer.

Embodiment 82 is an embodiment of any of embodiments 67 to 81, wherein at least one of the face layer and the second outer layer comprises a spunbond layer.

Embodiment 83 is an embodiment of any of embodiments 67 to 82, wherein the polymer of at least one of the face layer and the second outer layer comprises polypropylene.

Embodiment 84 is a filter or mask structure, comprising a first face layer comprising polypropylene and having a face basis weight ranging from 20 gsm to 30 gsm, a second outer layer comprising polypropylene and having an outer basis weight ranging from 20 gsm to 30 gsm, third outer layers each disposed between the first face layer and the second outer layer; the first third outer layer comprising meltblown polyamide and having a basis weight less than 15 gsm; the second third outer layer comprising meltblown polyamide and having a basis weight less than 15 gsm; at least one of the layers further comprises an AM/AV compound; and the mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17.

Embodiment 85 is a filter or mask structure, comprising a first face layer comprising meltblown polyamide and an AM/AV compound and having a face basis weight ranging from 2 gsm to 15 gsm, a second outer layer comprising meltblown polyamide and an AM/AV compound and having an outer basis weight ranging from 2 gsm to 15 gsm, and a third outer layer comprising an N95 mask and disposed between the first face layer and the second outer layer; wherein the mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17.

Embodiment 86 is a filter or mask structure, comprising a first face layer comprising meltblown polyamide and an AM/AV compound and having a face basis weight ranging from 15 gsm to 25 gsm, a second outer layer comprising meltblown polyamide and an AM/AV compound and having an outer basis weight ranging from 15 gsm to 25 gsm, and a third outer layer comprising an N95 mask and disposed between the first face layer and the second outer layer; wherein the mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17.

We claim:

1. A filter or mask structure, comprising:
    a first face layer comprising a polymer and having a face basis weight;
    a second outer layer comprising a polymer and having an outer basis weight less than 34 gsm; and
    a third outer layer comprising a polymer and having a third basis weight and disposed between the first face layer and the second outer layer;
    wherein at least one of the layers further comprises an antimicrobial and/or antiviral ("AM/AV") compound; and
    wherein the filter or mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17,
    wherein each of the first face layer and the second outer layer has an average fiber diameter less than 50 microns, and
    wherein the third outer layer has an average fiber diameter of less than 25 microns,
    wherein the face basis weight is less than or equal to the outer basis weight.

2. The filter or mask structure of claim 1, wherein the third outer layer comprises an N95 mask.

3. The filter or mask structure of claim 2, wherein the N95 mask comprises two spunbond polypropylene layers; a spunlace polyethylene terephthalate layer; a spunlace polyester/cellulose blend, and two meltblown polypropylene layers.

4. The filter or mask structure of claim 1, wherein the difference between the face basis weight and the outer basis weight is less than 14 gsm.

5. The filter or mask structure of claim 1, wherein the difference between the face basis weight and the outer basis weight is less than 5 gsm.

6. The filter or mask structure of claim 1, wherein at least one layer is meltblown.

7. The filter or mask structure of claim 1, wherein one of the first face layer and the second outer layer comprises polyamide and wherein one of the first basis weight and the outer basis weight ranges from 5 gsm to 25 gsm.

8. The filter or mask structure of claim 1, wherein the face basis weight ranges from 5 gsm to 25 gsm.

9. The filter or mask structure of claim 1, wherein the polymer of at least one of the layers comprises a polyamide and wherein the AM/AV compound comprises zinc.

10. The filter or mask structure of claim 1, wherein the polymer of at least one of the layers has a hygroscopy absorbance of greater than 1.5 wt. % water, based on the total weight of the polymer.

11. The filter or mask structure of claim 1, wherein the third outer layer comprises multiple additional layers.

12. The filter or mask structure of claim 1, wherein the third outer layer comprises multiple additional layers and the multiple additional layers have basis weights ranging from 5 gsm to 15 gsm.

13. The filter or mask structure of claim 1, wherein the second outer layer comprises a meltblown layer.

14. The filter or mask structure of claim 1, wherein at least one of the face layer and the second outer layer comprises a spunbond layer.

15. The filter or mask structure of claim 1, wherein the polymer of at least one of the face layer and the second outer layer comprises polypropylene.

16. The filter or mask structure of claim 1, wherein at least one of the first face layer, the second outer layer, and the third outer layer has an average fiber diameter is between 1 micron and 0.03 microns.

17. A filter or mask structure, comprising:
    a first face layer comprising polypropylene and having a face basis weight ranging from 20 gsm to 30 gsm;

a second outer layer comprising polypropylene and having an outer basis weight ranging from 20 gsm to 30 gsm;
third outer layers each disposed between the first face layer and the second outer layer;
the first third outer layer comprising meltblown polyamide and having a basis weight less than 15 gsm;
the second third outer layer comprising meltblown polyamide and having a basis weight less than 15 gsm;
wherein at least one of the layers further comprises an antimicrobial and/or antiviral ("AM/AV") compound; and
wherein the filter or mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17,
wherein each of the first face layer and the second outer layer has an average fiber diameter less than 50 microns, and
wherein the third outer layer has an average fiber diameter of less than 25 microns,
wherein the face basis weight is less than or equal to the outer basis weight.

18. A filter or mask structure, comprising:
a first face layer comprising meltblown polyamide and an antimicrobial and/or antiviral ("AM/AV") compound and having a face basis weight ranging from 2 gsm to 15 gsm;
a second outer layer comprising meltblown polyamide and an AM/AV compound and having an outer basis weight ranging from 2 gsm to 15 gsm;
a third outer layer comprising an N95 mask and disposed between the first face layer and the second outer layer;
wherein the filter or mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17,
wherein each of the first face layer and the second outer layer has an average fiber diameter less than 50 microns, and
wherein the third outer layer has an average fiber diameter of less than 25 microns,
wherein the face basis weight is less than or equal to the outer basis weight.

19. A filter or mask structure, comprising:
a first face layer comprising meltblown polyamide and an antimicrobial and/or antiviral ("AM/AV") compound and having a face basis weight ranging from 15 gsm to 25 gsm;
a second outer layer comprising meltblown polyamide and an AM/AV compound and having an outer basis weight ranging from 15 gsm to 25 gsm;
a third outer layer comprising an N95 mask and disposed between the first face layer and the second outer layer;
wherein the filter or mask structure demonstrates an *Escherichia coli* efficacy log reduction greater than 4.0, as measured in accordance with ASTM E3160 (2018) and a particulate filtration efficiency greater than 90%, as measured in accordance with ASTM F2299-03R17,
wherein each of the first face layer and the second outer layer has an average fiber diameter less than 50 microns, and
wherein the third outer layer has an average fiber diameter of less than 25 microns,
wherein the face basis weight is less than or equal to the outer basis weight.

* * * * *